United States Patent
Mishima et al.

(10) Patent No.: US 12,184,082 B2
(45) Date of Patent: Dec. 31, 2024

(54) CONTACTLESS POWER TRANSMISSION SYSTEM CAPABLE OF CONTROLLING POWER TRANSMITTER APPARATUS TO STABLY SUPPLY LOAD DEVICE WITH REQUIRED POWER

(71) Applicant: OMRON Corporation, Kyoto (JP)

(72) Inventors: Taichi Mishima, Kyoto (JP); Yuki Ito, Kyoto (JP); Shingo Nagaoka, Kyoto (JP); Takeshi Uematsu, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 306 days.

(21) Appl. No.: 17/632,093

(22) PCT Filed: Aug. 5, 2019

(86) PCT No.: PCT/JP2019/030776
§ 371 (c)(1),
(2) Date: Feb. 1, 2022

(87) PCT Pub. No.: WO2021/024362
PCT Pub. Date: Feb. 11, 2021

(65) Prior Publication Data
US 2022/0278554 A1    Sep. 1, 2022

(51) Int. Cl.
*H02J 50/12*    (2016.01)
*B60L 53/124*    (2019.01)
(Continued)

(52) U.S. Cl.
CPC ........... *H02J 50/12* (2016.02); *B60L 53/124* (2019.02); *H02J 50/60* (2016.02); *H02J 50/80* (2016.02); *H02M 7/06* (2013.01); *H02M 7/5387* (2013.01)

(58) Field of Classification Search
CPC ......... H02J 50/12; H02J 50/80; H02J 7/00308
See application file for complete search history.

(56) References Cited

U.S. PATENT DOCUMENTS

2014/0300189 A1*  10/2014  Nakano ................... H02J 50/12
                                                                        307/104
2014/0333142 A1   11/2014  Desrosiers
(Continued)

FOREIGN PATENT DOCUMENTS

CN    104335451 A    2/2015
CN    108454431 A    8/2018
(Continued)

OTHER PUBLICATIONS

CNIPA Notification of the First Office Action for corresponding CN Application No. 201980059344.0; Date of Issue, Apr. 27, 2023.
(Continued)

*Primary Examiner* — Rexford N Barnie
*Assistant Examiner* — Rasem Mourad
(74) *Attorney, Agent, or Firm* — CANTOR COLBURN LLP

(57) ABSTRACT

A control circuit controls a power supply circuit to generate transmitting power having a frequency varying within a frequency range. The control circuit determines a stably transmitting frequency based on a detected output voltage of a power receiver apparatus, the stably transmitting frequency indicating a frequency of the transmitting power at which dependency of the output voltage on a load value of the power receiver apparatus is at least locally minimized within the frequency range. The control circuit determines a transmitting voltage based on the detected output voltage, the transmitting voltage indicating a voltage of the transmitting power at which the output voltage reaches a target voltage when generating transmitting power having the stably transmitting frequency. The control circuit controls
(Continued)

the power supply circuit to generate transmitting power having the stably transmitting frequency and the transmitting voltage.

13 Claims, 50 Drawing Sheets

(51) Int. Cl.
*H02J 50/60* (2016.01)
*H02J 50/80* (2016.01)
*H02M 7/06* (2006.01)
*H02M 7/5387* (2007.01)

(56) References Cited

U.S. PATENT DOCUMENTS

| | | | |
|---|---|---|---|
| 2015/0236518 A1* | 8/2015 | Matsumoto | H02J 50/402 |
| | | | 307/104 |
| 2016/0064951 A1* | 3/2016 | Yamamoto | H02J 50/80 |
| | | | 307/104 |
| 2017/0101016 A1 | 4/2017 | Seong et al. | |
| 2018/0183272 A1 | 6/2018 | Nakao | |
| 2019/0210477 A1* | 7/2019 | Maikawa | H02J 50/10 |
| 2020/0099256 A1* | 3/2020 | Kanakasabai | H02J 50/40 |
| 2020/0280216 A1* | 9/2020 | Pei | H02J 7/007182 |

FOREIGN PATENT DOCUMENTS

| | | |
|---|---|---|
| EP | 2908405 A1 | 8/2015 |
| JP | 2017093094 A | 5/2017 |
| JP | 2017112787 A | 6/2017 |
| JP | 2018186702 A | 11/2018 |
| WO | 2018111424 A2 | 6/2018 |
| WO | 2018221428 A1 | 12/2018 |
| WO | 2019100736 A1 | 5/2019 |

OTHER PUBLICATIONS

EPO Extended European Search Report corresponding to EP Application No. 19940520.0; Mailing Date, Apr. 6, 2023.
International Search Report for International Application No. PCT/JP2019/030776; Date of Mailing Sep. 10, 2019.
PCT Written Opinion of the International Searching Authority for International Application No. PCT/JP2019/030776; Date of Mailing, Sep. 10, 2019.

\* cited by examiner

FIG. 38

| COUPLING COEFFICIENT k12 | 0.1 | 0.2 | 0.3 | 0.4 | ... |
|---|---|---|---|---|---|
| CURRENT I1 OF TRANSMITTING COIL L1 [A] | 0.75 | 0.98 | 1.19 | 1.25 | ... |
| CURRENT I3 OF AUXILIARY COIL L3 [A] | 0.24 | 0.61 | 0.83 | 0.97 | ... |

CONTACTLESS POWER TRANSMISSION SYSTEM CAPABLE OF CONTROLLING POWER TRANSMITTER APPARATUS TO STABLY SUPPLY LOAD DEVICE WITH REQUIRED POWER

CROSS REFERENCE TO RELATED APPLICATIONS

This is the U.S. national stage of application No. PCT/JP2019/030776, filed on Aug. 5, 2019. Priority is claimed and the disclosure of which is also incorporated herein by reference.

TECHNICAL FIELD

The present disclosure relates to a controller apparatus of a power transmitter apparatus configured to transmit power to a power receiver apparatus in a contactless manner. The present disclosure also relates to a power transmitter apparatus provided with such a controller apparatus. The present disclosure also relates to a contactless power transmission system including such a power transmitter apparatus.

BACKGROUND ART

There has been known a contactless power transmission system configured to transmit power in a contactless manner from a power transmitter apparatus connected to a power supply, to a power receiver apparatus including a load device, such as a rechargeable battery.

For example, Patent Document 1 discloses a wireless power transmission system including a power receiver apparatus, the power receiver apparatus being provided with a first power converter that rectifies an AC voltage received through a coil into a DC voltage, and a second power converter that converts the DC voltage rectified by the first power converter into an arbitrary DC voltage or AC voltage. A controller of the power receiver apparatus controls efficiency of power transmission with the power transmitter apparatus using one of the first and second power converters, and controls power received from the power transmitter apparatus using the other of the first and second power converters.

CITATION LIST

Patent Documents

PATENT DOCUMENT 1: Japanese Patent Laid-Open No. JP 2017-093094 A

SUMMARY OF INVENTION

Technical Problem

In general, power consumption or current consumption of a load device varies over time. Accordingly, when a power transmitter apparatus transmits power to a power receiver apparatus in a contactless manner, a voltage applied to the load device (referred to as an "output voltage of the power receiver apparatus" in this specification) may vary in accordance with to variations of power consumption or current consumption of the load device (referred to as a "load value of the load device" in this specification).

In order to supply the load device with its required voltage from the power receiver apparatus, for example, as disclosed in Patent Document 1, it is considered to provide the power receiver apparatus with an additional power converter (such as a DC/DC converter or a DC/AC converter). However, in the case where the power receiver apparatus is provided with the additional power converter (such as a DC/DC converter), the size, weight, and cost of the power receiver apparatus increase, and the efficiency decreases. Accordingly, it is required to control the power transmitter apparatus to stably supply the load device with its required voltage, without need of an extra circuit (such as a DC/DC converter) in the power receiver apparatus.

An object of the present disclosure is to provide a controller apparatus of a power transmitter apparatus capable of controlling the power transmitter apparatus to stably supply a load device with its required voltage, without need of an extra circuit in a power receiver apparatus.

Further objects of the present disclosure are to provide a power transmitter apparatus provided with such a controller apparatus, and provide a contactless power transmission system including such a power transmitter apparatus.

Solution to Problem

In order to solve the above-described problems, a controller apparatus of a power transmitter apparatus, a power transmitter apparatus, and a contactless power transmission system according to aspects of the present disclosure are configured as follows.

According to an aspect of the present disclosure, a controller apparatus of a power transmitter apparatus is provided for transmitting power in a contactless manner to a power receiver apparatus with a receiving coil. The power transmitter apparatus is provided with: a transmitting coil; and a power supply circuit configured to generate transmitting power having a variable voltage and a variable frequency, and supply the transmitting power to the transmitting coil. The controller apparatus is provided with: a first communication device communicatively connected to the power receiver apparatus, and configured to receive a detected value of an output voltage of the power receiver apparatus from the power receiver apparatus; and a first control circuit configured to control the power supply circuit based on the detected value of the output voltage of the power receiver apparatus. The first control circuit is configured to control the power supply circuit to generate transmitting power having a frequency varying within a predetermined frequency range. The first control circuit is configured to receive the detected value of the output voltage of the power receiver apparatus from the power receiver apparatus using the first communication device, the detected value being detected in the power receiver apparatus when generating the transmitting power using the power supply circuit. The first control circuit is configured to determine a stably transmitting frequency based on the detected value of the output voltage of the power receiver apparatus, the stably transmitting frequency indicating a frequency of the transmitting power at which dependency of the output voltage of the power receiver apparatus on a load value of the power receiver apparatus is at least locally minimized within the frequency range. The first control circuit is configured to determine a transmitting voltage based on the detected value of an output voltage of the power receiver apparatus, the transmitting voltage indicating a voltage of the transmitting power at which the output voltage of the power receiver apparatus reaches a predetermined target voltage when generating transmitting power having the stably transmitting frequency. The first control circuit is configured to control the power supply circuit to generate transmitting power having the stably transmitting frequency and the transmitting voltage.

According to an aspect of the present disclosure, a power transmitter apparatus is provided with: a transmitting coil; a power supply circuit configured to generate transmitting power having a variable voltage and a variable frequency, and supply the transmitting power to the transmitting coil; and the controller apparatus of the power transmitter apparatus.

According to an aspect of the present disclosure, a contactless power transmission system includes: the power transmitter apparatus; and a power receiver apparatus. The power receiver apparatus is provided with: a receiving coil, a voltage detector circuit configured to detect an output voltage of the power receiver apparatus, and a second communication device communicatively connected to the power transmitter apparatus, and configured to transmit a detected value of the output voltage of the power receiver apparatus to the power transmitter apparatus.

Advantageous Effects of Invention

According to the present disclosure, it is possible to control the power transmitter apparatus to stably supply the load device with its required voltage, without need of an extra circuit in the power receiver apparatus.

BRIEF DESCRIPTION OF DRAWINGS

FIG. 38 is a table illustrating an example of coupling coefficient k12 of the transmitting coil L1 and the receiving coil L2, the coupling coefficient k12 being calculated with respect to the current I1 flowing through the transmitting coil L1 of FIG. 33, and the current I3 generated in the auxiliary coil L3 of FIG. 33.

DESCRIPTION OF EMBODIMENTS

Figure 1:
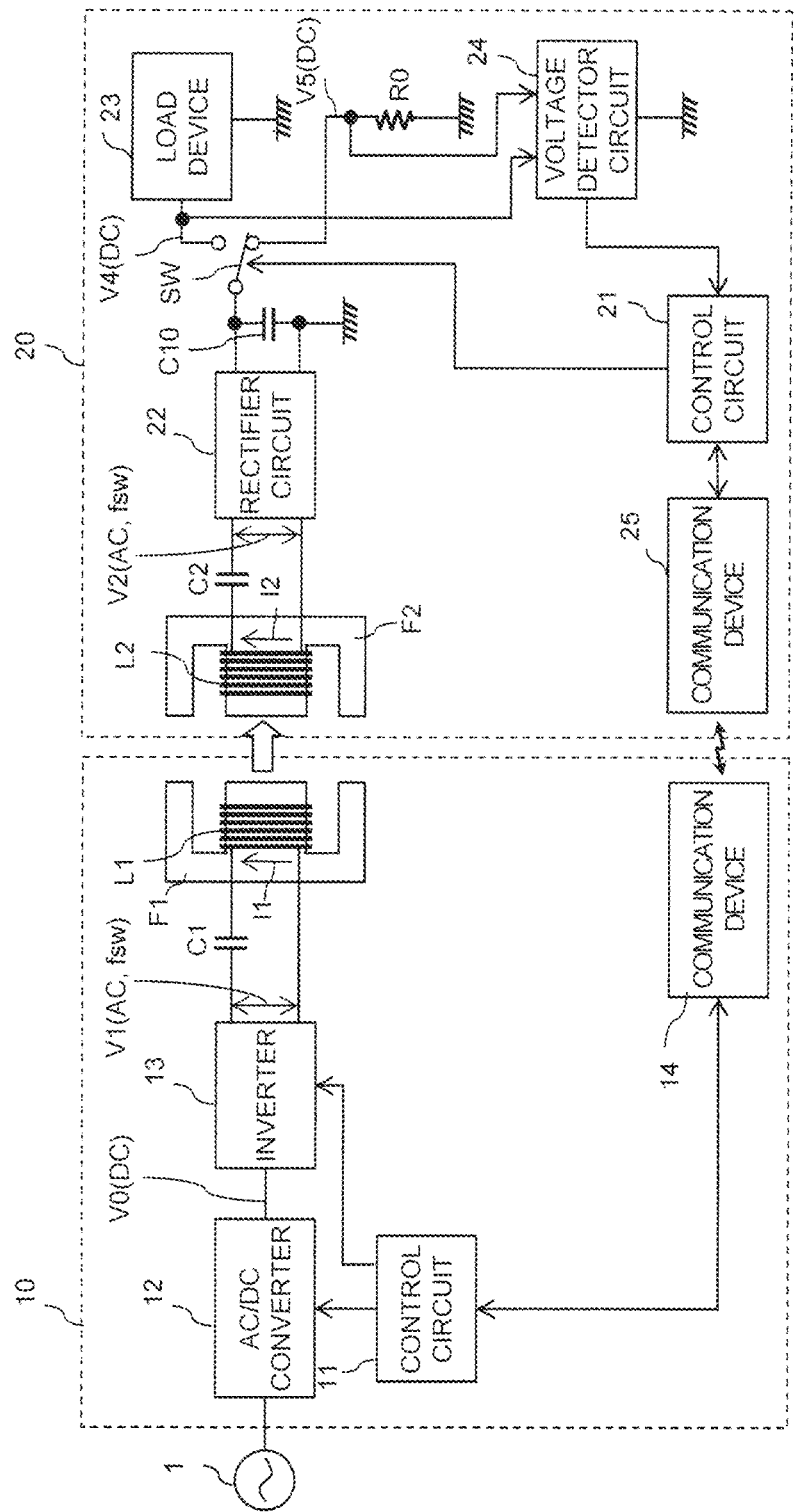
FIG. 1 is a block diagram illustrating a configuration of a contactless power transmission system according to a first embodiment.

Embodiments according to one aspect of the present disclosure (hereinafter, also referred to as "the present embodiment") will be described below with reference to the drawings. In the drawings, the same reference signs denote similar components.

Application Example

FIG. 1 is a block diagram illustrating a configuration of a contactless power transmission system according to a first embodiment. The contactless power transmission system of FIG. 1 includes a power transmitter apparatus 10 and a power receiver apparatus 20, and the power transmitter apparatus 10 transmits power to the power receiver apparatus 20 in a contactless manner.

The power transmitter apparatus 10 is provided with at least a control circuit 11, an AC/DC converter 12, an inverter 13, a communication device 14, and a transmitting coil (power transmitting coil) L1.

The control circuit 11 controls overall operations of the power transmitter apparatus 10.

The AC/DC converter 12 converts an AC voltage inputted from an AC power supply 1, into a DC voltage V0 having a variable magnitude under the control of the control circuit 11. The inverter 13 operates at a variable switching frequency fsw under the control of the control circuit 11, and converts the DC voltage V0 inputted from the AC/DC converter 12, into an AC voltage V1. The voltage V1 is applied to the transmitting coil L1. Here, an amplitude of the voltage V1 is equal to the magnitude of the voltage V0.

In the present specification, the AC/DC converter 12 and the inverter 13 are also collectively referred to as a "power supply circuit". In other words, the power supply circuit generates transmitting power having a variable voltage and a variable frequency, and supplies the transmitting power to the transmitting coil L1.

When the power transmitter apparatus 10 transmits power to the power receiver apparatus 20, the transmitting coil L1 is electromagnetically coupled to a receiving coil L2 of the power receiver apparatus 20 (described below).

The communication device 14 is communicatively connected to the power receiver apparatus 20, and receives a detected value of an output voltage (described below) of the power receiver apparatus 20 from the power receiver apparatus 20.

The control circuit 11 controls the AC/DC converter 12 and the inverter 13 based on the detected value of the output voltage of the power receiver apparatus 20. In particular, the control circuit 11 controls the magnitude of the voltage V0 outputted from the AC/DC converter 12, and the switching frequency fsw of the inverter 13.

The power receiver apparatus 20 is provided with at least a receiving coil (power receiving coil) L2, a voltage detector circuit 24, and a communication device 25.

When the power transmitter apparatus 10 transmits power to the power receiver apparatus 20, the receiving coil L2 is electromagnetically coupled to the transmitting coil L1 of the power transmitter apparatus 10.

A load device 23 is provided inside or outside the power receiver apparatus 20. The load device 23 includes, for example, a rechargeable battery, a motor, an electric circuit, and/or an electronic circuit. Power received from the power transmitter apparatus 10 via the receiving coil L2 is supplied to the load device 23.

In this specification, the power consumption or the current consumption of the load device 23 is also referred to as a "load value of the load device".

In general, the load device 23 has a variable load value varying over time. For example, in the case where the load device 23 is a rechargeable battery, the current flowing through the load device 23 varies in accordance with the state of charge of the rechargeable battery. Accordingly, the voltage applied to the load device 23 may vary in accordance with the variations of the load value of the load device 23. In addition, the voltage applied to load device 23 varies in accordance with a coupling coefficient k12 of the transmitting coil L1 and the receiving coil L2 (that is, a distance between the transmitting coil L1 and the receiving coil L2). On the other hand, the control circuit 11 of the power transmitter apparatus 10 controls the AC/DC converter 12 and the inverter 13 based on the detected value of the output voltage of the power receiver apparatus 20 (that is, the voltage applied to load device 23), as described above. In this case, it is desired that the control circuit 11 of the power transmitter apparatus 10 obtains the detected value of the output voltage of the power receiver apparatus 20, which depends on the coupling coefficient k12 of the transmitting coil L1 and the receiving coil L2, but which does not depend on the variations of the load value of the load device 23. Accordingly, the power receiver apparatus 20 may be provided with a load element R0 having a predetermined load value, and detect a voltage V5 applied to the load element R0 as the output voltage of power receiver apparatus 20, instead of a voltage V4 applied to the load device 23.

In this specification, the voltage V4 applied to the load device 23, or the voltage V5 applied to the load element R0 is also referred to as an "output voltage of the power receiver apparatus".

The voltage detector circuit 24 detects the output voltage of the power receiver apparatus 20. Although the voltage detector circuit 24 detects both the voltages V4 and V5 in the example of FIG. 1, only one of the voltages V4 and V5 may be detected.

The communication device 25 is communicatively connected to the power transmitter apparatus 10, and transmits a detected value of the output voltage of the power receiver apparatus 20 to the power transmitter apparatus 10.

In this specification, the control circuit 11 of the power transmitter apparatus 10 is also referred to as a "first control circuit". In this specification, the communication device 14 of the power transmitter apparatus 10 is also referred to as a "first communication device", and the communication device 25 of the power receiver apparatus 20 is also referred to as a "second communication device".

The control circuit 11 of the power transmitter apparatus 10 controls the AC/DC converter 12 and the inverter 13 to generate transmitting power having a frequency varying within a predetermined frequency range. The control circuit 11 receives a detected value of the output voltage of the power receiver apparatus 20 from the power receiver apparatus 20 using the communication device 14, the detected value being detected in the power receiver apparatus 20 when generating the transmitting power using the AC/DC converter 12 and the inverter 13. The control circuit 11 determines a stably transmitting frequency based on the detected value of the output voltage of the power receiver apparatus 20, the stably transmitting frequency indicating a frequency of the transmitting power at which dependency of the output voltage of the power receiver apparatus 20 on the load value of the power receiver apparatus 20 is at least locally minimized within the predetermined frequency range. The control circuit 11 determines a transmitting voltage based on the detected value of the output voltage of the power receiver apparatus 20, the transmitting voltage indicating a voltage of the transmitting power at which the output voltage of the power receiver apparatus 20 reaches a predetermined target voltage when generating the transmitting power having the stably transmitting frequency. The control circuit 11 controls the AC/DC converter 12 and the inverter 13 to generate the transmitting power having the stably transmitting frequency and the transmitting voltage.

In the first embodiment, the control circuit 11 and the communication device 14 are also collectively referred to as a "controller apparatus" of the power transmitter apparatus 10.

Now, operations of the contactless power transmission system of FIG. 1 will be further described with reference to FIGS. 2 to 4.

Figure 2:
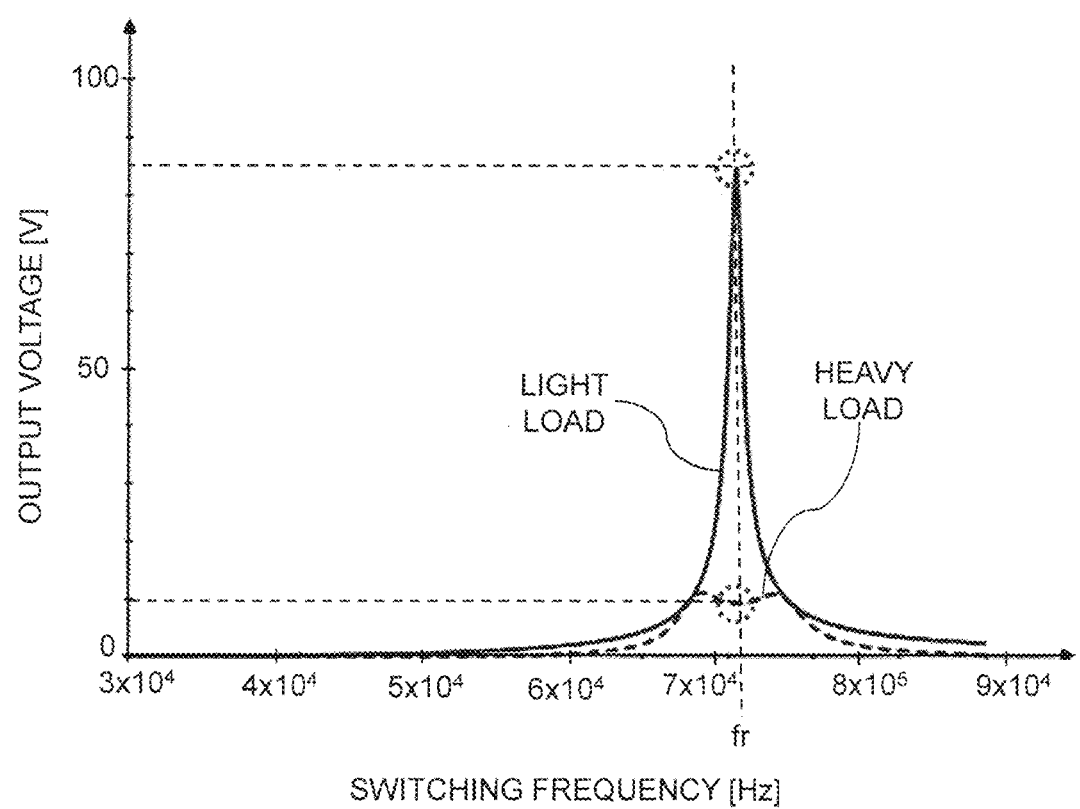
FIG. 2 is a graph illustrating frequency characteristics of an output voltage of a contactless power transmission system according to a comparative example.

FIG. 2 is a graph illustrating frequency characteristics of an output voltage of a contactless power transmission system according to a comparative example. The example of FIG. 2 illustrates a case where a power transmitter apparatus is provided with a series resonant circuit of a transmitting coil and a capacitor, a power receiver apparatus is provided with a series resonant circuit of a receiving coil and a capacitor, and the power transmitter apparatus transmits transmitting power to the power receiver apparatus, the transmitting power being generated by an inverter operating at a switching frequency. In the example of FIG. 2, the transmitting coil and the receiving coil have the same self-inductance, and the capacitor of the power transmitter apparatus and the capacitor of the power receiver apparatus have the same capacitance. FIG. 2 illustrates the relationship between the switching frequency of the inverter and the output voltage of the power receiver apparatus, under the condition that the voltage applied to the transmitting coil has a constant amplitude. According to conventional contactless power transmission systems, an inverter is often operated at a switching frequency equal to a resonance frequency fr of a transmitting coil, a receiving coil, and a capacitor, in order to improve efficiency and distance of transmission between the transmitting coil and the receiving coil. In this case, it can be seen that even when the voltage applied to the transmitting coil has the constant amplitude, the output voltage of the power receiver apparatus significantly changes in accordance with the variations of the load value (light load or heavy load) of the power receiver apparatus, as illustrated in FIG. 2.

Figure 3:
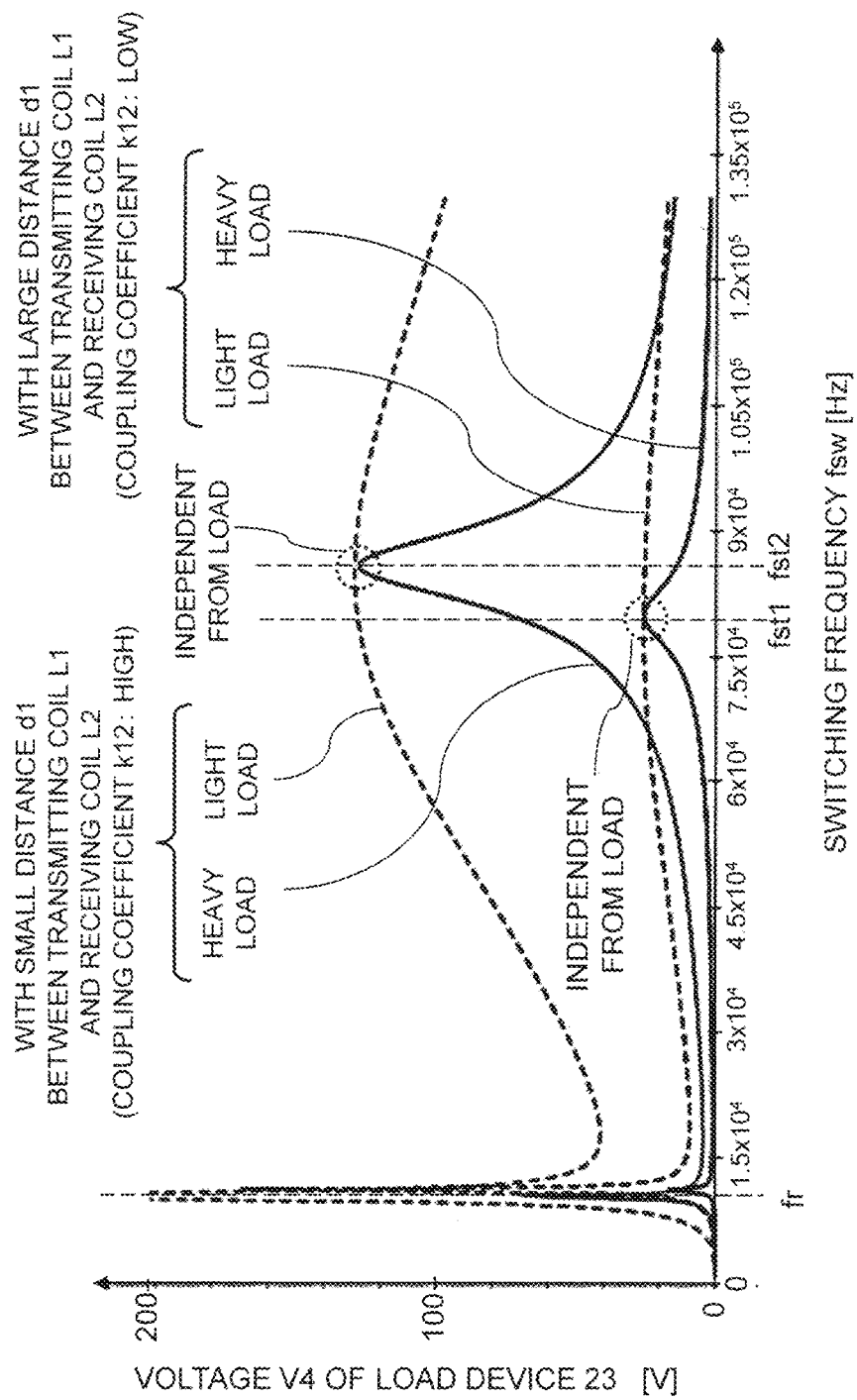
FIG. 3 is a graph illustrating frequency characteristics of an output voltage of the contactless power transmission system of FIG. 1.

FIG. 3 is a graph illustrating frequency characteristics of the output voltage of the contactless power transmission system of FIG. 1. In the example of FIG. 1, the power transmitter apparatus 10 is provided with a series resonant circuit of the transmitting coil L1 and a capacitor C1, and the power receiver apparatus 20 is provided with a series resonant circuit of the receiving coil L2 and a capacitor C2. In the example of FIG. 3, the transmitting coil L1 and the receiving coil L2 have the same self-inductance, and the capacitor C1 of the power transmitter apparatus 10 and the capacitor C2 of the power receiver apparatus 20 have different capacitances. FIG. 3 also illustrates the relationship between the switching frequency fsw of the inverter 13 and the output voltage of the power receiver apparatus 20, under the condition that the voltage V1 applied to the transmitting coil L1 has a constant amplitude. As illustrated in FIG. 3, the voltage V4 applied to the load device 23 varies depending on the coupling coefficient k12 of the transmitting coil L1 and the receiving coil L2, and depending on the load value of load device 23. However, as illustrated in FIG. 3, when transmitting power at a certain switching frequency fsw, the dependency of the voltage V4 (and the gain) on the load value is at least locally minimized, and the voltage V4 (and the gain) becomes substantially constant regardless of the load value of the load device 23. In this specification, such a switching frequency fsw is also referred to as a "stably transmitting frequency". By appropriately setting capacitances of the capacitors C1 and C2 to be different from each other, the contactless power transmission system has a stably transmitting frequency. According to the example of FIG. 3, when the coupling coefficient k12 is small, the contactless power transmission system has a stably transmitting frequency fst1, and when the coupling coefficient k12 is large, the contactless power transmission system has a stably transmitting frequency fst2. The stably transmitting frequency may or may not match the resonance frequency fr of the transmitting coil L1, the receiving coil L2, and the capacitors C1, C2. The example of FIG. 3 illustrates a case where the stable transmission frequencies fst1, fst2 are different from the resonance frequency fr.

When the power transmitter apparatus 10 transmits power to the power receiver apparatus 20 in a contactless manner, the power receiver apparatus 20 is not necessarily disposed at a fixed position with respect to the power transmitter apparatus 10. For example, consider a case where the power receiver apparatus 20 is an electrically-driven vehicle provided with a rechargeable battery, and the power transmitter apparatus 10 is a charging stand for the vehicle. In this case, due to a misalignment of the vehicle from a position in front of the charging stand, or due to a change in distance between the charging stand and the vehicle, deviations of, for example, several millimeters to several tens of millimeters may occur each time the vehicle stops at the charging stand. Accordingly, the distance between the transmitting coil L1 of the power transmitter apparatus 10 and the receiving coil L2 of the power receiver apparatus 20 may vary, and therefore, the coupling coefficient k12 of the transmitting coil L1 and the receiving coil L2 may also vary. As illustrated in FIG. 3, when the coupling coefficient k12 changes, the stably transmitting frequency also changes. According to the contactless power transmission system of an embodiment, each time starting power transmission, it is possible to determine a stably transmitting frequency in accordance with the arrangement of the power transmitter apparatus 10 and the power receiver apparatus 20 at that time, and operate the inverter 13 at an appropriate switching frequency fsw.

Figure 4:
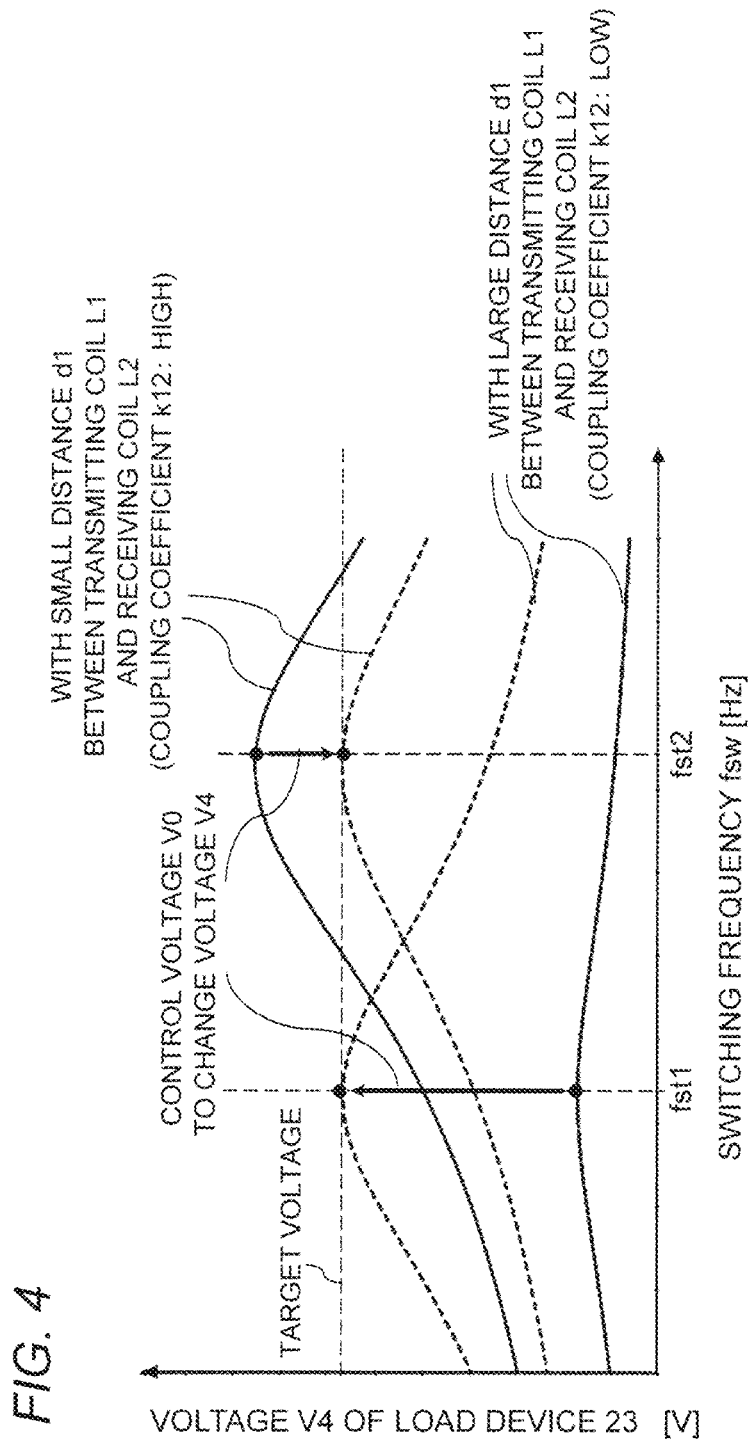
FIG. 4 is a diagram for explaining variations in a voltage V4 of a power receiver apparatus 20 by controlling a voltage V0 of a power transmitter apparatus 10 in the contactless power transmission system of FIG. 1.

FIG. 4 is a diagram for explaining variations in the voltage V4 of the power receiver apparatus 20 by controlling the voltage V0 of the power transmitter apparatus 10 in the contactless power transmission system of FIG. 1. As illustrated in FIG. 4, the voltage V4 applied to the load device 23 varies depending on the coupling coefficient k12 of the transmitting coil L1 and the receiving coil L2, and depending on the voltage V0 of the power transmitter apparatus 10. In the case of a large distance between the transmitting coil L1 and the receiving coil L2, and a small coupling coefficient k12, the voltage V4 is at a local maximum when the switching frequency fsw is set to fst1. In the case of a small distance between the transmitting coil L1 and the receiving coil L2, and a large coupling coefficient k12, the voltage V4 is at a local maximum when the switching frequency fsw is set to fst2. Here, the word "large" or "small" for the distance and the coupling coefficient k12 means a relative magnitude thereof. The control circuit 11 sets the switching frequency fsw of the inverter 13 to the stably transmitting frequency fst1 or fst2. When the voltage V4 applied to the load device 23 is less than the target voltage, the control circuit 11 increases the voltage V0 outputted from the AC/DC converter 12 in order to increase the voltage V4 to the target voltage. When the voltage V4 applied to the load device 23 is greater than the target voltage, the control circuit 11 reduces the voltage V0 outputted from the AC/DC converter 12 in order to reduce the voltage V4 to the target voltage.

According to the contactless power transmission system of an embodiment, it is possible to control the power transmitter apparatus 10 to stably supply the load device 23 with its required voltage, without need of an extra circuit in the power receiver apparatus 20.

By setting the switching frequency fsw of the inverter 13 to the stably transmitting frequency, it is not required to control the power transmitter apparatus 10 and/or the power receiver apparatus 20 in accordance with the variations of the load value of the load device 23. Even when the load value of the load device 23 changes, it is possible to stably supply the load device 23 with its required voltage, without changing the voltage V0 outputted from the AC/DC converter 12, nor changing the switching frequency fsw. Since it is not necessary to provide the power receiver apparatus 20 with a DC/DC converter or the like in order to supply the load device 23 with its required voltage, it is possible to provide a small-sized, lightweight, and low-cost power receiver apparatus operable with high efficiency.

According to the embodiments of the present disclosure, the power receiver apparatus 20 may be an electronic device with a rechargeable battery (for example, a laptop computer, a tablet computer, a mobile phone, or the like), and the power transmitter apparatus 10 may be a charger for the power receiver apparatus 20. In addition, according to the embodiments of the present disclosure, the power receiver apparatus 20 may be an electrically-driven vehicle with a rechargeable battery (for example, an electric vehicle or an automated guided vehicle), and the power transmitter apparatus 10 may be a charging stand for the power receiver apparatus 20. In addition, according to the embodiments of the present disclosure, the power receiver apparatus 20 may be a pallet that requires a power source for performing some work on a load during transportation, and the power transmitter apparatus 10 may be a conveyor or the like capable of supplying power to such pallets. In addition, the embodiments of the present disclosure are applicable to a contactless power transmission system in which the distance between the transmitting coil L1 and the receiving coil L2 is fixed. In this case, for example, the power transmitter apparatus 10 and the power receiver apparatus 20 may be provided instead of a slip ring, at a joint of a robot arm or the like, in order to supply power to a drive mechanism located at a tip of the robot arm or the like.

For example, in the case where the load device is a rechargeable battery, the current flowing through the rechargeable battery decreases as the state of charge of the rechargeable battery increases. Accordingly, the voltage applied to the rechargeable battery varies in accordance with the variations of the current flowing through the rechargeable battery (that is, the load value of the load device). Among conventional methods for controlling charging of a rechargeable battery, there has been known Constant Current, Constant Voltage (CCCV) charging. When performing the CCCV charging in a conventional power receiver apparatus, power is often transferred in the order of "receiving coil→rectifier circuit→DC/DC converter→charge control circuit→rechargeable battery". In this case, the charge control circuit performs the CCCV charging on the rechargeable battery. The DC/DC converter generates a voltage within a predetermined range and supplies the voltage to the charge control circuit, without depending on the current flowing through the rechargeable battery (that is, the load value of the load device). However, in order to reduce the size, weight, and cost of the power receiver apparatus, it is required to generate a voltage within the predetermined range and supply the voltage to the charge control circuit, for example, without requiring the DC/DC converter. According to the contactless power transmission system of an embodiment, by setting the switching frequency fsw of the inverter 13 to the stably transmitting frequency, it is possible to supply the load device 23 with its required voltage, without need of an extra circuit (such as a DC/DC converter) in the power receiver apparatus 20. In addition, according to the contactless power transmission system of the embodiment, it is possible to perform the CCCV charging without redesign of an existing charge control circuit or the like.

First Embodiment

An exemplary configuration of the contactless power transmission system according to the first embodiment will be described in more detail. According to the contactless power transmission system of the first embodiment, the power receiver apparatus is provided with a load element having a predetermined load value, and determines a stably transmitting frequency and a transmitting voltage based on a voltage applied to the load element.

Configuration Example of First Embodiment

As illustrated in FIG. 1, the power transmitter apparatus 10 supplied with power from the AC power supply 1. The AC power supply 1 is, for example, commercial power.

In the example of FIG. 1, the power transmitter apparatus 10 is provided with the control circuit 11, the AC/DC converter 12, the inverter 13, the communication device 14, the capacitor C1, a magnetic core F1, and the transmitting coil L1.

The control circuit 11 controls overall operations of the power transmitter apparatus 10. In particular, the control circuit 11 controls the magnitude of the voltage V0 outputted from the AC/DC converter 12 and the switching frequency fsw of the inverter 13, as described above. As a result, the control circuit 11 generates the transmitting power having the frequency varying within the predetermined frequency range including the stably transmitting frequency. The control circuit 11 includes a central processing unit (CPU), a random access memory (RAM), a read only memory (ROM), and the like, and performs power transmitting process described below with reference to FIGS. 8 and 9.

The AC/DC converter 12 converts the AC voltage inputted from the AC power supply 1, into the DC voltage V0 having the variable magnitude under the control of the control circuit 11. The AC/DC converter 12 may be provided with a power factor correction circuit. The inverter 13 converts the DC voltage V0 inputted from the AC/DC converter 12, into the AC voltage V1, as described above. The inverter 13 generates, for example, a rectangular alternating current voltage V1 having the switching frequency fsw. The inverter 13 operates at the variable switching frequency fsw under the control of the control circuit 11.

Figure 5:
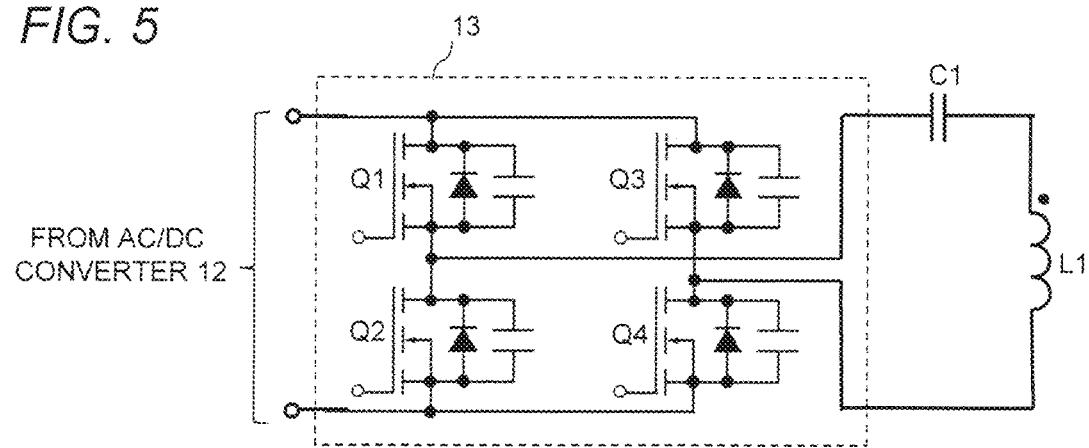
FIG. 5 is a circuit diagram illustrating a configuration of an inverter 13 of FIG. 1.

FIG. 5 is a circuit diagram illustrating a configuration of the inverter 13 of FIG. 1. The inverter 13 may be, for example, a full-bridge inverter including four switching elements Q1 to Q4. The switching elements Q1 to Q4 are, for example, field effect transistors to be turned on and off by the control circuit 11 or other circuits.

The power transmitter apparatus 10 includes the capacitor C1. The capacitor C1 is connected to the transmitting coil L1 so as to constitute an LC resonant circuit. By providing the capacitor C1, it is possible to adjust the output voltage gain of the power receiver apparatus 20, and improve the efficiency of power transmission.

The power transmitter apparatus 10 may be provided with a magnetic core F1. In this case, the transmitting coil L1 may be wound around the magnetic core F1. By winding the transmitting coil L1 around the magnetic core F1, it is possible to increase the magnetic flux density of the transmitting coil L1, and reduce leakage of the magnetic flux.

The communication device 14 is communicatively connected to the communication device 25 (described below) of the power receiver apparatus 20 in a wireless (e.g., infrared) or wired manner. As described above, the control circuit 11 receives the detected value of the output voltage of the power receiver apparatus 20 from the power receiver apparatus 20 using the communication device 14, the detected value being detected in the power receiver apparatus 20 when generating the transmitting power using the AC/DC converter 12 and the inverter 13. The control circuit 11 may receive a control signal indicating that the power receiver apparatus 20 requests power transmission, from the power receiver apparatus 20 using the communication device 14. The control circuit 11 may receive a control signal indicating that the power receiver apparatus 20 requests to stop the power transmission, from the power receiver apparatus 20 using the communication device 14. The control circuit 11 may receive a signal indicating a value of a voltage and/or a current to be supplied to the load device 23, from the power receiver apparatus 20 using the communication device 14. In the case where the power receiver apparatus 20 has a normal mode and a test mode (described below), the control circuit 11 may transmit a control signal for requesting transition to the test mode or to the normal mode, to the power receiver apparatus 20 using the communication device 14.

As described above, the control circuit 11 controls the AC/DC converter 12 and the inverter 13 based on the detected value of the output voltage of the power receiver apparatus 20. The control circuit 11 determines the stably transmitting frequency and the transmitting voltage when starting power transmission from the power transmitter apparatus 10 to the power receiver apparatus 20. When the detected value of the output voltage of the power receiver apparatus 20 significantly changes from the value obtained when determining the stably transmitting frequency and the transmitting voltage, the control circuit 11 redetermines the stably transmitting frequency and the transmitting voltage based on a present detected value of the output voltage of the power receiver apparatus 20. As a result, the control circuit 11 controls the AC/DC converter 12 and the inverter 13 to generate the transmitting power having the stably transmitting frequency and the transmitting voltage.

In the example of FIG. 1, the power receiver apparatus 20 is provided with a control circuit 21, a rectifier circuit 22, the load device 23, the voltage detector circuit 24, the communication device 25, capacitors C2, C10, a magnetic core F2, the receiving coil L2, the load element R0, and a switch circuit SW.

The control circuit 21 controls overall operations of the power receiver apparatus 20. In particular, the control circuit 21 controls the switch circuit SW as described below. The control circuit 21 includes a CPU, a RAM, a ROM, and the like, and performs power receiving process to be described below with reference to FIG. 10.

In this specification, the control circuit 21 of the power receiver apparatus 20 is also referred to as a "second control circuit".

When the power transmitter apparatus 10 transmits power to the power receiver apparatus 20, the receiving coil L2 is electromagnetically coupled to the transmitting coil L1, and as a result, a current I2 and a voltage V2 are generated in the receiving coil L2.

The power receiver apparatus 20 is provided with the capacitor C2. The capacitor C2 is connected to the receiving coil L2 so as to constitute an LC resonant circuit. By providing the capacitor C2, it is possible to adjust the output voltage gain of the power receiver apparatus 20, and improve the efficiency of power transmission.

The power receiver apparatus 20 may be provided with a magnetic core F2. In this case, the receiving coil L2 may be wound around the magnetic core F2. By winding the receiving coil L2 around the magnetic core F2, it is possible to increase the magnetic flux density of the receiving coil L2, and reduce leakage of the magnetic flux.

The rectifier circuit 22 and the capacitor C10 convert an AC voltage V2 inputted from the receiving coil L2, into a DC voltage. The rectifier circuit 22 may be provided with a power factor correction circuit.

Figure 6:
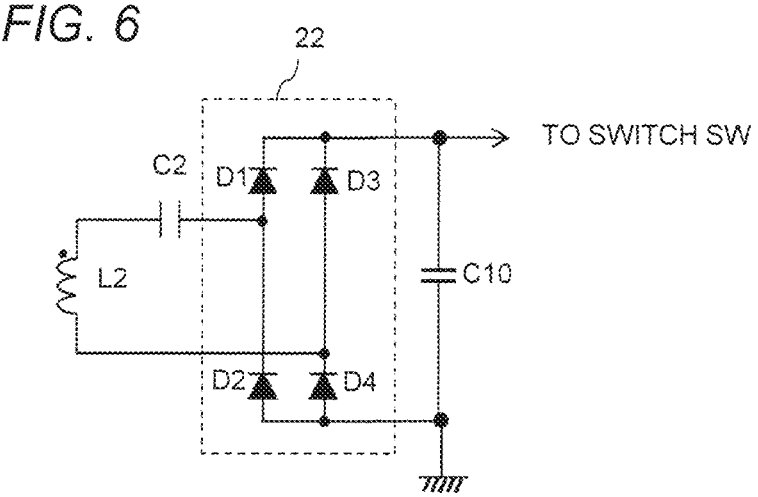
FIG. 6 is a circuit diagram illustrating a configuration of a rectifier circuit 22 of FIG. 1.

FIG. 6 is a circuit diagram illustrating a configuration of the rectifier circuit 22 of FIG. 1. The rectifier circuit 22 may be, for example, a full-wave rectifier circuit including four diodes D1 to D4.

The power receiver apparatus 20 may be provided with the load element R0 and the switch circuit SW. In this case, the voltage outputted from the rectifier circuit 22 is selectively supplied to the load device 23 or the load element R0 through the switch circuit SW operating under the control of the control circuit 21. For example, in the case where the load device 23 is a rechargeable battery, the load device 23 has a variable load value that varies in accordance with the state of charge of the rechargeable battery. On the other hand, the load element R0 has a predetermined load value. The load element R0 and the switch circuit SW have a simpler configuration than that of, for example, a DC/DC converter, and are configured so as not to affect the efficiency of power transmission to the load device 23. The larger the load value of the load element R0 is as compared with the rated load value of the load device 23, the more easily the stably transmitting frequency can be determined. The load element R0 may have a load value smaller than the load value of the load device 23. The power receiver apparatus 20 has a normal mode in which the voltage outputted from the rectifier circuit 22 is supplied to the load device 23, and a test mode in which the voltage outputted from the rectifier circuit 22 is supplied to the load element R0.

In this specification, the switch circuit SW is also referred to as a "first switch circuit".

In the test mode, the voltage detector circuit 24 detects the voltage V5 applied to the load element R0, as the output voltage of the power receiver apparatus 20. In the normal mode, the voltage detector circuit 24 detects the voltage V4 applied to the load device 23, as the output voltage of the power receiver apparatus 20.

The communication device 25 is communicatively connected to the communication device 14 of the power transmitter apparatus 10 in a wireless (e.g., infrared) or wired manner, as described above. The control circuit 21 transmits the detected value of the output voltage of the power receiver apparatus 20 detected by the voltage detector circuit 24 (that is, the voltage V5 applied to the load element R0) to the power transmitter apparatus 10 using the communication device 25. The control circuit 21 may transmit a control signal indicating that the power receiver apparatus 20 requests power transmission, to the power transmitter apparatus 10 using the communication device 25. The control circuit 21 may transmit a control signal indicating that the power receiver apparatus 20 requests to stop the power transmission, to the power transmitter apparatus 10 using the communication device 25. The control circuit 21 may transmit a signal indicating a value of a voltage and/or a current to be supplied to the load device 23, to the power transmitter apparatus 10 using the communication device 25.

When determining the voltage V0 and the switching frequency fsw, the control circuit 11 of the power transmitter apparatus 10 transmits a control signal for requesting transition to the test mode, to the power receiver apparatus 20 using the communication device 14. On the other hand, when performing normal power transmission for supplying power to the load device 23, the control circuit 11 transmits a control signal for requesting transition to the normal mode, to the power receiver apparatus 20 using the communication device 14.

The control circuit 21 of the power receiver apparatus 20 receives the control signal requesting the transition to the test mode or to the normal mode, from the power transmitter apparatus 10 using the communication device 25. When receiving the control signal requesting the transition to the test mode, the control circuit 21 switches the switch circuit SW to supply the output voltage of power receiver apparatus 20 to the load element R0. In this case, the voltage V5 is applied to the load element R0. When receiving the control signal requesting the transition to the normal mode, the control circuit 21 switches the switch circuit SW to supply the output voltage of power receiver apparatus 20 to the load device 23. In this case, the voltage V4 is applied to the load device 23.

When detecting an overvoltage in the power receiver apparatus 20, that is, when the voltage V4 applied to the load device 23 exceeds a predetermined threshold, the control circuit 21 of the power receiver apparatus 20 may switch the switch circuit SW to supply the output voltage of the power receiver apparatus 20 to the load element R0. As a result, it is possible to protect the load device 23 from overvoltage.

Figure 7:
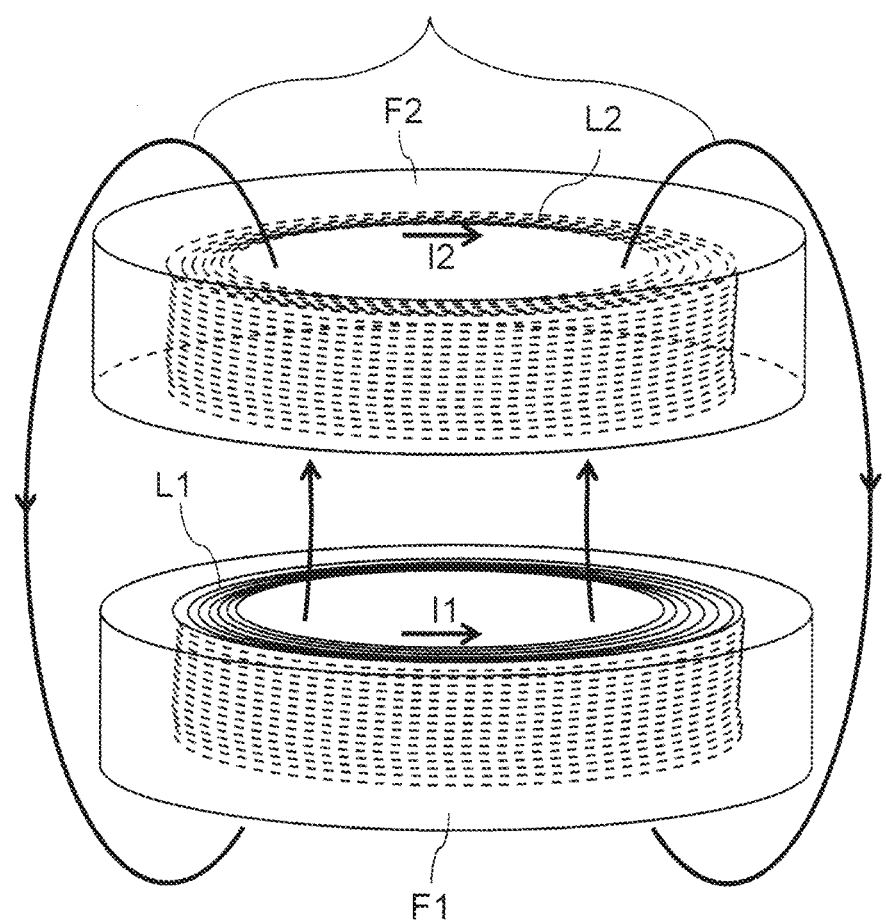
FIG. 7 is a perspective view illustrating arrangement of a transmitting coil L1 and a receiving coil L2 of FIG. 1.

FIG. 7 is a perspective view illustrating arrangement of the transmitting coil L1 and the receiving coil L2 of FIG. 1. As described above, the transmitting coil L1 may be wound around the magnetic core F1, and the receiving coil L2 may be wound around the magnetic core F2. The transmitting coil L1 and the receiving coil L2 are electromagnetically coupled to each other at the coupling coefficient k12.

The voltage generated in the power receiver apparatus 20 (the voltage V4 outputted from the rectifier circuit 22, and the like) varies in accordance with the coupling coefficient k12 of the transmitting coil L1 and the receiving coil L2. As the coupling coefficient k12 increases, the voltage also increases, and as the coupling coefficient k12 decreases, the voltage also decreases. The circuit parameters of the power transmitter apparatus 10 and the power receiver apparatus 20 are determined so that overvoltage does not occur in the power receiver apparatus 20, even when the coupling coefficient k12 of the transmitting coil L1 and the receiving coil L2 is maximized, and they operate at a frequency at which the voltage V4 becomes a maximum or a local maximum.

Operation Example of First Embodiment

Figure 8:
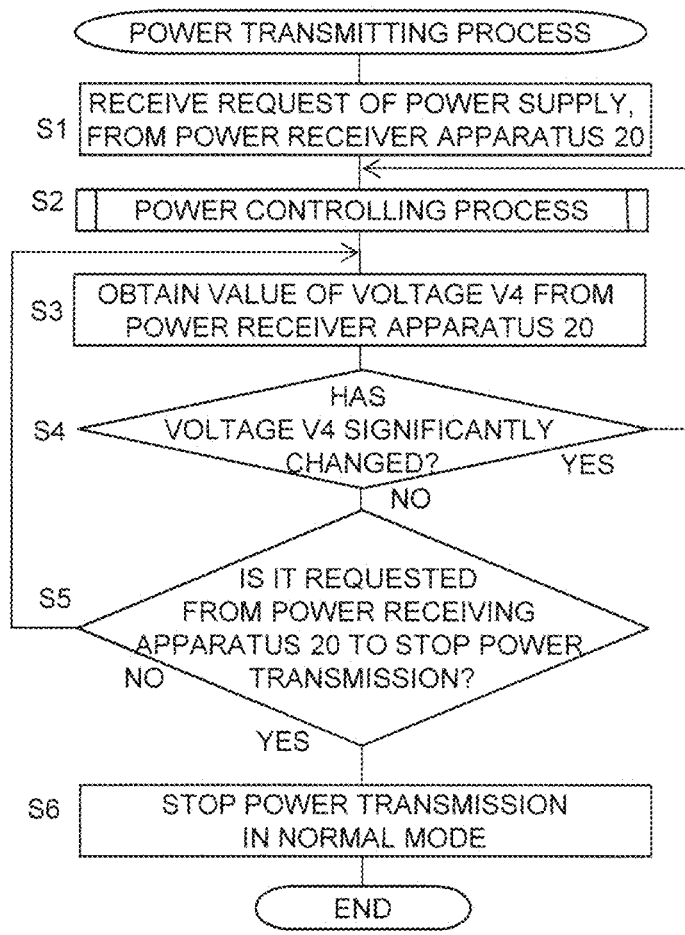
FIG. 8 is a flowchart illustrating power transmitting process performed by a control circuit 11 of the power transmitter apparatus 10 of FIG. 1.
Figure 9:
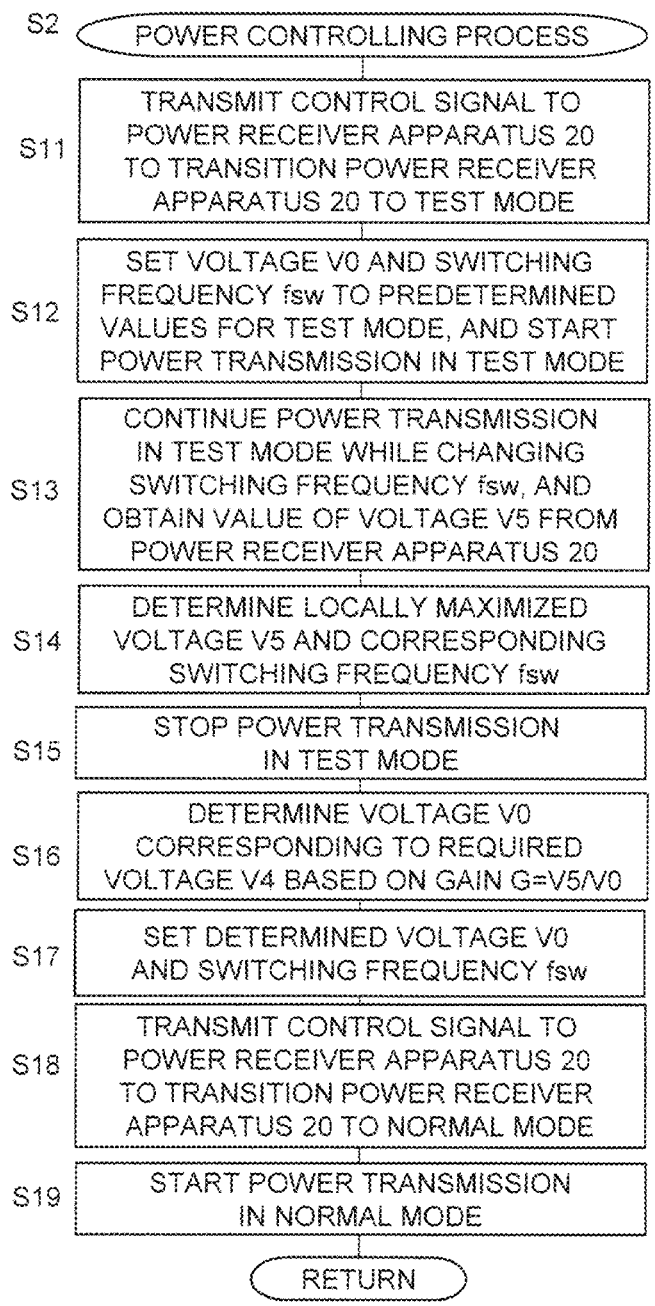
FIG. 9 is a flowchart illustrating a subroutine of step S2 of FIG. 8.
Figure 10:
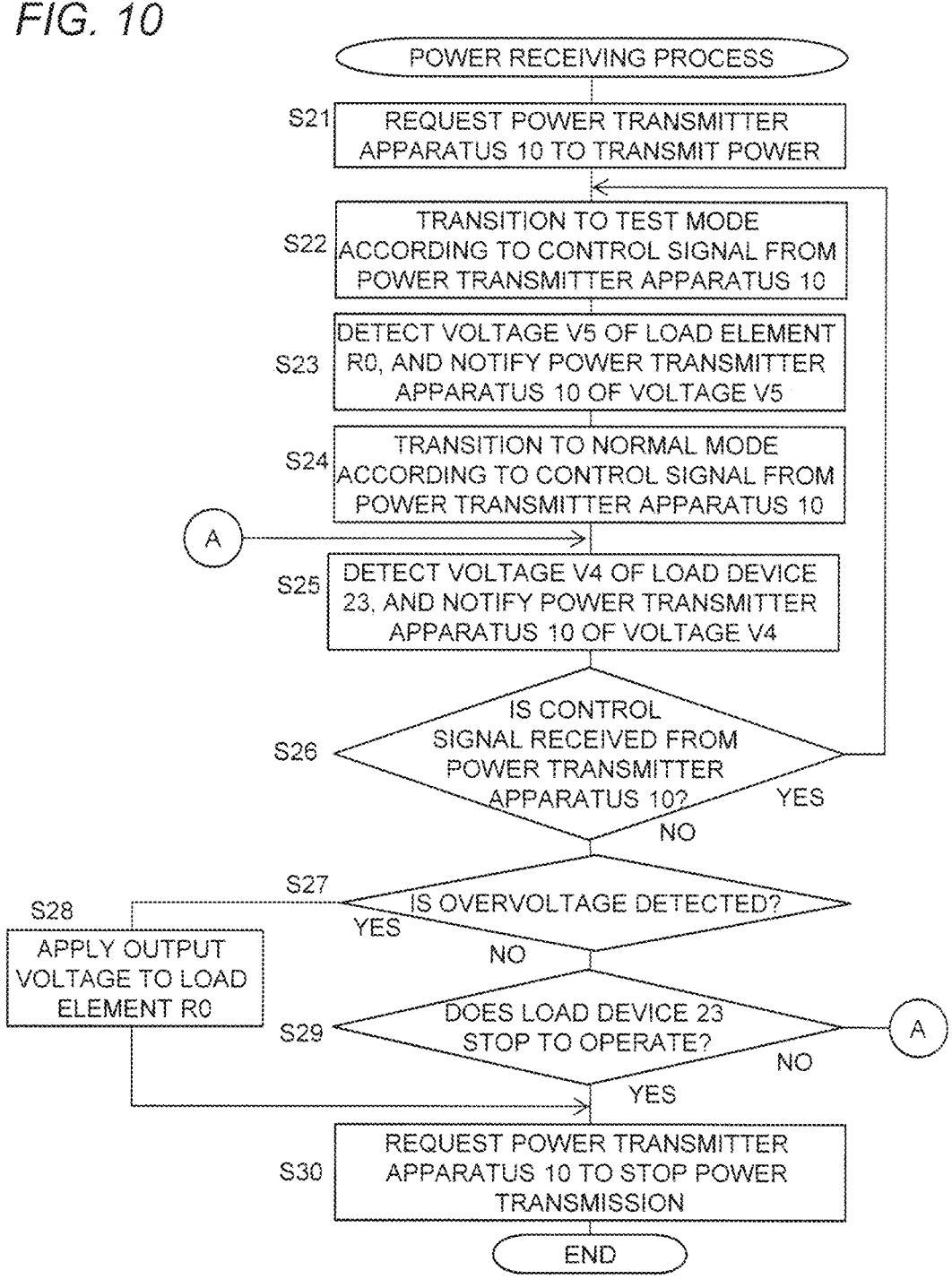
FIG. 10 is a flowchart illustrating power receiving process performed by a control circuit 21 of the power receiver apparatus 20 of FIG. 1.

FIG. 8 is a flowchart illustrating power transmitting process performed by the control circuit 11 of the power transmitter apparatus 10 of FIG. 1. FIG. 9 is a flowchart illustrating a subroutine of step S2 of FIG. 8. FIG. 10 is a flowchart illustrating power receiving process performed by the control circuit 21 of the power receiver apparatus 20 of FIG. 1.

For example, when the power receiver apparatus 20 is disposed at a position capable of receiving power from the power transmitter apparatus 10, the power transmitting process and the power receiving process are started. In step S21 of FIG. 10, the control circuit 21 of the power receiver apparatus 20 transmits a control signal for requesting power supply, to the power transmitter apparatus 10 using the communication device 25. In step S1 of FIG. 8, the control circuit 11 of the power transmitter apparatus 10 receives the control signal for requesting power supply, from the power receiver apparatus 20 using the communication device 14.

In step S2 of FIG. 8, the control circuit 11 of the power transmitter apparatus 10 performs power controlling process.

In step S11 of FIG. 9, the control circuit 11 of the power transmitter apparatus 10 transmits a control signal for requesting transition of the power receiver apparatus 20 to the test mode, to the power receiver apparatus 20 using the communication device 14. In step S22 of FIG. 10, the control circuit 21 of the power receiver apparatus 20 receives the control signal from the power transmitter apparatus 10 using the communication device 25, and according to the control signal, switches the switch circuit SW to supply the output voltage of the power receiver apparatus 20 to the load element R0 (that is, transition to the test mode).

In step S12 of FIG. 9, the control circuit 11 of the power transmitter apparatus 10 sets the voltage V0 and the switching frequency fsw to predetermined values for the test mode, and starts power transmission in the test mode. As described above, the voltage generated in the power receiver apparatus 20 varies in accordance with the coupling coefficient k12 of the transmitting coil L1 and the receiving coil L2. Accordingly, in order to prevent occurrence of an overvoltage in the power receiver apparatus 20, the control circuit 11 sets the voltage V0 outputted from the AC/DC converter 12, to a predetermined non-zero minimum, and sets the switching frequency fsw of the inverter 13 to its minimum or maximum. The minimum of the voltage V0 is set such that a voltage that the voltage detector circuit 24 can detect as the voltage V5 is generated at the load element R0. The minimum of the voltage V0 and the minimum or maximum of the switching frequency fsw are used as the predetermined values for the test mode. In step S23 of FIG. 10, the control circuit 21 of the power receiver apparatus 20 detects the voltage V5 applied to the load element R0, using the voltage detector circuit 24, and notifies the power transmitter apparatus 10 of the voltage V5 using the communication device 25.

Figure 11:
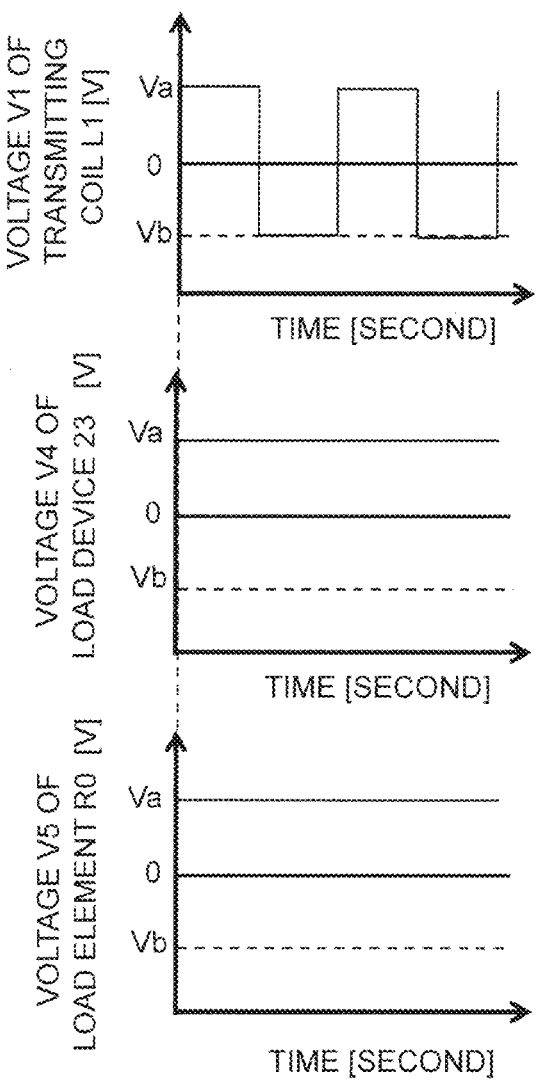
FIG. 11 is a diagram schematically illustrating waveforms of voltages V1, V4, and V5 in the contactless power transmission system of FIG. 1.

FIG. 11 is a diagram schematically illustrating waveforms of the voltages V1, V4, and V5 in the contactless power transmission system of FIG. 1. As described above, the inverter 13 generates, for example, the rectangular AC voltage V1. A DC voltage V4 is applied to the load device 23, and a DC voltage V5 is also applied to the load element R0.

In step S13 of FIG. 9, the control circuit 11 of the power transmitter apparatus 10 continues the power transmission in the test mode while changing the switching frequency fsw, and obtains the value of the voltage V5 from the power receiver apparatus 20 using the communication device 14. In step S14 of FIG. 9, when changing the switching frequency fsw within the predetermined frequency range, the control circuit 11 of the power transmitter apparatus 10 determines a locally-maximized voltage V5, and a switching frequency fst at which the voltage V5 is locally maximized.

Figure 12:
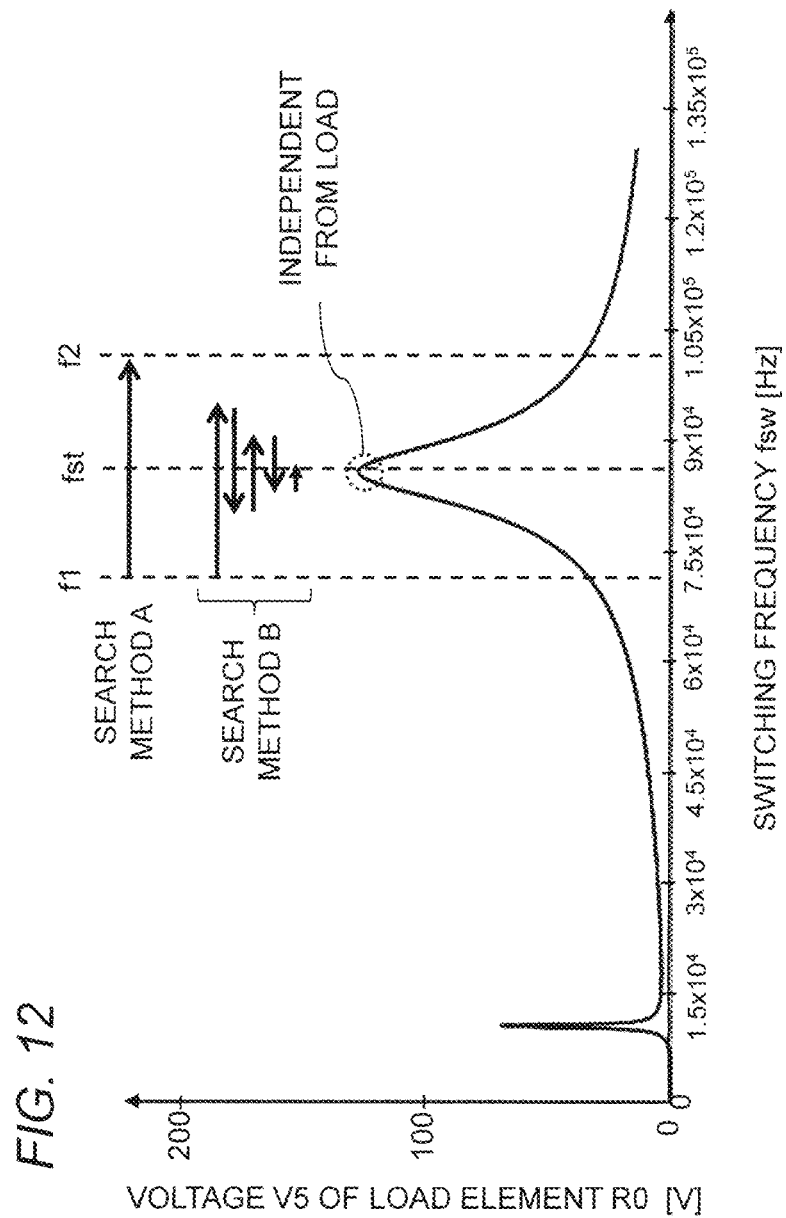
FIG. 12 is a diagram for explaining search and determination of a switching frequency fsw in steps S13 to S14 of FIG. 8.

FIG. 12 is a diagram for explaining search and determination of the switching frequency fst in steps S13 to S14 of FIG. 9. The control circuit 11 of the power transmitter apparatus 10 determines the switching frequency fst at which the voltage V5 is locally maximized, using one of search methods A and B.

According to the search method A of FIG. 12, the voltage V5 applied to the load element R0 is detected while sweeping the switching frequency fsw only once from a lower limit frequency f1 to an upper limit frequency f2 within a predetermined frequency range f1 to f2. In the frequency range f1 to f2, the switching frequency fst at which the voltage V5 is maximized is determined as the stably transmitting frequency.

According to the search method A of FIG. 12, the voltage V5 applied to the load element R0 may be detected while sweeping the switching frequency fsw only once from the upper limit frequency f2 to the lower limit frequency f1.

According to the search method B of FIG. 12, the voltage V5 applied to the load element R0 is detected while sweeping (that is, increasing or decreasing) the switching frequency fsw in one direction starting from a predetermined initial switching frequency fsw (for example, the frequency f1 or f2). While the voltage V5 increases, sweeping of the switching frequency fsw is kept in the same direction, and when the voltage V5 decreases, the direction of sweeping the switching frequency fsw is reversed (that is, decreased or increased). By performing these steps iteratively, the switching frequency fst at which the voltage V5 is maximized is determined as the stably transmitting frequency. When the switching frequency fsw varies by zero or within a predetermined threshold (in percentage or voltage) in an iteration, the process ends. The search method B is also referred to as a "hill-climbing method".

The search method A can be performed with simpler process than that of the search method B. On the other hand, the search method B may be performed in a conditionally shorter time than that of the search method A, since it is necessary to sweep the switching frequency fsw over the entire frequency range f1 to f2. The search method B can be applied to, for example, maximum power point tracking (MPPT).

By determining the locally maximized voltage V5, the gain G=V5/V0 of the contactless power transmission system when transmitting power at the switching frequency fst can be calculated.

When the switching frequency fst at which the voltage V5 is locally maximized is determined in step S14, then in step S15 of FIG. 9, the control circuit 11 of the power transmitter apparatus 10 stops the power transmission in the test mode.

In step S16 of FIG. 9, the control circuit 11 of the power transmitter apparatus 10 determines the voltage V0 outputted from the AC/DC converter 12 corresponding to the required voltage V4 of the load device 23, as the transmitting voltage, based on the gain G=V5/V0 of the contactless power transmission system. Here, the gain V4/V0 of the contactless power transmission system in the normal mode is considered to be equivalent to the gain V5/V0 of the contactless power transmission system in the test mode.

In step S17 of FIG. 9, the control circuit 11 of the power transmitter apparatus 10 sets the voltage V0 determined in step S16, to the AC/DC converter 12, and sets the switching frequency fst determined in step S14, to the inverter 13.

In step S18 of FIG. 9, the control circuit 11 of the power transmitter apparatus 10 transmits a control signal for requesting transition of the power receiver apparatus 20 to the normal mode, to the power receiver apparatus 20 using the communication device 14. In step S24 of FIG. 10, the control circuit 21 of the power receiver apparatus 20 receives the control signal from the power transmitter apparatus 10 using the communication device 25, and according to the control signal, switches the switch circuit SW to supply the output voltage of the power receiver apparatus 20 to the load device 23 (that is, transition to the normal mode).

In step S19 of FIG. 9, the control circuit 11 of the power transmitter apparatus 10 starts power transmission in the normal mode using the voltage V0 and the switching frequency fst that are set in step S18.

When the power transmitter apparatus 10 is transmitting power to the power receiver apparatus 20, if the coupling coefficient k12 of the transmitting coil L1 and the receiving coil L2 changes, the stably transmitting frequency and the gain of the contactless power transmission system also change. In this case, the control circuit 11 of the power transmitter apparatus 10 redetermines the stably transmitting frequency and the transmitting voltage based on a present detected value of the output voltage of the power receiver apparatus 20, as described below.

In step S25 of FIG. 10, the control circuit 21 of the power receiver apparatus 20 detects the voltage V4 applied to the load device 23, using the voltage detector circuit 24, and notifies the power transmitter apparatus 10 of the voltage V4 using the communication device 25. In step S3 of FIG. 8, the control circuit 11 of the power transmitter apparatus 10 obtains a value of the voltage V4 from the power receiver apparatus 20 using the communication device 14.

In step S4 of FIG. 8, the control circuit 11 of the power transmitter apparatus 10 determines whether or not the detected value of the output voltage of the power receiver apparatus 20 has changed by a value larger than a predetermined threshold from the detected value obtained when determining the stably transmitting frequency and the transmitting voltage: if YES, the process returns to step S2; if NO, the process proceeds to step S5.

When the process returns from step S4 to step S2 of FIG. 8, the control circuit 11 of the power transmitter apparatus 10 again performs the power controlling process described with reference to FIG. 9. As described above, in step S11 of FIG. 9, the control circuit 11 of the power transmitter apparatus 10 transmits the control signal for requesting transition of the power receiver apparatus 20 to the test mode, to the power receiver apparatus 20 using the communication device 14. In step S26 of FIG. 10, the control circuit 21 of the power receiver apparatus 20 determines whether or not the control signal is received from the power transmitter apparatus 10: if YES, the process returns to step S22; if NO, the process proceeds to step S27.

When detecting an overvoltage in the power receiver apparatus 20, the power receiver apparatus 20 of FIG. 1 may protect the load device 23 from overvoltage using the load element R0 and the switch circuit SW, as described below.

In step S27 of FIG. 10, the control circuit 21 of the power receiver apparatus 20 determines whether or not the voltage V4 applied to the load device 23 exceeds a predetermined threshold: if YES, the process proceeds to step S28; if NO, the process proceeds to step S29. In step S28 of FIG. 10, the control circuit 21 of the power receiver apparatus 20 switches the switch circuit SW to supply the output voltage of power receiver apparatus 20 to the load element R0.

In step S29 of FIG. 10, the control circuit 21 of the power receiver apparatus 20 determines whether or not the load device 23 stops to operate: if YES, the process proceeds to step S30; if NO, the process returns to step S25. For example, in the case where the load device 23 is a rechargeable battery, the load device 23 may notify the control circuit 21 that the charging is completed, and the control circuit 21 may determine whether or not the load device 23 stops to operate, based on a signal from the load device 23. The load device 23 may start and stop to operate based on a user input, and the control circuit 21 may determine whether or not the load device 23 stops to operate, based on the user input.

In step S30 of FIG. 10, the control circuit 21 of the power receiver apparatus 20 transmits a control signal for requesting to stop the power transmission, to the power transmitter apparatus 10 using the communication device 25. In step S5 of FIG. 8, the control circuit 11 of the power transmitter apparatus 10 determines whether or not the power receiving device 20 has requested to stop the power supply: if YES, the process proceeds to step S6; if NO, the process returns to step S3. In step S6 of FIG. 8, the control circuit 11 of the power transmitter apparatus 10 stops the power transmission in the normal mode.

Operation Principle of First Embodiment

Now, the operation principle of the contactless power transmission system of FIG. 1 will be described with reference to FIGS. 13 and 14.

Figure 13:
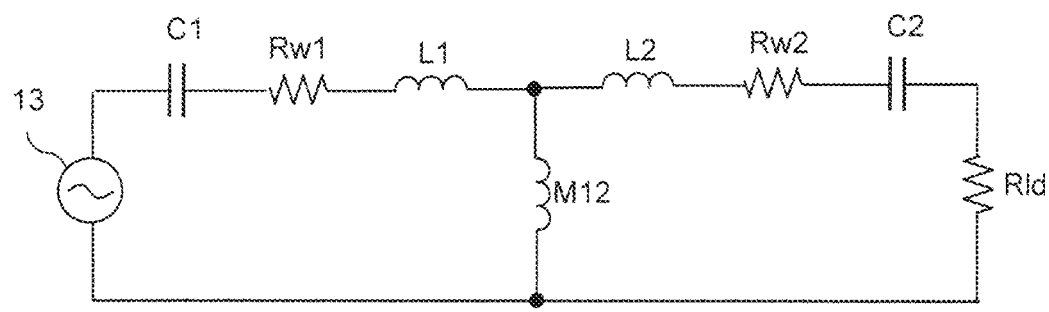
FIG. 13 is an equivalent circuit diagram illustrating a schematic configuration of the contactless power transmission system of FIG. 1.

FIG. 13 is an equivalent circuit diagram illustrating a schematic configuration of the contactless power transmission system of FIG. 1. With reference to the equivalent circuit diagram of FIG. 13 we will describe that the stably transmitting frequency and the gain of the contactless power transmission system depend on the coupling coefficient k12 of the transmitting coil L1 and the receiving coil L2. The transmitting coil L1 has a self-inductance (indicated by identical reference sign "L1") and a resistance Rw1, and the receiving coil L2 has a self-inductance (indicated by identical reference sign "L2") and a resistance Rw2. The transmitting coil L1 and the receiving coil L2 are coupled to each other at the coupling coefficient k12, and have a mutual inductance M12. A reference sign Rld indicates a load value of the power receiver apparatus 20 (that is, the load value of the load device 23 or the load element R0). The system of FIG. 13 is expressed by the following matrix F (also referred to as "F parameter" or "ABCD parameter").

$$F = \begin{bmatrix} a11 & a12 \\ a21 & a22 \end{bmatrix}$$ [Mathematical Expression 1]

$$= Fa \cdot Fb \cdot Fc \cdot Fd \cdot Fe \cdot Ff \cdot Fg$$

Here, Fa, Fb, Fc, Fd, Fe, Ff, and Fg respectively indicate transmission parameters of the capacitor C1, the resistance Rw1, the transmitting coil L1, the mutual inductance M12, the receiving coil L2, the resistance Rw2, and the capacitor C2 of FIG. 13 as follows.

$$Fa = \begin{bmatrix} 1 & \frac{1}{\omega \cdot C1} \\ 0 & 1 \end{bmatrix}$$ [Mathematical Expression 2]

$$Fb = \begin{bmatrix} 1 & Rw1 \\ 0 & 1 \end{bmatrix}$$ [Mathematical Expression 3]

$$Fc = \begin{bmatrix} 1 & \omega \cdot (1-k12) \cdot L1 \\ 0 & 1 \end{bmatrix}$$ [Mathematical Expression 4]

-continued $$Fd = \begin{bmatrix} 1 & 0 \\ \frac{1}{\omega \cdot k12 \cdot M12} & 1 \end{bmatrix}$$ [Mathematical Expression 5]

$$Fe = \begin{bmatrix} 1 & \omega \cdot (1-k12) \cdot L2 \\ 0 & 1 \end{bmatrix}$$ [Mathematical Expression 6]

$$Ff = \begin{bmatrix} 1 & Rw2 \\ 0 & 1 \end{bmatrix}$$ [Mathematical Expression 7]

$$Fg = \begin{bmatrix} 1 & \frac{1}{\omega \cdot C2} \\ 0 & 1 \end{bmatrix}$$ [Mathematical Expression 8]

In Mathematical Expressions 2 to 8, the switching frequency fsw is represented by "ω". The mutual inductance M12 of the transmitting coil L1 and the receiving coil L2 is represented as follows.

$$M12 = k12 \cdot \sqrt{L1 \cdot L2}$$ [Mathematical Expression 9]

The gain G1 of the system of FIG. 13 is expressed as follows.

$$G1 = \frac{1}{a11 + \frac{a12}{Rld}}$$ [Mathematical Expression 10]

Here, a11 and a12 are components of the matrix F of Mathematical Expression 1.

According to Mathematical Expressions 1 to 10, it can be seen that the gain G1 varies depending on the switching frequency ω, and the frequency characteristics of the gain G1 vary depending on the coupling coefficient k12. Accordingly, the stably transmitting frequency (that is, the frequency at which the dependency of the gain G1 on the load value Rld of the power receiver apparatus 20 is minimized) varies depending on the coupling coefficient k12. In particular, according to Mathematical Expression 10, by minimizing the absolute value of a12, preferably, setting the absolute value of a12 to 0, it is possible to minimize or remove the dependency of the gain G1 on the load value Rld of the power receiver apparatus 20. Accordingly, the switching frequency ω is determined so as to satisfy a12=0, or at least minimize the absolute value of a12.

The gain G1 is also expressed as G1=V5/V0, where the voltage V0 is a known value, and the voltage V5 is a detected value. As described above, the gain of the contactless power transmission system in the normal mode is considered to be equivalent to the gain of the contactless power transmission system in the test mode. Therefore, the voltage V0 outputted from the AC/DC converter 12 in the normal mode is determined so as to apply the required voltage V4 to the load device 23 based on the gain G1=V5/V0 in the test mode.

Figure 14:
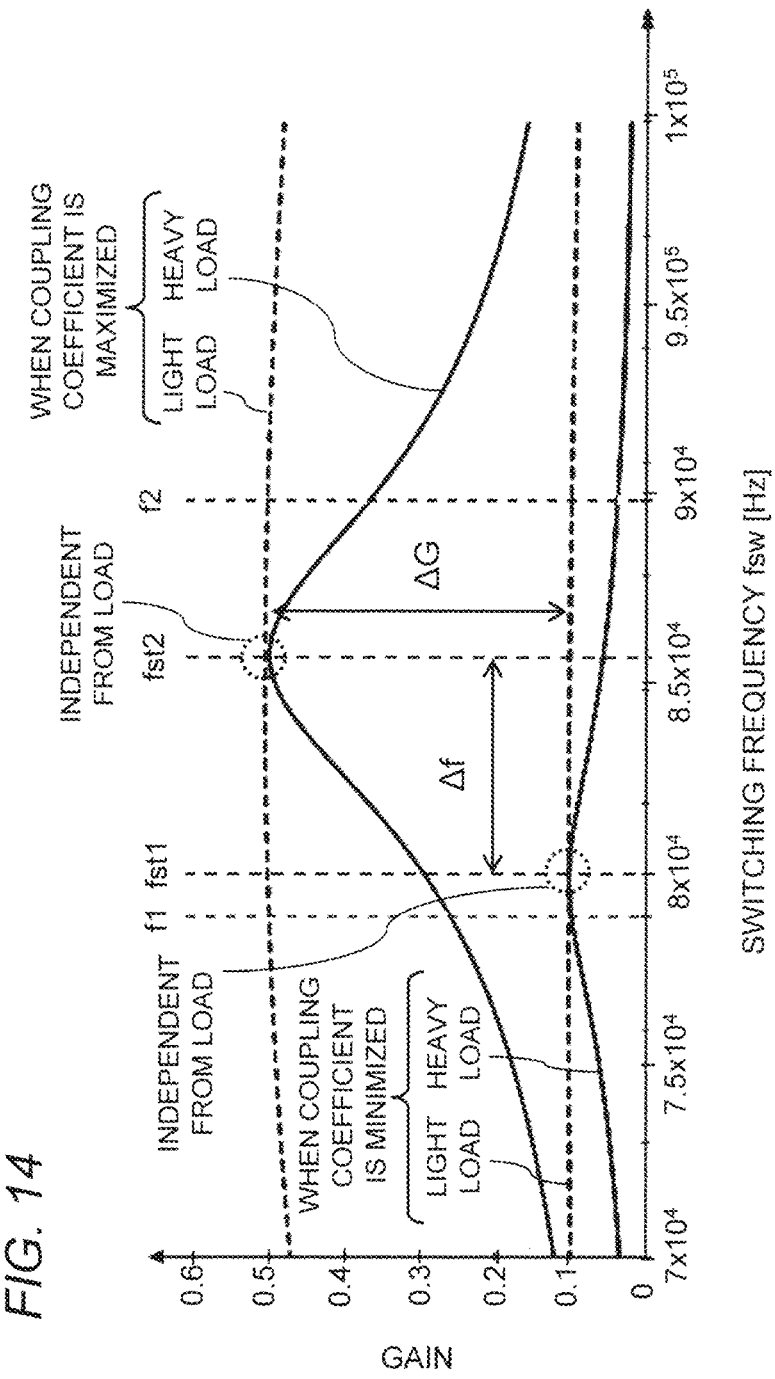
FIG. 14 is a diagram for explaining how to determine capacitances of capacitors C1, C2 of FIG. 1.

FIG. 14 is a diagram for explaining how to determine capacitances of the capacitors C1, C2 of FIG. 1. The switching frequency fsw of the inverter 13 of the contactless power transmission system is limited to the predetermined frequency range f1 to f2 by relevant regulations. For example, in the case of a contactless power transmission system using an 85 kHz band, the switching frequency fsw is limited to 79 to 90 kHz. The stably transmitting frequency of the contactless power transmission system varies in accordance with the coupling coefficient k12 of the transmitting coil L1 and the receiving coil L2, and varies in accordance with the capacitances of the capacitors C1, C2.

In order to operate the contactless power transmission system at the stably transmitting frequency, the capacitances of the capacitors C1, C2 are determined as follows. At first, the distance between the transmitting coil L1 and the receiving coil L2 is changed so as to be capable of transmitting power from the power transmitter apparatus 10 to the power receiver apparatus 20, and the coupling coefficient k12 and the self-inductance are calculated or measured when the distance between the transmitting coil L1 and the receiving coil L2 is maximized and minimized. Here, in the case where the windings of transmitting coil L1 and receiving coil L2 are wound around the magnetic cores, the self-inductances of the transmitting coil L1 and the receiving coil L2 vary depending on the coupling coefficient k12 (that is, depending on the distance between the transmitting coil L1 and the receiving coil L2). The mutual inductance M12 may be calculated or measured instead of the coupling coefficient k12 of the transmitting coil L1 and the receiving coil L2. Next, the frequency characteristics of the gain of the contactless power transmission system are calculated, for example, using Mathematical Expressions 1 to 10, based on the calculated or measured coupling coefficient k12 and self-inductance of the transmitting coil L1 and the receiving coil L2.

In the example of FIG. 14, when the distance between the transmitting coil L1 and the receiving coil L2 is maximized (that is, when the coupling coefficient k12 is minimized), the contactless power transmission system has a stably transmitting frequency fst1. When the distance between the transmitting coil L1 and the receiving coil L2 is minimized (that is, when the coupling coefficient k12 is maximized), the contactless power transmission system has a stably transmitting frequency fst2.

The capacitances of the capacitors C1, C2 are determined such that both the stable transmission frequencies fst1 and fst2 are included in the frequency ranges f1 to f2. The capacitances of the capacitors C1, C2 are set to be, for example, different from each other.

By determining the capacitances of the capacitors C1, C2 as described with reference to FIG. 14, it is possible to at least locally minimize the dependency of the output voltage of the power receiver apparatus 20 on the load value of the power receiver apparatus 20, at a certain switching frequency fst.

Modified Embodiment of First Embodiment

Figure 15:
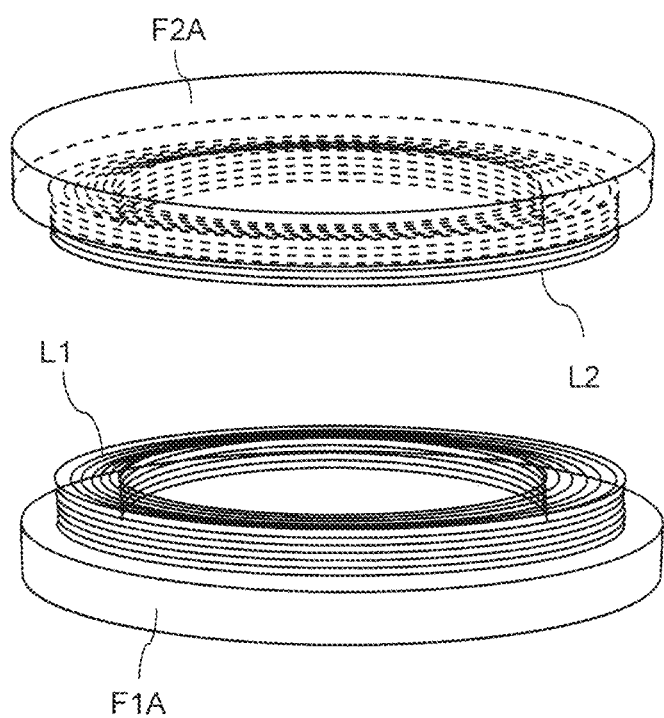
FIG. 15 is a perspective view illustrating another arrangement of the transmitting coil L1 and the receiving coil L2 of FIG. 1.

FIG. 15 is a perspective view illustrating another arrangement of the transmitting coil L1 and the receiving coil L2 of FIG. 1. The transmitting coil L1 and the receiving coil L2 are not limited to being wound around the magnetic cores F1, F2 as illustrated in FIG. 7, and may be arranged, for example, near magnetic bodies F1A, F2A as illustrated in FIG. 15, or may be arranged in other forms.

Figure 16:
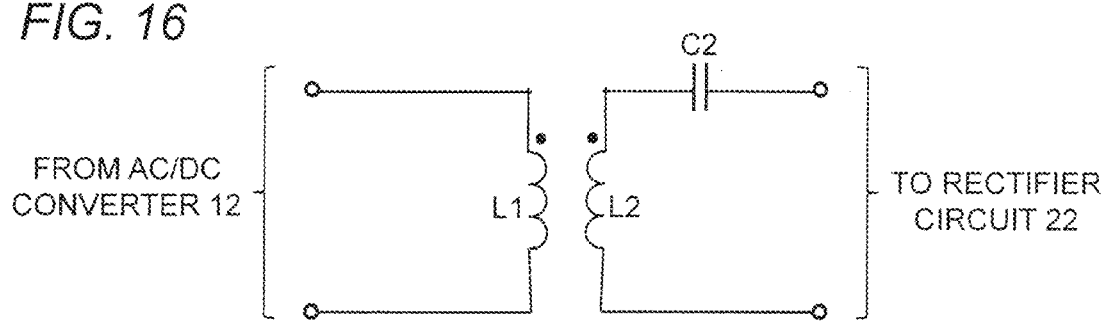
FIG. 16 is a diagram illustrating a configuration with the capacitor C1 of the power transmitter apparatus 10 of FIG. 1 removed.
Figure 17:
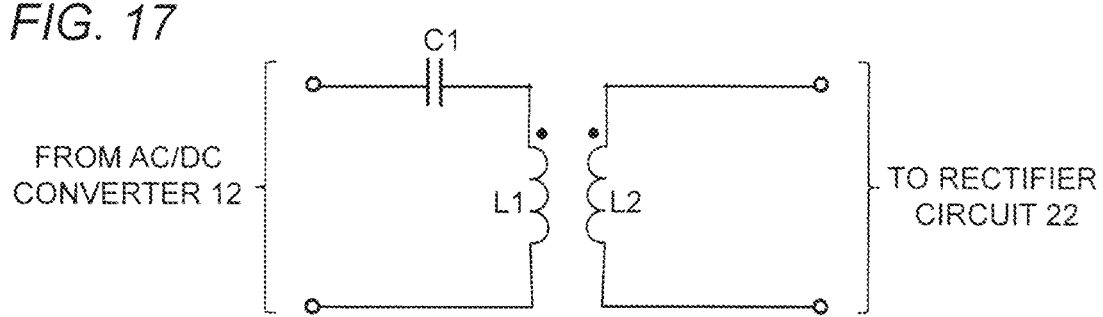
FIG. 17 is a diagram illustrating a configuration with the capacitor C2 of the power receiver apparatus 20 of FIG. 1 removed.

FIG. 16 is a diagram illustrating a configuration with the capacitor C1 of the power transmitter apparatus 10 of FIG. 1 removed. FIG. 17 is a diagram illustrating a configuration with the capacitor C2 of the power receiver apparatus 20 of FIG. 1 removed. One capacitor of the power transmitter apparatus 10 and the power receiver apparatus 20 may be removed, as long as the stably transmitting frequency of the contactless power transmission system is included within the predetermined frequency range f1 to f2 (that is, the range of the switching frequency fsw of the inverter 13, which is limited by the relevant regulations). As a result, it is possible to reduce the number of components of the power transmitter apparatus 10 or the power receiver apparatus 20.

Figure 18:
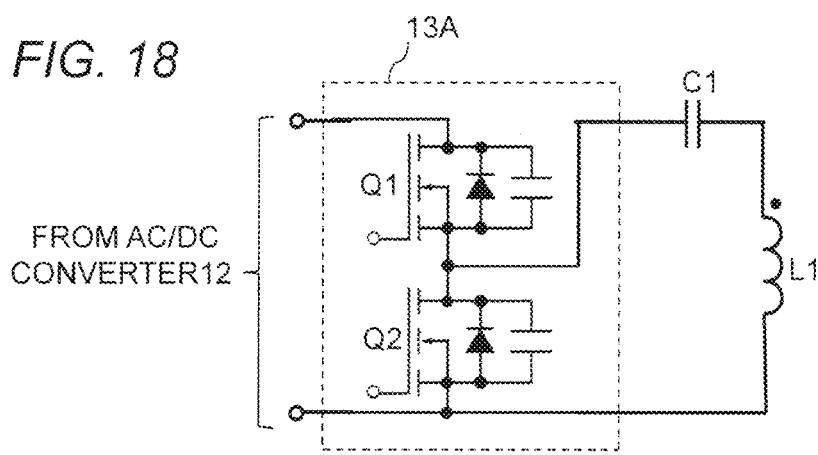
FIG. 18 is a circuit diagram illustrating a modified embodiment of the inverter 13 of FIG. 1.

FIG. 18 is a circuit diagram illustrating a modified embodiment of the inverter 13 of FIG. 1. The power transmitter apparatus 10 of FIG. 1 may be provided with a half-bridge inverter 13A of FIG. 18, instead of the full-bridge inverter 13 of FIG. 5. The inverter 13A includes two switching elements Q1, Q2. By providing the half-bridge inverter 13A, it is possible to reduce the number of components of the power transmitter apparatus 10.

On the other hand, by providing the full-bridge inverter 13 of FIG. 5, it is possible to increase the amplitude of the voltage V1 applied to the transmitting coil L1 twice as large as that of using the half-bridge inverter 13A. Accordingly, it is possible to reduce the amplitude of the voltage V0 outputted from the AC/DC converter 12 by half that of using the half-bridge inverter 13A.

Figure 19:
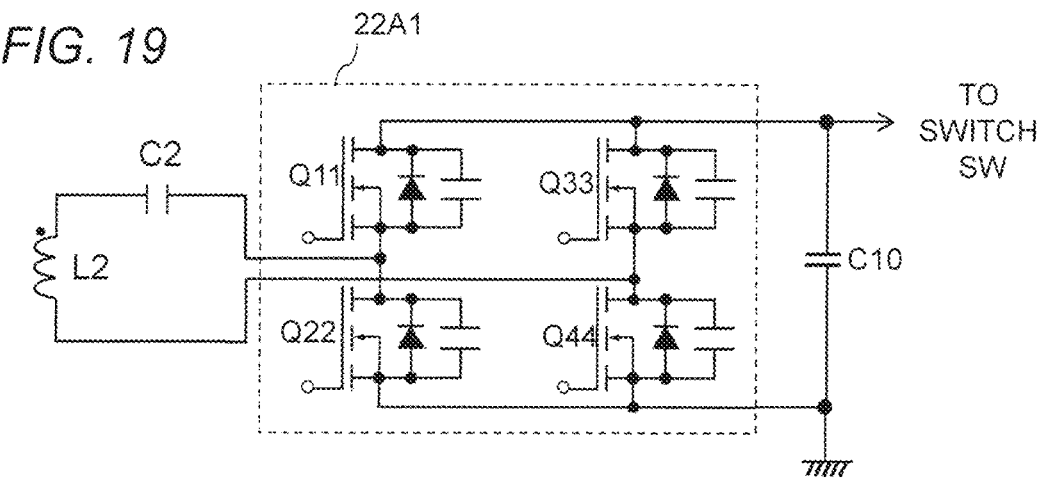
FIG. 19 is a circuit diagram illustrating a first modified embodiment of the rectifier circuit 22 of FIG. 1.

FIG. 19 is a circuit diagram illustrating a first modified embodiment of the rectifier circuit 22 of FIG. 1. The power receiver apparatus 20 of FIG. 1 may be provided with a rectifier circuit 22A1 including switching elements Q11 to Q14 of FIG. 19, instead of the rectifier circuit 22 including the diodes D1 to D4 of FIG. 6. The switching elements Q11 to Q14 are, for example, field effect transistors to be turned on and off by the control circuit 21 or other circuits. The rectifier circuit 22A1 operates as a synchronous rectifier circuit. By using the rectifier circuit 22A1 operable as the synchronous rectifier circuit, it is expected to improve the overall power conversion efficiency of the contactless power transmission system.

Figure 20:
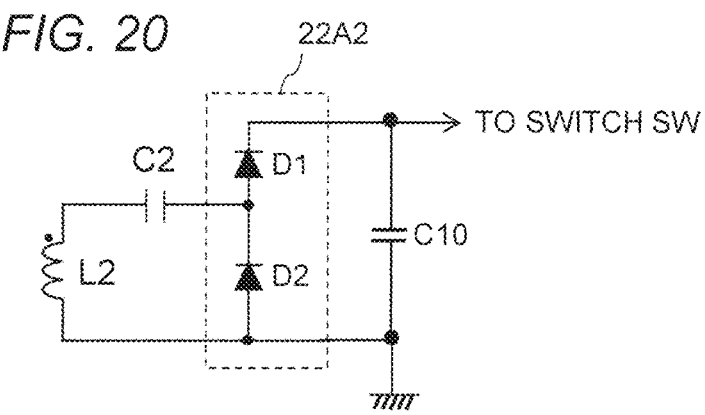
FIG. 20 is a circuit diagram illustrating a second modified embodiment of the rectifier circuit 22 of FIG. 1.

FIG. 20 is a circuit diagram illustrating a second modified embodiment of the rectifier circuit 22 of FIG. 1. The power receiver apparatus 20 of FIG. 1 may be provided with a rectifier circuit 22A2 of FIG. 20 as a voltage-doubler rectifier circuit including diodes D1 to D2, instead of the rectifier circuit 22 of FIG. 6 as the full-wave rectifier circuit including diodes D1 to D4. By providing the rectifier circuit 22A2 as the voltage-doubler rectifier circuit, the voltage applied to the load device 23 is increased twice as large as that of using the rectifier circuit 22 as the full-wave rectifier circuit. Accordingly, it is possible to reduce the amplitude of the voltage V0 outputted from the AC/DC converter 12 by half that of using the rectifier circuit 22 as the full-wave rectifier circuit.

Figure 21:
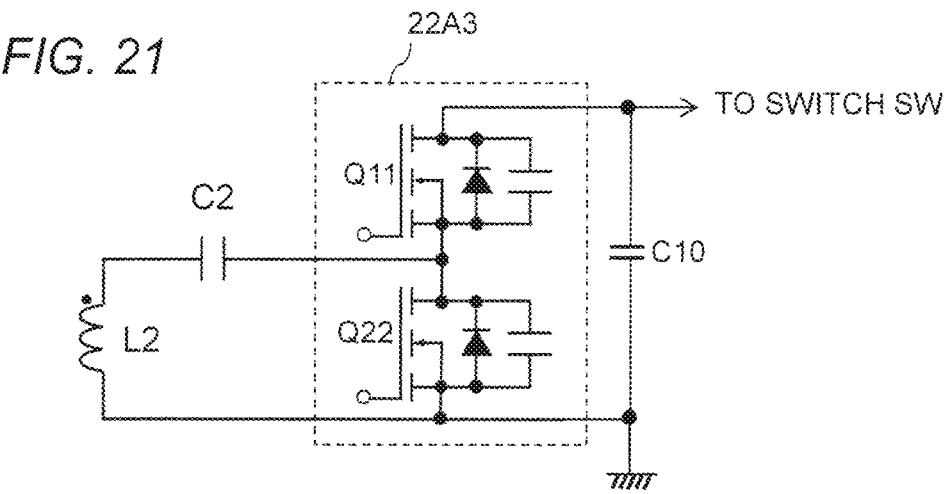
FIG. 21 is a circuit diagram illustrating a third modified embodiment of the rectifier circuit 22 of FIG. 1.

FIG. 21 is a circuit diagram illustrating a third modified embodiment of the rectifier circuit 22 of FIG. 1. The power receiver apparatus 20 of FIG. 1 may be provided with a rectifier circuit 22A3 of FIG. 21 as a voltage-doubler rectifier circuit including switching elements Q11, Q12, instead of the rectifier circuit 22 of FIG. 6 as the full-wave rectifier circuit including diodes D1 to D4. The rectifier circuit 22A3 operates as a synchronous rectifier circuit. By providing the rectifier circuit 22A3 as the voltage-doubler rectifier circuit, the voltage applied to the load device 23 is increased twice as large as that of using the rectifier circuit 22A1 as the full-wave rectifier circuit. Accordingly, it is possible to reduce the amplitude of the voltage V0 outputted from the AC/DC converter 12 by half that of using the rectifier circuit 22A1 as the full-wave rectifier circuit.

Advantageous Effects of First Embodiment

According to the contactless power transmission system of the first embodiment, the stably transmitting frequency and the transmitting voltage are determined based on the voltage V5 applied to the load element R0. By setting the switching frequency fsw of the inverter 13 to the stably transmitting frequency, it is not required to control the power transmitter apparatus 10 and/or the power receiver apparatus 20 in accordance with the variations of the load value of the load device 23. Even when the load value of the load device 23 changes, it is possible to stably supply the load device 23 with its required voltage, without changing the voltage V0 outputted from the AC/DC converter 12, nor changing the switching frequency fsw. Since it is not necessary to provide the power receiver apparatus 20 with a DC/DC converter or the like in order to supply the load device 23 with its required voltage, it is possible to provide a small-sized, lightweight, and low-cost power receiver apparatus operable with high efficiency.

According to the contactless power transmission system of the first embodiment, it is not necessary to change the voltage V0 outputted from the AC/DC converter 12, and the switching frequency fsw of the inverter 13, as long as the coupling coefficient k12 of the transmitting coil L1 and the receiving coil L2 does not change. As a result, the voltage V0 and the switching frequency fsw are changed less frequently. Therefore, it is less likely to be affected by a delay due to monitoring of the load value of the load device 23 and real-time feedback from the power receiver apparatus 20 to the power transmitter apparatus 10, and it is possible to stably supply the load device 23 with its required voltage.

According to the contactless power transmission system of the first embodiment, it is possible to accurately determine the stably transmitting frequency using the load element R0 having the predetermined load value.

According to the contactless power transmission system of the first embodiment, it is possible to easily determine the stably transmitting frequency by determining the switching frequency fst at which the voltage V0 applied to the load element R0 is locally maximized.

According to the contactless power transmission system of the first embodiment, when the detected value of the output voltage of the power receiver apparatus 20 significantly changes, it is possible to follow the change in the coupling coefficient k12 of the transmitting coil L1 and the receiving coil L2, by redetermining the stably transmitting frequency and the transmitting voltage based on a present detected value of the output voltage of the power receiver apparatus 20.

According to the contactless power transmission system of the first embodiment, it is possible to the load device 23 from overvoltage using the load element R0 and the switch circuit SW.

According to the contactless power transmission system of the first embodiment, it is possible to improve the transmission efficiency and the transmission distance using the resonance of the receiving coil L2 and the capacitor C2.

As described above, according to the contactless power transmission system of the first embodiment, it is possible to control the power transmitter apparatus 10 to stably supply the load device 23 with its required voltage, without need of an extra circuit in the power receiver apparatus 20.

Second Embodiment

According to a contactless power transmission system of the second embodiment, a power receiver apparatus is provided with two load elements having predetermined load values different from each other, and a stably transmitting frequency a the transmitting voltage are determined based on voltages applied to the load elements.

Configuration Example of Second Embodiment

Figure 22:
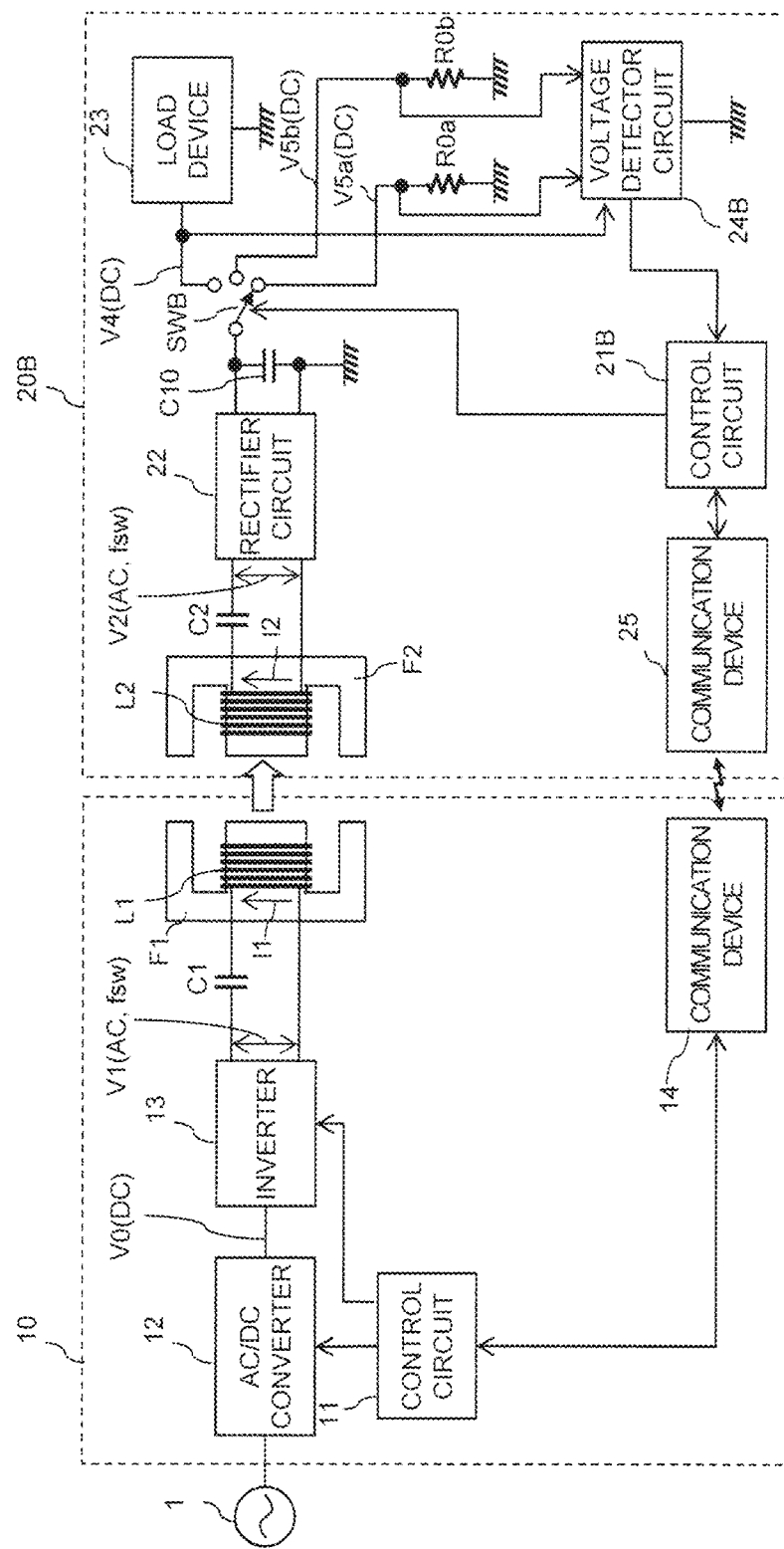
FIG. 22 is a block diagram illustrating a configuration of a contactless power transmission system according to a second embodiment.

FIG. 22 is a block diagram illustrating a configuration of a contactless power transmission system according to the second embodiment. The contactless power transmission system of FIG. 22 includes the power transmitter apparatus 10 and a power receiver apparatus 20B.

The power transmitter apparatus 10 of FIG. 22 is configured and operates in a manner similar to that of the power transmitter apparatus 10 of FIG. 1, except for performing power controlling process to be described below with reference to FIGS. 23 to 25.

The power receiver apparatus 20B includes a control circuit 21B, a voltage detector circuit 24B, load elements R0a, R0b, and a switch circuit SWB, instead of the control circuit 21, the voltage detector circuit 24, the load element R0, and the switch circuit SW of FIG. 1.

The control circuit 21B controls overall operations of the power receiver apparatus 20B. In particular, the control circuit 21B controls the switch circuit SWB as described below. The control circuit 21B includes a CPU, a RAM, a ROM, and the like, and performs power receiving process to be described below with reference to FIG. 26.

The voltage outputted from the rectifier circuit 22 is selectively supplied to one of the load device 23, the load element R0a, and the load element R0b, through the switch circuit SWB operating under the control of the control circuit 21B. The load element R0a has a predetermined load value (also referred to as "first load value" or "light load"), and the load element R0b has a load value larger than the load value of the load element R0a (also referred to as "second load value" or "heavy load"). The power receiver apparatus 20B has a normal mode in which the voltage outputted from the rectifier circuit 22 is supplied to the load device 23, and a test mode A in which the voltage outputted from the rectifier circuit 22 is supplied to the load element R0a, and a test mode B in which the voltage outputted from the rectifier circuit 22 is supplied to the load element R0b.

In this specification, the load element R0a is also referred to as a "first load element", and the load element R0b is also referred to as a "second load element".

The voltage detector circuit 24B detects a voltage V5a applied to the load element R0a, and a voltage V5b applied to the load element R0b, as output voltages of the power receiver apparatus 20B.

The control circuit 21B transmits the voltages V5a, V5v detected by the voltage detector circuit 24B, to the power transmitter apparatus 10 using the communication device 25.

When determining the voltage V0 and the switching frequency fsw, the control circuit 11 of the power transmitter apparatus 10 transmits a control signal for requesting transition to the test mode A, and a control signal for requesting transition to the test mode B, to the power receiver apparatus 20B using the communication device 14. On the other hand, when performing normal power transmission for supplying power to the load device 23, the control circuit 11 transmits a control signal for requesting transition to the normal mode, to the power receiver apparatus 20B using the communication device 14.

The control circuit 21B of the power receiver apparatus 20B receives the control signal requesting the transition to the test mode A, the transition to the test mode B, or the transition to the normal mode, from the power transmitter apparatus 10 using the communication device 25. When receiving the control signal requesting the transition to the test mode A, the control circuit 21B switches the switch circuit SWB to supply the output voltage of power receiver apparatus 20B to the load element R0a. In this case, the voltage V5a is applied to the load element R0a. When receiving the control signal requesting the transition to the test mode B, the control circuit 21B switches the switch circuit SWB to supply the output voltage of power receiver apparatus 20B to the load element R0b. In this case, the voltage V5b is applied to the load element R0b. When receiving the control signal requesting the transition to the normal mode, the control circuit 21B switches the switch circuit SWB to supply the output voltage of power receiver apparatus 20B to the load device 23. In this case, the voltage V4 is applied to the load device 23.

In the other aspects, the power receiver apparatus 20B is configured and operates in a manner similar to that of the power receiver apparatus 20 of FIG. 1.

Operation Example of Second Embodiment

Figure 23:
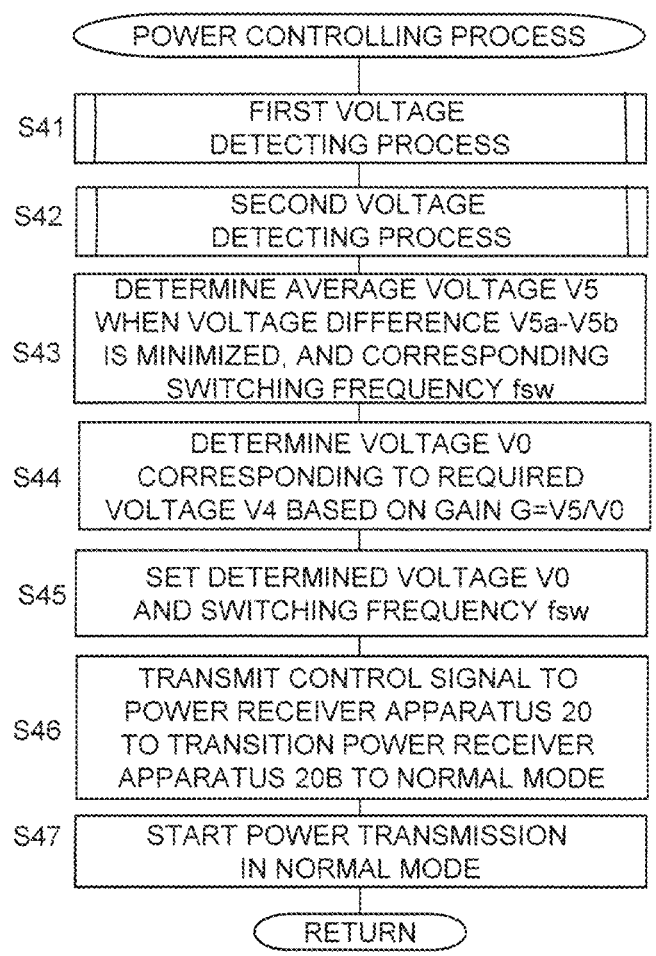
FIG. 23 is a flowchart illustrating subroutine of power controlling process performed by a control circuit 11 of the power transmitter apparatus 10 of FIG. 22.

FIG. 23 is a flowchart illustrating subroutine of power controlling process performed by the control circuit 11 of the power transmitter apparatus 10 of FIG. 22. FIG. 24 is a flowchart illustrating a subroutine of step S41 of FIG. 23. FIG. 25 is a flowchart illustrating a subroutine of step S42 of FIG. 23. FIG. 26 is a flowchart illustrating power receiving process performed by the control circuit 21B of the power receiver apparatus 20B of FIG. 22.

The control circuit 11 of the power transmitter apparatus 10 of FIG. 22 performs power transmitting process similar to that of FIG. 8. However, in step S2 of FIG. 8, the control circuit 11 of the power transmitter apparatus 10 performs power controlling process of FIG. 23, instead of the power controlling process of FIG. 9.

For example, when the power receiver apparatus 20B is disposed at a position capable of receiving power from the power transmitter apparatus 10, the power transmitting process and the power receiving process are started. In step S71 of FIG. 26, the control circuit 21B of the power receiver apparatus 20B transmits a control signal for requesting power supply, to the power transmitter apparatus 10 using the communication device 25. In step S1 of FIG. 8, the control circuit 11 of the power transmitter apparatus 10 receives the control signal for requesting power supply, from the power receiver apparatus 20B using the communication device 14.

In step S2 of FIG. 8, the control circuit 11 of the power transmitter apparatus 10 performs the power controlling process of FIG. 23, as described above.

In step S41 of FIG. 23, the control circuit 11 of the power transmitter apparatus 10 performs first voltage detecting process.

Figure 24:
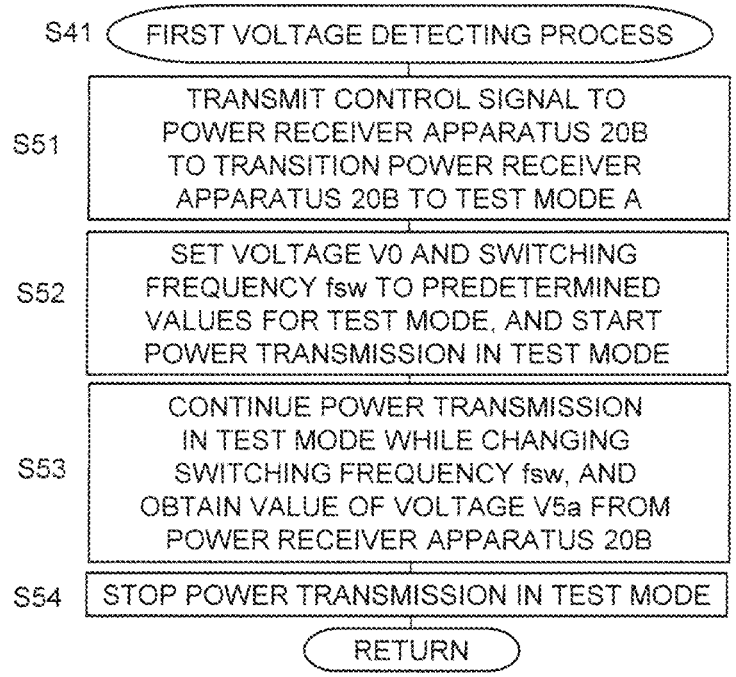
FIG. 24 is a flowchart illustrating subroutine of step S41 of FIG. 23.

In step S51 of FIG. 24, the control circuit 11 of the power transmitter apparatus 10 transmits a control signal for requesting transition of the power receiver apparatus 20B to the test mode A, to the power receiver apparatus 20B using the communication device 14. In step S72 of FIG. 26, the control circuit 21B of the power receiver apparatus 20B receives the control signal from the power transmitter apparatus 10 using the communication device 25, and according to the control signal, switches the switch circuit SWB to supply the output voltage of the power receiver apparatus 20B to the load element R0a (that is, transition to the test mode A).

In step S52 of FIG. 24, the control circuit 11 of the power transmitter apparatus 10 sets the voltage V0 and the switching frequency fsw to predetermined values for the test mode, and starts power transmission in the test mode. The predetermined values of the voltage V0 and the switching frequency fsw are common to the test modes A and B, and for example, set similarly to those described in step S2 of FIG. 9. In step S73 of FIG. 26, the control circuit 21B of the power receiver apparatus 20B detects the voltage V5a applied to the load element R0a, using the voltage detector circuit 24B, and notifies the power transmitter apparatus 10 of the voltage V5a using the communication device 25.

In step S53 of FIG. 24, the control circuit 11 of the power transmitter apparatus 10 continues the power transmission in the test mode while changing the switching frequency fsw, and obtains the value of the voltage V5a from the power receiver apparatus 20B using the communication device 14. As a result, when the output voltage of the power receiver apparatus 20B is supplied to the load element R0a, the control circuit 11 of the power transmitter apparatus 10 obtains the voltage V5a indicating the frequency characteristics of the output voltage of the power receiver apparatus 20B, based on the detected value of the output voltage of the power receiver apparatus 20B.

In step S54 of FIG. 24, the control circuit 11 of the power transmitter apparatus 10 stops the power transmission in the test mode.

In step S42 of FIG. 23, the control circuit 11 of the power transmitter apparatus 10 performs second voltage detecting process.

Figure 25:
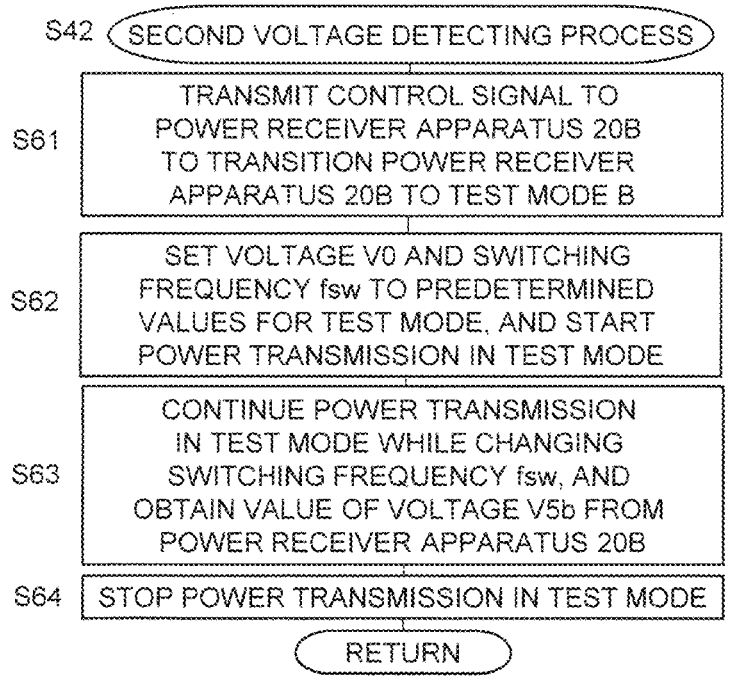
FIG. 25 is a flowchart illustrating subroutine of step S42 of FIG. 23.
Figure 26:
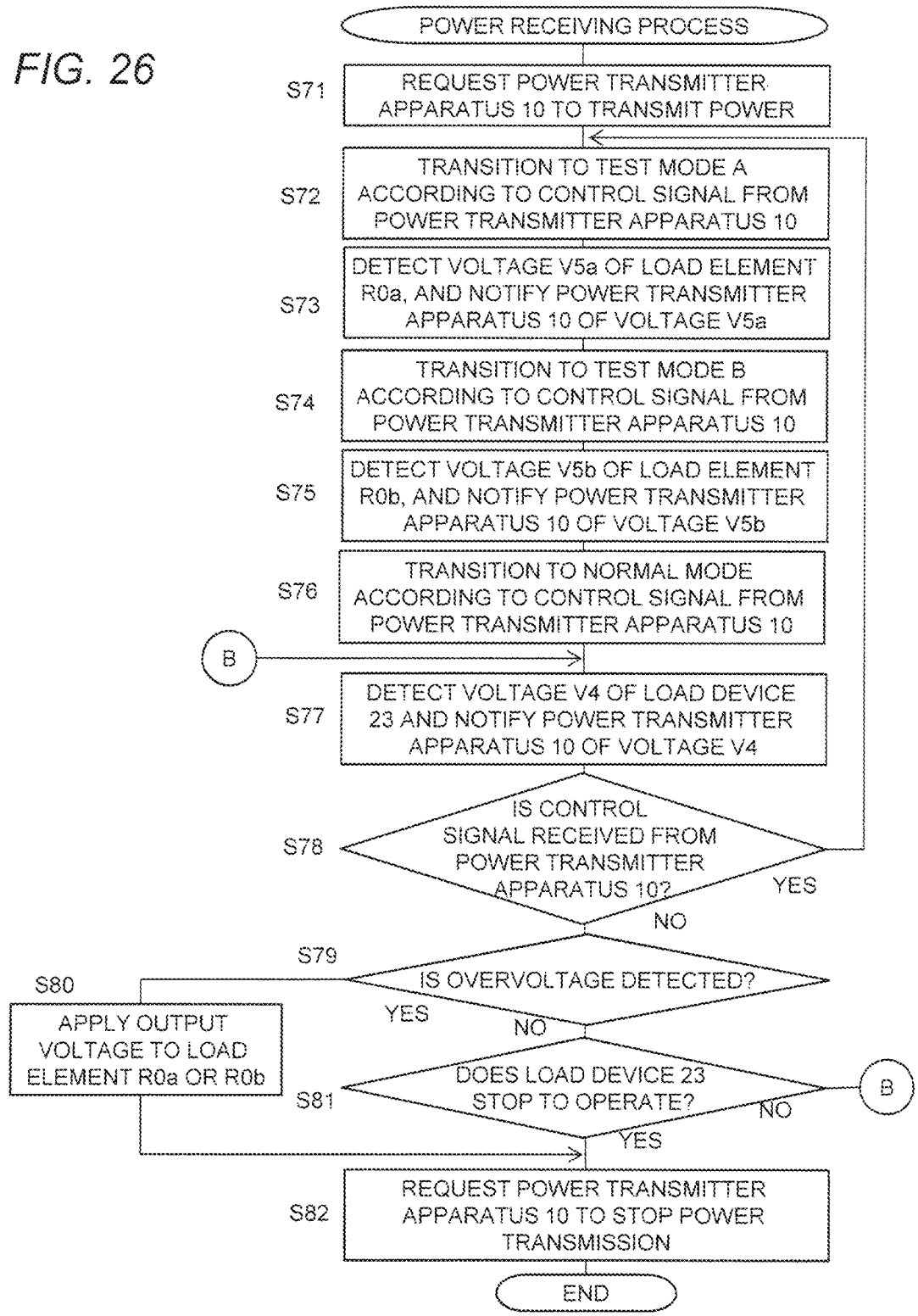
FIG. 26 is a flowchart illustrating power receiving process performed by a control circuit 21B of the power receiver apparatus 20B of FIG. 22.

In step S61 of FIG. 25, the control circuit 11 of the power transmitter apparatus 10 transmits a control signal for requesting transition of the power receiver apparatus 20B to the test mode B, to the power receiver apparatus 20B using the communication device 14. In step S74 of FIG. 26, the control circuit 21B of the power receiver apparatus 20B receives the control signal from the power transmitter apparatus 10 using the communication device 25, and according to the control signal, switches the switch circuit SWB to supply the output voltage of the power receiver apparatus 20B to the load element R0b (that is, transition to the test mode B).

In step S62 of FIG. 25, the control circuit 11 of the power transmitter apparatus 10 sets the voltage V0 and the switching frequency fsw to predetermined values for the test mode, and starts power transmission in the test mode. In step S75 of FIG. 26, the control circuit 21B of the power receiver apparatus 20B detects the voltage V5b applied to the load element R0b, using the voltage detector circuit 24B, and notifies the power transmitter apparatus 10 of the voltage V5b using the communication device 25.

In step S63 of FIG. 25, the control circuit 11 of the power transmitter apparatus 10 continues the power transmission in the test mode while changing the switching frequency fsw, and obtains the value of the voltage V5a from the power receiver apparatus 20B using the communication device 14. As a result, when the output voltage of the power receiver apparatus 20B is supplied to the load element Rob, the control circuit 11 of the power transmitter apparatus 10 obtains the voltage V5b indicating the frequency characteristics of the output voltage of the power receiver apparatus 20B, based on the detected value of the output voltage of the power receiver apparatus 20B.

In step S64 of FIG. 25, the control circuit 11 of the power transmitter apparatus 10 stops the power transmission in the test mode.

In step S43 of FIG. 23, the control circuit 11 of the power transmitter apparatus 10 determines an average voltage V5 when a voltage difference V5a-V5b is minimized, and a corresponding switching frequency fst.

Figure 27:
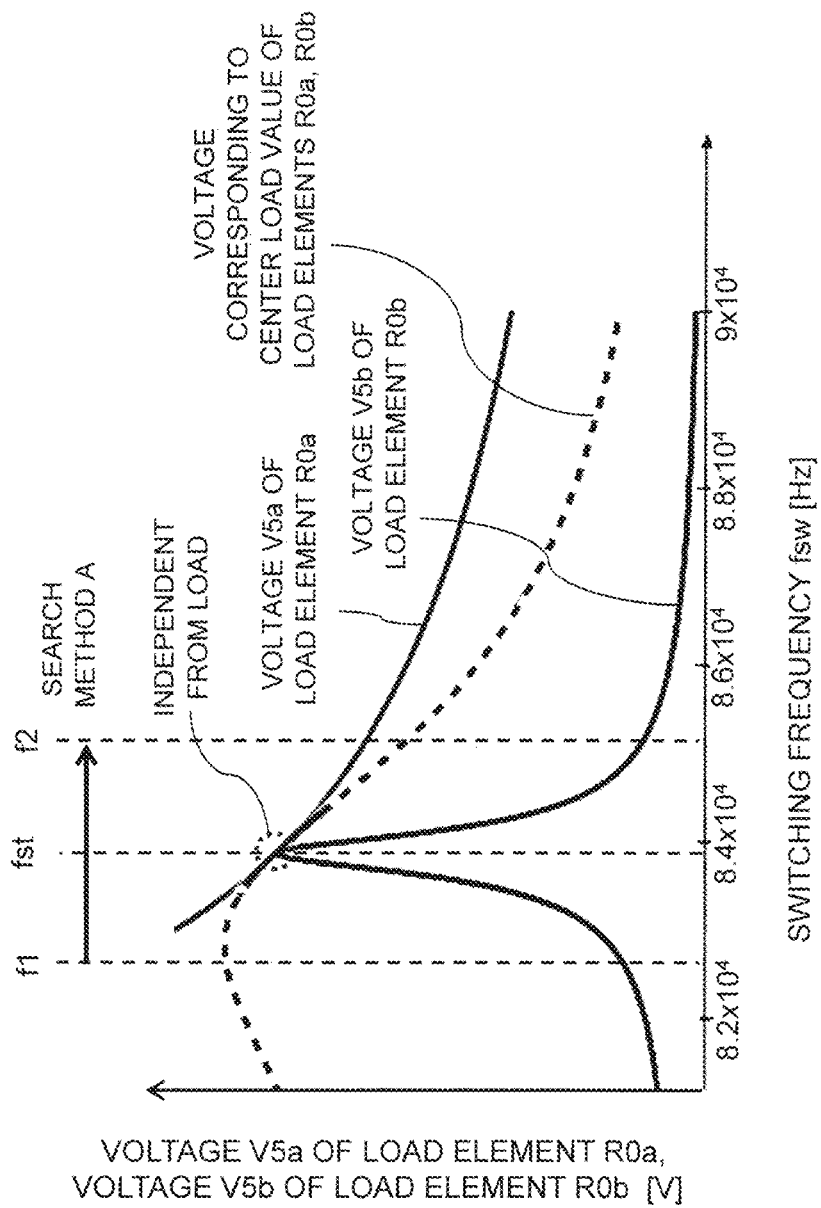
FIG. 27 is a diagram for explaining determination of a voltage V5 and a switching frequency fsw in step S43 of FIG. 23.

FIG. 27 is a diagram for explaining determination of the voltage V5 and the switching frequency fsw in step S43 of FIG. 23. As illustrated in FIGS. 3 and 12 and others, the first embodiment has been described for the case where the stably transmitting frequency matches the switching frequency fsw at which the output voltage of the power receiver apparatus 20B is locally maximized. However, the stably transmitting frequency does not necessarily match the switching frequency fsw at which the output voltage of the power receiver apparatus 20B is locally maximized. In the example of FIG. 27, the switching frequency fst is the stably transmitting frequency. It should be noted that when the output voltage of the power receiver apparatus 20B is applied to the load element R0b, the output voltage of the power receiver apparatus 20B is locally maximized at the switching frequency fst, and on the other hand, when the output voltage of the power receiver apparatus 20B is applied to the load element R0a, the output voltage of the power receiver apparatus 20B is not a local maximum at the switching frequency fst.

According to the second embodiment, in order to determine the stably transmitting frequency even under such conditions, the two load elements R0a and R0b having different load values are provided, and the frequency characteristics of the output voltage of the power receiver apparatus 20B are obtained using the two test modes A and B. In step S43 of FIG. 23, the control circuit 11 of the power transmitter apparatus 10 determines the switching frequency fst at which the voltage difference V5a-V5b is minimized, as the stably transmitting frequency.

In step S43 of FIG. 23, the control circuit 11 of the power transmitter apparatus 10 may determine an arbitrary voltage between the voltages V5a and V5b, instead of the average voltage V5 when the voltage difference V5a-V5b is minimized.

In step S44 in FIG. 23, the control circuit 11 of the power transmitter apparatus 10 determines the voltage V0 outputted from the AC/DC converter 12 corresponding to the required voltage V4 of the load device 23, as the transmitting voltage, based on the gain G=V5/V0 of the contactless power transmission system.

In step S45 of FIG. 23, the control circuit 11 of the power transmitter apparatus 10 sets the voltage V0 determined in step S44, to the AC/DC converter 12, and sets the switching frequency fst determined in step S43, to the inverter 13.

In step S46 of FIG. 23, the control circuit 11 of the power transmitter apparatus 10 transmits a control signal for requesting transition of the power receiver apparatus 20B to the normal mode, to the power receiver apparatus 20B using the communication device 14. In step S76 of FIG. 26, the control circuit 21B of the power receiver apparatus 20B receives the control signal from the power transmitter apparatus 10 using the communication device 25, and according to the control signal, switches the switch circuit SWB to supply the output voltage of the power receiver apparatus 20B to the load device 23 (that is, transition to the normal mode).

In step S47 of FIG. 23, the control circuit 11 of the power transmitter apparatus 10 starts power transmission in the normal mode using the voltage V0 and the switching frequency fst that are set in step S45.

Thereafter, the control circuit 11 of the power transmitter apparatus 10 performs steps S3 to S6 of FIG. 8 in a manner similar to that of the first embodiment. The control circuit 21B of the power receiver apparatus 20B performs steps S77 to S82 of FIG. 26. Steps S77 to S82 of FIG. 26 are substantially similar to steps S25 to S30 of FIG. 8. However, in step S80 of FIG. 26, the control circuit 21B of the power receiver apparatus 20B switches the switch circuit SWB to supply the output voltage of power receiver apparatus 20B to one of the load element R0a and the load element R0b. In order to more surely protect the load device 23 from overvoltage, the control circuit 21B of the power receiver apparatus 20B may switch the switch circuit SWB to supply the output voltage of the power receiver apparatus 20B to the load element R0b having a load value larger than the load value of the load element R0a.

Advantageous Effects of Second Embodiment

According to the contactless power transmission system of the second embodiment, the two load elements R0a and R0b having load values different from each other are provided, and the stably transmitting frequency and the transmitting voltage are determined based on the voltages applied to the load elements R0a and R0b. As a result, even when the stably transmitting frequency does not match the switching frequency fsw at which the output voltage of the power receiver apparatus 20B is locally maximized, it is possible to appropriately determine the stably transmitting frequency and the transmitting voltage.

According to the contactless power transmission system of the second embodiment, by using the two test modes A and B, it is possible to more accurately determine the stably transmitting frequency and the transmitting voltage than the first embodiment.

According to the contactless power transmission system of the second embodiment, the power receiver apparatus may be provided with three or more load elements having load values different from each other, and the stably transmitting frequency and the transmitting voltage may be determined based on voltages applied to the load elements. By using more test modes, it is possible to more accurately determine the stably transmitting frequency and the transmitting voltage.

Third Embodiment

A contactless power transmission system of the third embodiment determines a stably transmitting frequency and a transmitting voltage based on a voltage applied to the load device having a variable load value.

Configuration Example of Third Embodiment

Figure 28:
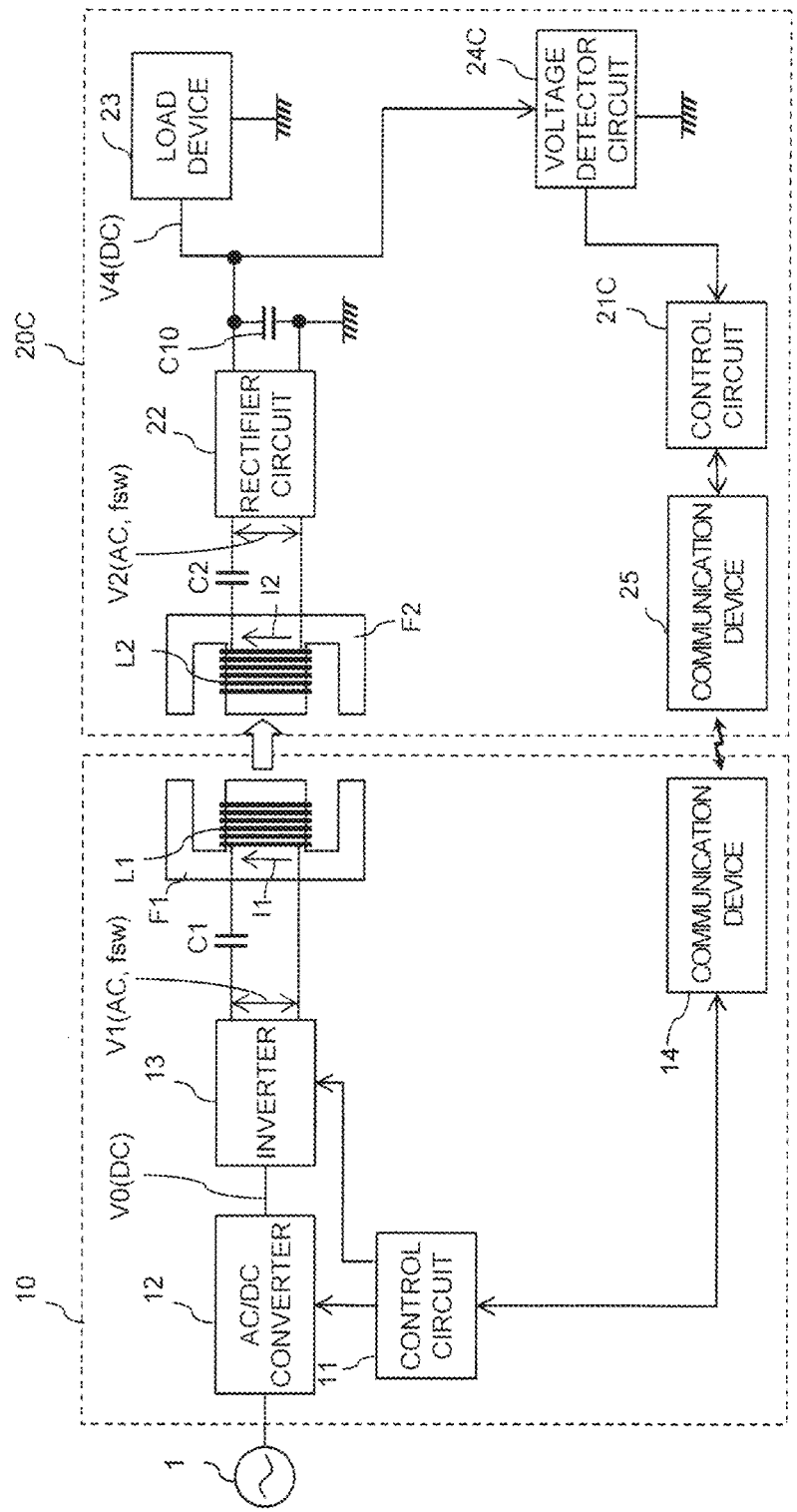
FIG. 28 is a block diagram illustrating a configuration of a contactless power transmission system according to a third embodiment.

FIG. 28 is a block diagram illustrating a configuration of a contactless power transmission system according to the third embodiment. The contactless power transmission system of FIG. 28 includes the power transmitter apparatus 10 and a power receiver apparatus 20C.

The power transmitter apparatus 10 of FIG. 28 is configured and operates in a manner similar to that of the power transmitter apparatus 10 of FIG. 1, except for performing power controlling process to be described below with reference to FIG. 29.

The power receiver apparatus 20C is provided with a control circuit 21C and a voltage detector circuit 24C, instead of the control circuit 21 and the voltage detector circuit 24 of FIG. 1, and not provided with the load element R0 and the switch circuit SW of FIG. 1.

The control circuit 21C controls overall operations of the power receiver apparatus 20C. The control circuit 21C includes a CPU, a RAM, a ROM, and the like, and performs power receiving process to be described below with reference to FIG. 30.

The voltage detector circuit 24C detects only the voltage V4 applied to the load device 23, as an output voltage of the power receiver apparatus 20C.

In the other aspects, the power receiver apparatus 20C is configured and operates in a manner similar to that of the power receiver apparatus 20 of FIG. 1. As described above, the load device 23 may have a variable load value.

The control circuit 11 of the power transmitter apparatus 10 determines the frequency of the transmitting power at which the detected value of the output voltage of the power receiver apparatus 20C is at least locally maximized within the predetermined frequency range, as the stably transmitting frequency, when the output voltage of the power receiver apparatus 20C is supplied to the load device 23.

Operation Example of Third Embodiment

Figure 29:
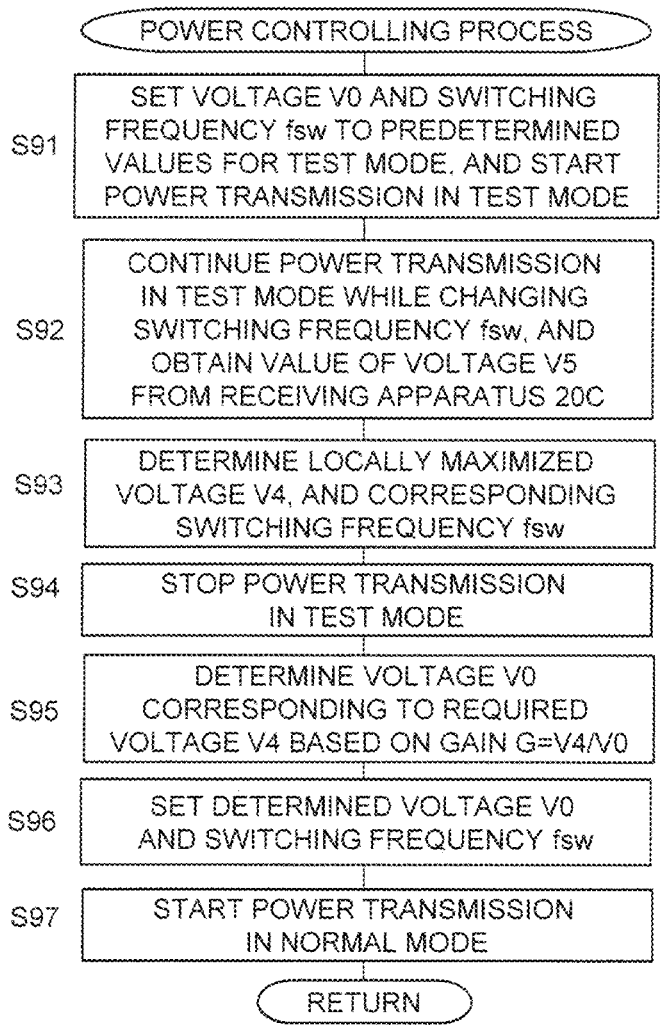
FIG. 29 is a flowchart illustrating subroutine of power controlling process performed by a control circuit 11 of the power transmitter apparatus 10 of FIG. 28.
Figure 30:
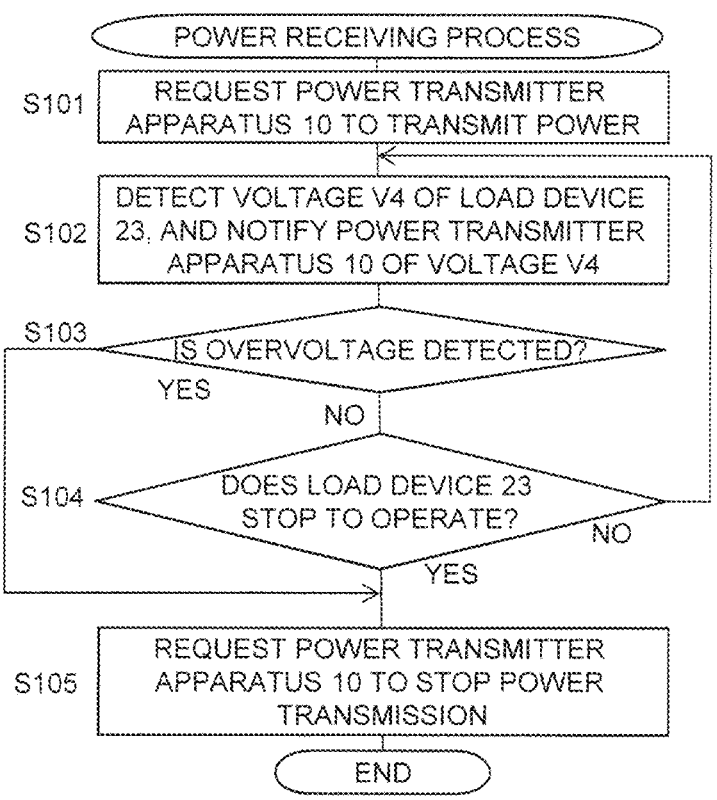
FIG. 30 is a flowchart illustrating power receiving process performed by a control circuit 21C of the power receiver apparatus 20C of FIG. 28.

FIG. 29 is a flowchart illustrating subroutine of power controlling process performed by the control circuit 11 of the power transmitter apparatus 10 of FIG. 28. FIG. 30 is a flowchart illustrating power receiving process performed by the control circuit 21C of the power receiver apparatus 20C of FIG. 28.

The control circuit 11 of the power transmitter apparatus 10 of FIG. 28 performs power transmitting process similar to that of FIG. 8. However, in step S2 of FIG. 8, the control circuit 11 of the power transmitter apparatus 10 performs power controlling process of FIG. 29, instead of the power controlling process of FIG. 9.

For example, when the power receiver apparatus 20C is disposed at a position capable of receiving power from the power transmitter apparatus 10, the power transmitting process and the power receiving process are started. In step S101 of FIG. 30, the control circuit 21C of the power receiver apparatus 20C transmits a control signal for requesting power supply, to the power transmitter apparatus 10 using the communication device 25. In step S1 of FIG. 8, the control circuit 11 of the power transmitter apparatus 10 receives the control signal for requesting power supply, from the power receiver apparatus 20C using the communication device 14.

In step S2 of FIG. 8, the control circuit 11 of the power transmitter apparatus 10 performs the power controlling process of FIG. 29, as described above.

In step S91 of FIG. 29, the control circuit 11 of the power transmitter apparatus 10 sets the voltage V0 and the switching frequency fsw to predetermined values for the test mode, and starts power transmission in the test mode. For example, in the case where the load device 23 is a rechargeable battery, a weak voltage V0 enough not to charge the load device 23 is used as the predetermined value for the test mode. In step S102 of FIG. 30, the control circuit 21C of the power receiver apparatus 20C detects the voltage V4 applied to the load device 23, using the voltage detector circuit 24, and notifies the power transmitter apparatus 10 of the voltage V4 using the communication device 25.

In step S92 of FIG. 29, the control circuit 11 of the power transmitter apparatus 10 continues the power transmission in the test mode while changing the switching frequency fsw, and obtains the value of the voltage V4 from the power receiver apparatus 20C using the communication device 14. In step S93 of FIG. 29, when changing the switching frequency fsw within the predetermined frequency range, the control circuit 11 of the power transmitter apparatus 10 determines a locally maximized voltage V4, and a switching frequency fst at which the voltage V4 is locally maximized.

In step S94 of FIG. 29, the control circuit 11 of the power transmitter apparatus 10 stops the power transmission in the test mode.

In step S95 of FIG. 29, the control circuit 11 of the power transmitter apparatus 10 determines the voltage V0 outputted from the AC/DC converter 12 corresponding to the required voltage V4 of the load device 23, based on the gain G=V4/V0 of the contactless power transmission system.

In step S96 of FIG. 29, the control circuit 11 of the power transmitter apparatus 10 sets the voltage V0 determined in step S95, to the AC/DC converter 12, and sets the switching frequency fst determined in step S94, to the inverter 13.

In step S97 of FIG. 29, the control circuit 11 of the power transmitter apparatus 10 starts power transmission in the normal mode using the voltage V0 and the switching frequency fst that are set in step S96.

Thereafter, the control circuit 11 of the power transmitter apparatus 10 performs steps S3 to S6 of FIG. 8 in a manner similar to that of the first embodiment. The control circuit 21C of the power receiver apparatus 20C performs steps S103 to S105 of FIG. 30. Steps S103 to S105 of FIG. 26 are substantially similar to steps S27, S29, and S30 of FIG. 8. Since the power receiver apparatus 20C of FIG. 28 is not provided with a circuit for protecting the load device 23 from overvoltage, even when detecting the overvoltage in step S103 of FIG. 30, the control circuit 21C of the power receiver apparatus 20C only proceeds to step S105 to request the power transmitter apparatus 10 to stop the power transmission.

Modified Embodiment of Third Embodiment

Figure 31:
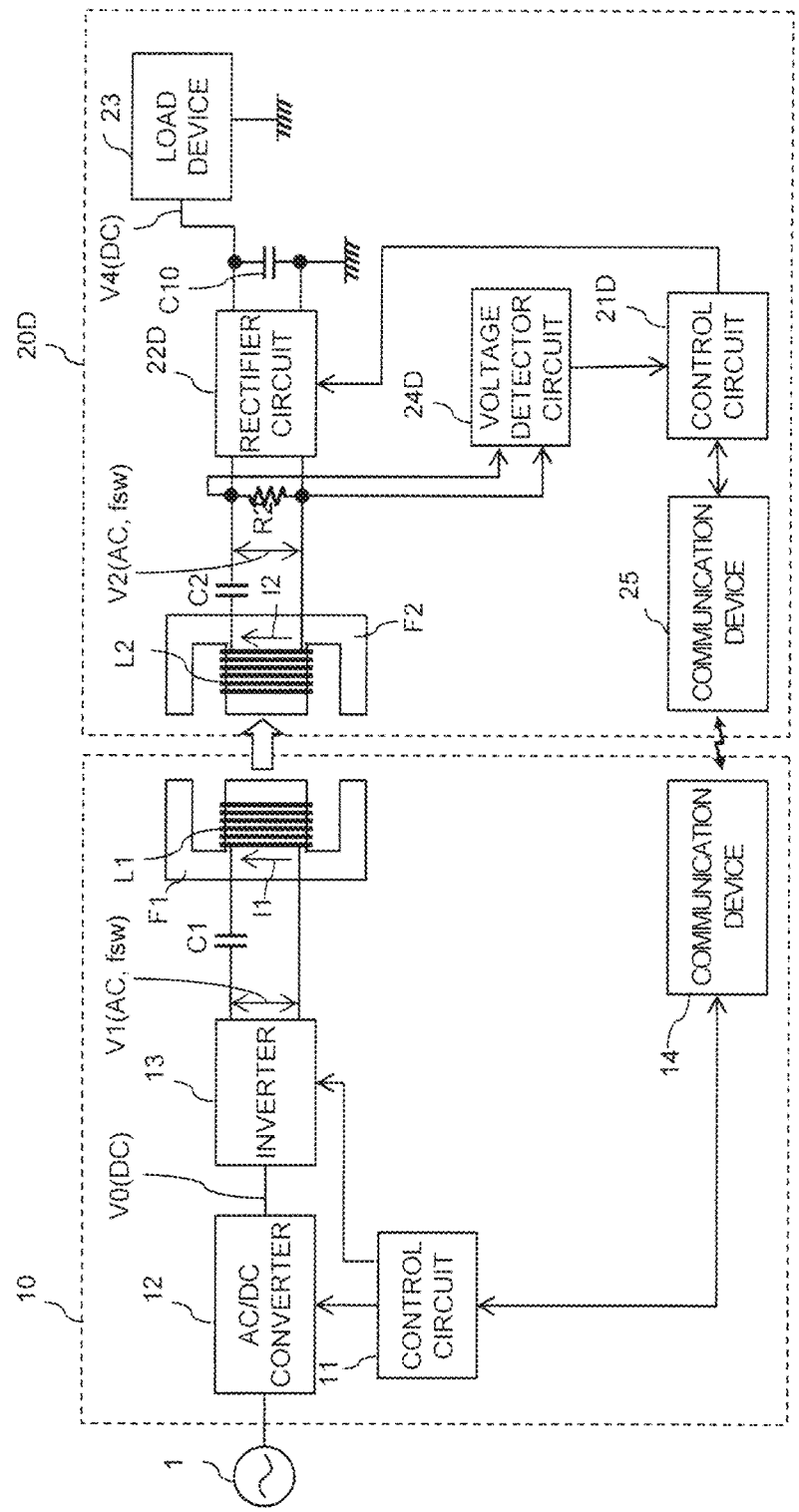
FIG. 31 is a block diagram illustrating a configuration of a contactless power transmission system according to a modified embodiment of the third embodiment.

FIG. 31 is a block diagram illustrating a configuration of a contactless power transmission system according to a modified embodiment of the third embodiment. The contactless power transmission system of FIG. 28 includes the power transmitter apparatus 10 and a power receiver apparatus 20D.

The power transmitter apparatus 10 of FIG. 31 is configured and operates in a manner similar to that of the power transmitter apparatus 10 of FIG. 1, except for performing the power controlling process of FIG. 29.

The power receiver apparatus 20D is provided with a control circuit 21D, a rectifier circuit 22D, a voltage detector circuit 24D, and a voltage detection resistor R2, instead of the control circuit 21, the rectifier circuit 22, and the voltage detector circuit 24 of FIG. 1. The power receiver apparatus 20D is not provided with the load element R0 and the switch circuit SW of FIG. 1.

The control circuit 21C controls overall operations of the power receiver apparatus 20D. The control circuit 21C includes a CPU, a RAM, a ROM, and the like, and performs the power receiving process of FIG. 30.

The rectifier circuit 22D is configured as a synchronous rectifier circuit, for example, as illustrated in FIG. 19 or 21.

The voltage detection resistor R2 is connected across input terminals of the rectifier circuit 22D. The voltage detector circuit 24D detects the voltage V2 generated in receiving coil L2, as the output voltage of power receiver apparatus 20D, instead of the voltage V5 applied to the load element R0 of FIG. 1.

In the other aspects, the power receiver apparatus 20D is configured and operates in a manner similar to that of the power receiver apparatus 20 of FIG. 1.

Figure 32:
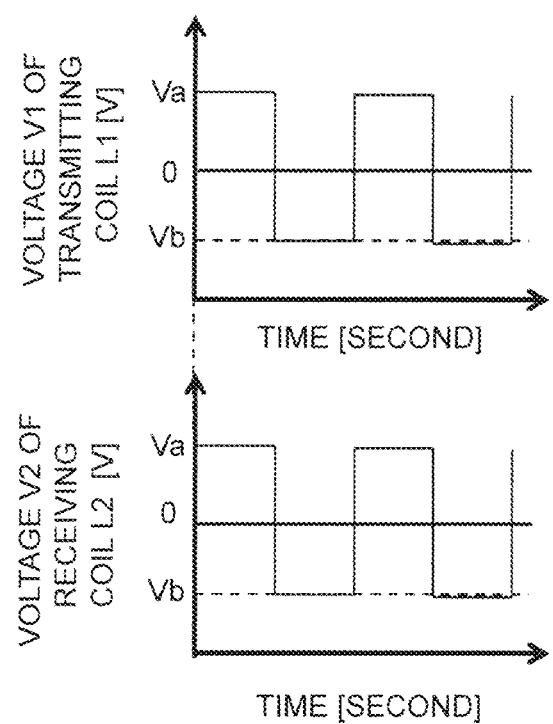
FIG. 32 is a diagram schematically illustrating waveforms of voltages V1, V2 in the contactless power transmission system of FIG. 31.

FIG. 32 is a diagram schematically illustrating waveforms of the voltages V1, V2 in the contactless power transmission system of FIG. 31. As described above, the inverter 13 generates, for example, the rectangular AC voltage V1. In the receiving coil L2, a rectangular or sinusoidal voltage V2 is generated.

The control circuit 11 of the power transmitter apparatus 10 receives the voltage V2 generated in the receiving coil L2 when generating the transmitting power using the AC/DC converter 12 and the inverter 13, from the power receiver apparatus 20D using the communication device 14, as the detected value of the output voltage of the power receiver apparatus 20D. Even when voltage V2 generated in the receiving coil L2 is used as the detected value of the output voltage of the power receiver apparatus 20D, it is possible to determine the stably transmitting frequency and the transmitting voltage in a manner similar to those of using the voltage V5 applied to the load element R0 of FIG. 1, the voltages V5a, V5b applied to the load elements R0a, R0b of FIG. 22, or the voltage V4 applied to the load device 23 of FIG. 28.

Advantageous Effects of Third Embodiment

According to the contactless power transmission system of the third embodiment, the stably transmitting frequency and the transmitting voltage are determined based on the voltage V4 applied to the load device 23. By setting the switching frequency fsw of the inverter 13 to the stably transmitting frequency, it is not required to control the power transmitter apparatus 10 and/or the power receiver apparatuses 20C, 20D in accordance with the variations of the load value of the load device 23.

According to the contactless power transmission system of the third embodiment, by removing the load element and the switch circuit from the power receiver apparatuses 20C, 20D, it is possible to reduce the number of components of the power receiver apparatuses 20C, 20D as compared with that of the first and second embodiments. As a result, it is possible to provide small-sized, lightweight, and low-cost power receiver apparatuses 20C, 20D operable with high efficiency.

According to the contactless power transmission system of the third embodiment, it is possible simplify the process as compared with the first and second embodiments by not performing the test mode.

Fourth Embodiment

According to a contactless power transmission system of the fourth embodiment, a power transmitter apparatus is provided with an auxiliary coil electromagnetically coupled to a transmitting coil, and determines a stably transmitting frequency and a transmitting voltage based on a value of a current or a voltage generated in the auxiliary coil, and based on a current flowing through the transmitting coil.

Configuration Example of Fourth Embodiment

Figure 33:
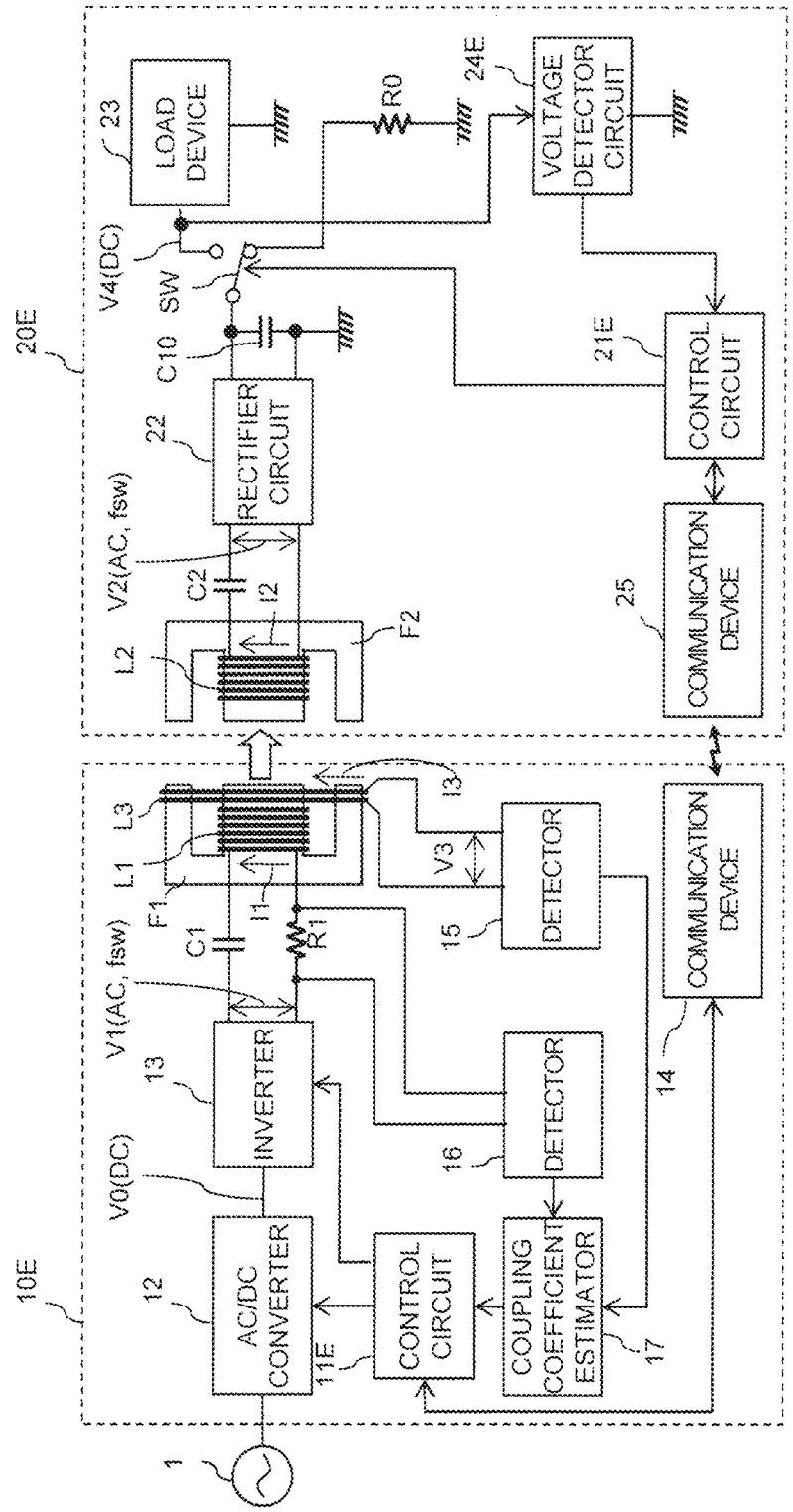
FIG. 33 is a block diagram illustrating a configuration of a contactless power transmission system according to a fourth embodiment.

FIG. 33 is a block diagram illustrating a configuration of a contactless power transmission system according to the fourth embodiment. The contactless power transmission system of FIG. 33 includes a power transmitter apparatus 10E and a power receiver apparatus 20E.

The power transmitter apparatus 10E is provided with a control circuit 11E instead of the control circuit 11 of FIG. 1, and further provided with an auxiliary coil L3, a current detection resistor R1, detectors 15 and 16, and a coupling coefficient estimator 17.

The control circuit 11E controls overall operations of the power transmitter apparatus 10E. The control circuit 11E includes a CPU, a RAM, a ROM, and the like, and performs power transmitting process to be described below with reference to FIGS. 39 and 40.

The auxiliary coil L3 is electromagnetically coupled to the transmitting coil L1. In this case, the auxiliary coil L3 may be wound around the magnetic core F1.

In this specification, the auxiliary coil L3 is also referred to as a "first auxiliary coil".

The detector 15 detects a value of a current I3 or a voltage V3 generated in the auxiliary coil L3. The detector 16 detects a value of a current I1 flowing through the transmitting coil L1, using the current detection resistor R1. The values detected by the detectors 15 and 16 are notified to the coupling coefficient estimator 17.

In this specification, the detector 15 is also referred to as a "first detector", and the detector 16 is also referred to as a "second detector".

The coupling coefficient estimator 17 estimates a first coupling coefficient k12a of the transmitting coil L1 and the receiving coil L2, based on the value of the current I3 or the voltage V3 generated in the auxiliary coil L3. The coupling coefficient estimator 17 estimates a second coupling coefficient k12b of the transmitting coil L1 and the receiving coil L2, based on the value of the current I1 flowing through the transmitting coil L1.

The coupling coefficient k12 of the transmitting coil L1 and the receiving coil L2 varies in accordance with the distance between the transmitting coil L1 and the receiving coil L2. As the distance decreases, the coupling coefficient k12 increases, and as the distance increases, the coupling coefficient k12 decreases. The current I1 flowing through the transmitting coil L1 varies with certain characteristics in accordance with the coupling coefficient k12 of the transmitting coil L1 and the receiving coil L2. The current I3 (and/or the voltage V3) generated in the auxiliary coil L3 varies with characteristics different from that of the current I1, in accordance with the coupling coefficient k12 of the transmitting coil L1 and the receiving coil L2. The coupling coefficient estimator 17 stores in advance a table or calculation formula indicating the relationship between the current I1 and the coupling coefficient k12b, and the relationship between the current I3 (or the voltage V3) and the coupling coefficient k12a. The coupling coefficient estimator 17 can estimate the coupling coefficients k12a, k12b based on the values of the currents I1, I3 (alternatively, the current I1 and the voltage V3), respectively, by referring to the table or calculation formula. When there is no foreign object between the transmitting coil L1 and the receiving coil L2, it is expected that estimated coupling coefficients k12a and k12b match each other. In the case where the coupling coefficients k12a, k12b match each other, this coupling coefficient is indicated by a reference sign "k12". On the other hand, when a foreign object exists between the transmitting coil L1 and the receiving coil L2, the currents I1, I3 are differently affected by the foreign object, and as a result, estimated coupling coefficients k12a, k12b do not match each other.

The coupling coefficient estimator 17 includes a CPU, a RAM, a ROM, and the like, and may estimate the coupling coefficients k12a, k12b by software processing. The coupling coefficient estimator 17 may be provided as a circuit separate from the control circuit 11E, or may be integrated into the control circuit 11E.

The control circuit 11E controls the AC/DC converter 12 and the inverter 13 based on the coupling coefficient k12 of the transmitting coil L1 and the receiving coil L2. In particular, the control circuit 11E controls the magnitude of the voltage V0 outputted from the AC/DC converter 12, and the switching frequency fsw of the inverter 13.

The control circuit 11E controls the AC/DC converter 12 and the inverter 13 to generate transmitting power having a predetermined frequency. When generating the transmitting power using the AC/DC converter 12 and the inverter 13, the coupling coefficient estimator 17 estimates the coupling coefficients k12a, k12b of the transmitting coil L1 and the receiving coil L2, as described above. The control circuit 11E determines the frequency characteristics of the gain of the contactless power transmission system, based on the estimated coupling coefficient k12 of the transmitting coil L1 and the receiving coil L2. The control circuit 11E determines a stably transmitting frequency based on the frequency characteristics of the gain, the stably transmitting frequency indicating a frequency of the transmitting power at which the dependency of an output voltage of the power receiver apparatus 20E on the load value of the power receiver apparatus 20E is at least locally minimized within the predetermined frequency range. The control circuit 11E determines a transmitting voltage based on the frequency characteristics of the gain, the transmitting voltage indicating a voltage of the transmitting power at which the output voltage of the power receiver apparatus 20E reaches a predetermined target voltage when generating the transmitting power having the stably transmitting frequency.

As described above, the frequency characteristics of the gain of the contactless power transmission system vary depending on the coupling coefficient k12 of the transmitting coil L1 and the receiving coil L2. Accordingly, the control circuit 11E stores in advance a table or calculation formula indicating the relationship between the coupling coefficient k12 and the frequency characteristics of the gain. The control circuit 11E can determine the stably transmitting frequency and the transmitting voltage based on the coupling coefficient k12 by referring to the table or calculation formula.

When a difference between the first coupling coefficient k12a and the second coupling coefficient k12b is equal to or less than a predetermined threshold, the control circuit 11E controls the AC/DC converter 12 and the inverter 13 to generate the transmitting power having the stably transmitting frequency and the transmitting voltage. When the difference between the first coupling coefficient k12a and the second coupling coefficient k12b exceeds the predetermined threshold, the control circuit 11E controls the AC/DC converter 12 and the inverter 13 to stop the power transmission to the power receiver apparatus 20E. Here, the magnitude of the threshold is set such that the first coupling coefficient k12a and the second coupling coefficient k12b can be considered to be substantially identical to each other.

The control circuit 11E determines the stably transmitting frequency and the transmitting voltage when starting power transmission from the power transmitter apparatus 10E to the power receiver apparatus 20E. When the coupling coefficient k12 of the transmitting coil L1 and the receiving coil L2 significantly changes from the value obtained when determining the stably transmitting frequency and the transmitting voltage, the control circuit 11E redetermines the stably transmitting frequency and the transmitting voltage based on a present coupling coefficient k12. As a result, the control circuit 11E controls the AC/DC converter 12 and the inverter 13 to generate the transmitting power having the stably transmitting frequency and the transmitting voltage.

In the fourth embodiment, the control circuit 11E, the detectors 15 and 16, and the coupling coefficient estimator 17 are also collectively referred to as a "controller apparatus" of the power transmitter apparatus 10E.

In the other aspects, the power transmitter apparatus 10E is configured and operates in a manner similar to that of the power transmitter apparatus 10 of FIG. 1.

The power receiver apparatus 20E is provided with a control circuit 21E and a voltage detector circuit 24E, instead of the control circuit 21 and the voltage detector circuit 24 of FIG. 1.

The control circuit 21E controls overall operations of the power receiver apparatus 20E. The control circuit 21E includes a CPU, a RAM, a ROM, and the like, and performs power receiving process to be described below with reference to FIG. 41.

The voltage detector circuit 24E detects only the voltage V4 applied to the load device 23, as the output voltage of the power receiver apparatus 20E.

As described above, the control circuit 11E of the power transmitter apparatus 10E uses the coupling coefficient k12, instead of the detected value of the output voltage of the power receiver apparatus 20E, in order to determine the stably transmitting frequency and the transmitting voltage. Therefore, according to the fourth embodiment, the voltage V4 is not notified to the power transmitter apparatus 10E, and is only used to determine whether or not to protect the load device 23 from overvoltage.

In the other aspects, the power receiver apparatus 20E is configured and operates in a manner similar to that of the power receiver apparatus 20 of FIG. 1.

Figure 34:
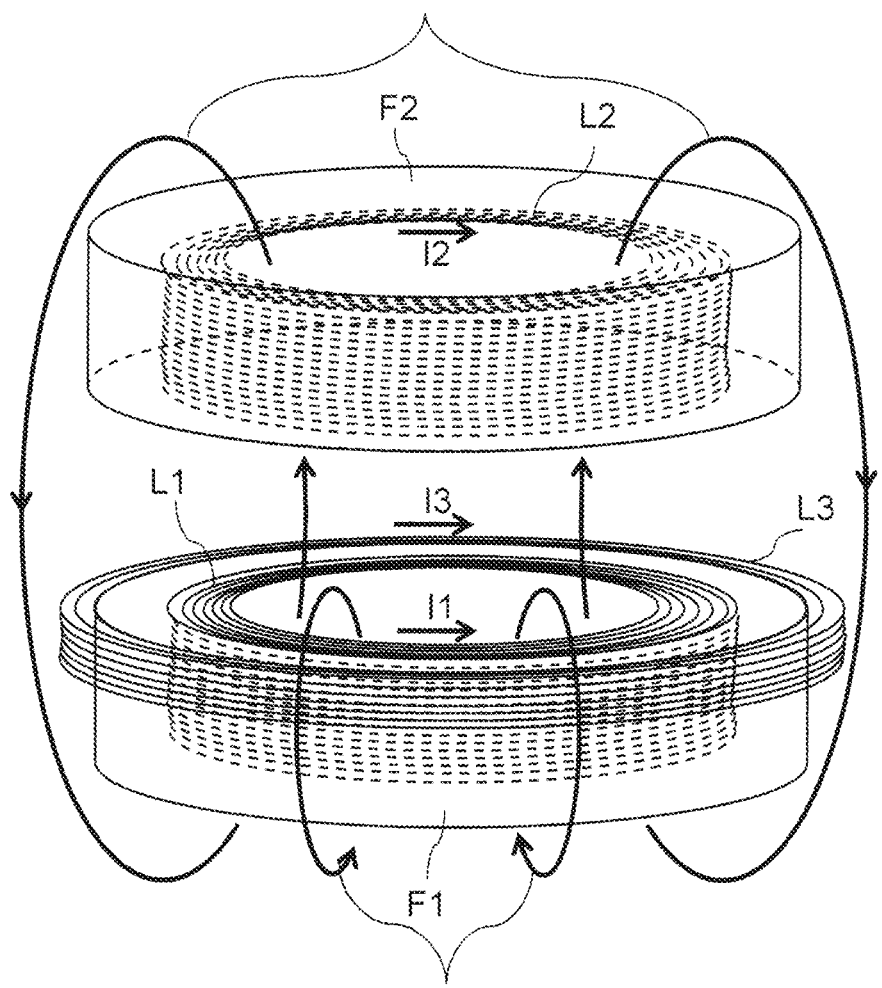
FIG. 34 is a perspective view illustrating arrangement of a transmitting coil L1, a receiving coil L2, and an auxiliary coil L3 of FIG. 33.

FIG. 34 is a perspective view illustrating arrangement of the transmitting coil L1, the receiving coil L2, and the auxiliary coil L3 of FIG. 33. As described above, the transmitting coil L1 and the auxiliary coil L3 may be wound around the magnetic core F1, and the receiving coil L2 may be wound around the magnetic core F2. A part of the magnetic flux generated from the transmitting coil L1 intersects the auxiliary coil L3, and therefore, the current I3 and the voltage V3 are generated in the auxiliary coil L3. As illustrated in FIG. 34, the auxiliary coil L3 may be disposed so as to surround the transmitting coil L1. By disposing the auxiliary coil L3 in such a manner, it is possible to reduce leakage of the magnetic flux of the transmitting coil L1.

The transmitting coil L1 and the receiving coil L2 are electromagnetically coupled to each other at the coupling coefficient k12, the transmitting coil L1 and the auxiliary coil L3 are electromagnetically coupled to each other at the coupling coefficient k13, and the receiving coil L2 and the auxiliary coil L3 are electromagnetically coupled to each other at the coupling coefficient k23. The transmitting coil L1, the receiving coil L2, and the auxiliary coil L3 are configured such that coupling coefficients k13, k23 are much smaller than coupling coefficient k12. The transmitting coil L1, the receiving coil L2, and the auxiliary coil L3 may be configured such that coupling coefficient k23 is smaller than coupling coefficient k13.

Figure 35:
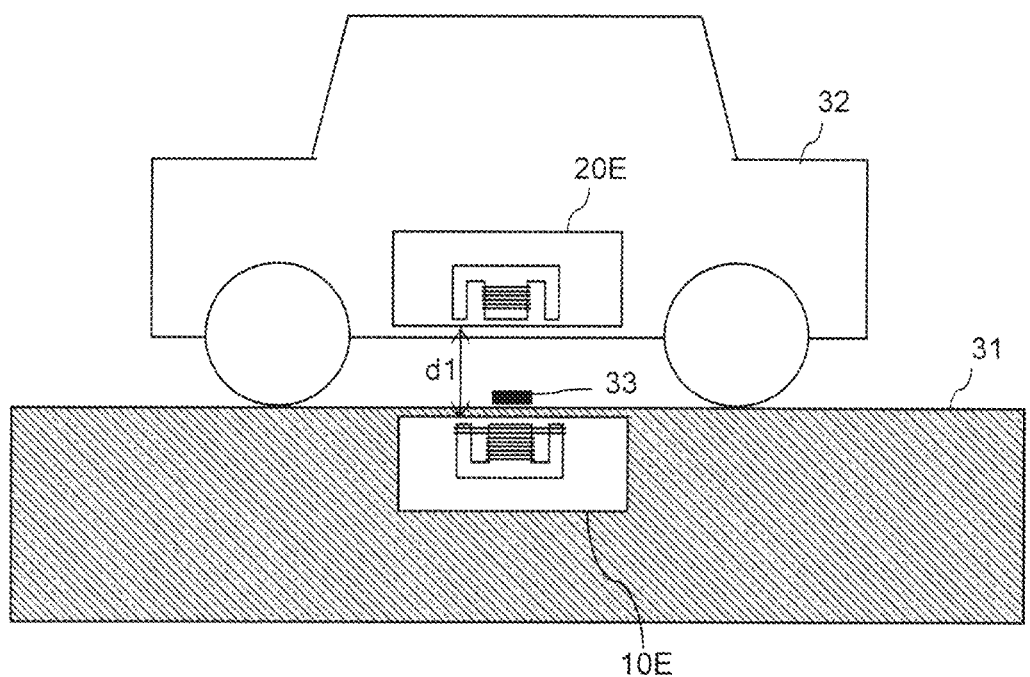
FIG. 35 is a diagram illustrating an application example of the contactless power transmission system of FIG. 33.

FIG. 35 is a diagram illustrating an application example of the contactless power transmission system of FIG. 33. FIG. 35 illustrates a case where the power receiver apparatus 20 E is incorporated into an electrically-driven vehicle 32 provided with a rechargeable battery, and the power transmitter apparatus 10E is incorporated into a road surface 31 so as to be capable of transmitting power to the power receiver apparatus 20E of the vehicle 32. In this case, the rechargeable battery of the vehicle 32 is the load device 23 of the power receiver apparatus 20E. The power transmitter apparatus 10E and the power receiver apparatus 20E are opposed to each other with a distance dl. As illustrated in FIG. 35, a foreign object 33 may appear between the transmitting coil L1 and the receiving coil L2.

Operation Example of Fourth Embodiment

Figure 36:
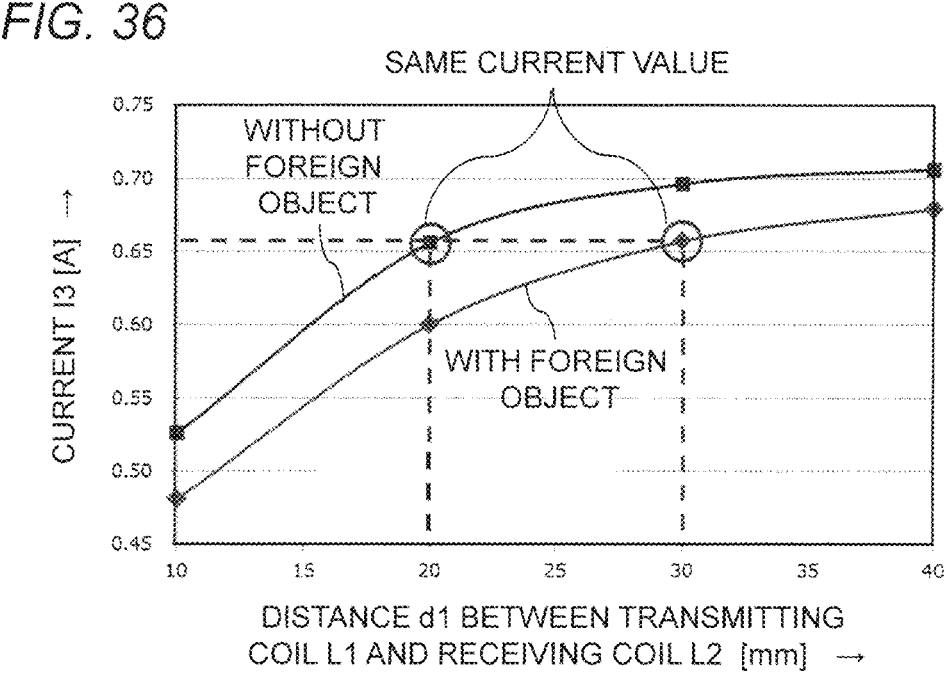
FIG. 36 is a graph illustrating an example of variations in the magnitude of a current I3 generated in the auxiliary coil L3 and detected by a detector 15 of FIG. 33.
Figure 37:
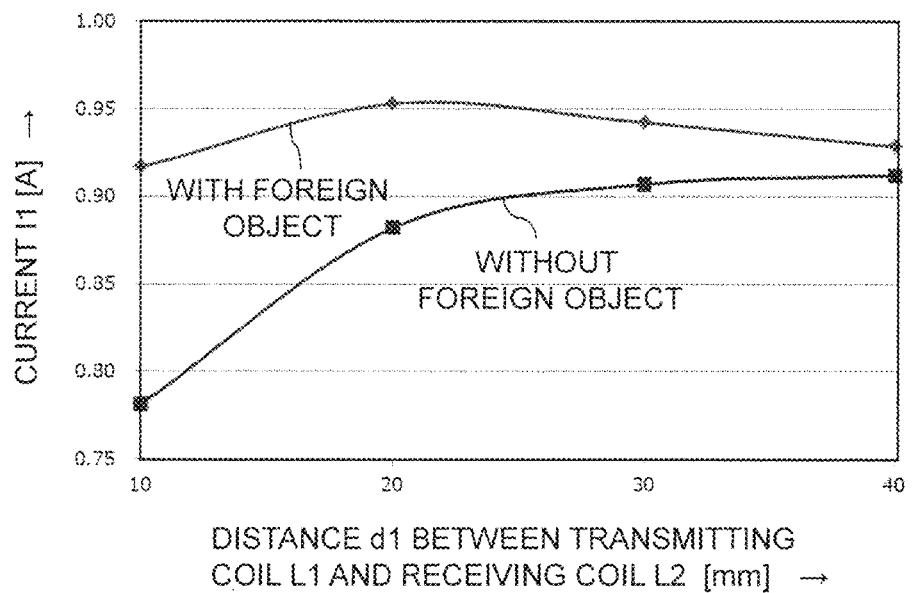
FIG. 37 is a graph illustrating an example of variations in the magnitude of a current I1 flowing through the transmitting coil L1 and detected by a detector 16 of FIG. 33.

FIG. 36 is a graph illustrating an example of variations in the magnitude of the current I3 generated in the auxiliary coil L3 and detected by the detector 15 of FIG. 33. FIG. 37 is a graph illustrating an example of variations in the magnitude of the current I1 flowing through the transmitting coil L1 and detected by the detector 16 of FIG. 33. As described above, the coupling coefficient k12 of the transmitting coil L1 and the receiving coil L2 varies in accordance with the distance dl between the transmitting coil L1 and the receiving coil L2. Accordingly, the relationship between the coupling coefficient k12 and the currents I1, I3 can be equivalently understood from the relationship between the distance dl and the currents I1, I3 illustrated in FIGS. 36 and 37. In addition, as described above, when the foreign object 33 exists between the transmitting coil L1 and the receiving coil L2, the currents I1, I3 are differently affected by the foreign object 33. According to the examples of FIGS. 36 and 37, when the foreign object 33 exists, the current I3 decreases, and the current I1 increases, as compared with the case where the foreign object 33 does not exist.

FIG. 38 is a table illustrating an example of coupling coefficient k12 of the transmitting coil L1 and the receiving coil L2, the coupling coefficient k12 being calculated with respect to the current I1 flowing through the transmitting coil L1 of FIG. 33, and the current I3 generated in the auxiliary coil L3 of FIG. 33. FIG. 38 illustrates the currents I1, I3 and the coupling coefficient k12 obtained when the power receiver apparatus 20 is in the test mode, and the foreign object 33 does not exist between the transmitting coil L1 and the receiving coil L2. The coupling coefficient estimator 17 stores in advance a table indicating the relationship between the currents I1, I3 and the coupling coefficient k12 as illustrated in FIG. 38. The coupling coefficient estimator 17 estimates the first coupling coefficient k12a of the transmitting coil L1 and the receiving coil L2, by referring to the table based on the value of the current I3. The coupling coefficient estimator 17 estimates the second coupling coefficient k12b of the transmitting coil L1 and the receiving coil L2, by referring to the table based on the value of the current I1.

When the foreign object 33 does not exist between the transmitting coil L1 and the receiving coil L2, it is expected that the coupling coefficient k12a estimated based on the value of the current I3 matches the coupling coefficient k12b estimated based on the value of the current I1. On the other hand, when the foreign object 33 exists between the transmitting coil L1 and the receiving coil L2, the currents I1, I3 are differently affected by the foreign object 33, and as a result, the coupling coefficient k12a estimated based on the value of the current I3 do not match the coupling coefficient k12b estimated based on the value of the current I1. Accordingly, it is possible to determine whether or not the foreign object 33 exists between the transmitting coil L1 and the receiving coil L2, based on whether or not the coupling coefficients k12a and k12b match each other.

When the estimated coupling coefficients k12a and k12b substantially match each other, that is, when a difference between the coupling coefficients k12a and k12b is equal to or less than a predetermined threshold, the control circuit 11E may determine that the coupling coefficients k12a and k12b match each other.

The coupling coefficient estimator 17 may store in advance a calculation formula indicating the relationship between the currents I1, I3 and the coupling coefficient k12, instead of the table as illustrated in FIG. 38. For example, the coupling coefficient k12a may be estimated as follows based on the current I1 flowing through the transmitting coil L1.

$$k12a = e^{I1} + a$$

Here, "a" on the right side is a constant.

The current I1 and the coupling coefficient k12a may have the following relationship.

$$I1 = 1 + k12a + (k12a)^2 + \ldots + (k12a)^n$$

By solving this equation with respect to the coupling coefficient k12a, the coupling coefficient k12a may be estimated based on the current I1.

The calculation formula for estimating the coupling coefficient k12a based on the current I1 is not limited to those exemplified above.

As similar to the case of estimating the coupling coefficient k12a based on the current I1, the coupling coefficient k12b can also be estimated using some calculation formula in the case of estimating the coupling coefficient k12b based on the current I3 flowing through the auxiliary coil L3.

The coupling coefficient k23 of the receiving coil L2 and the auxiliary coil L3 can also be calculated in a manner similar to that of the coupling coefficient k12. On the other hand, since the distance between the transmitting coil L1 and the auxiliary coil L3 does not change, the coupling coefficient k13 between the transmitting coil L1 and the auxiliary coil L3 is calculated in advance and stored in the coupling coefficient estimator 17.

FIGS. 36 and 38 illustrate the case of detecting the value of the current I3 generated in the auxiliary coil L3. However, also in the case of detecting the value of the voltage V3 generated in the auxiliary coil L3, the coupling coefficient k12b of the transmitting coil L1 and the receiving coil L2 can be estimated in a substantially similar manner.

Figure 39:
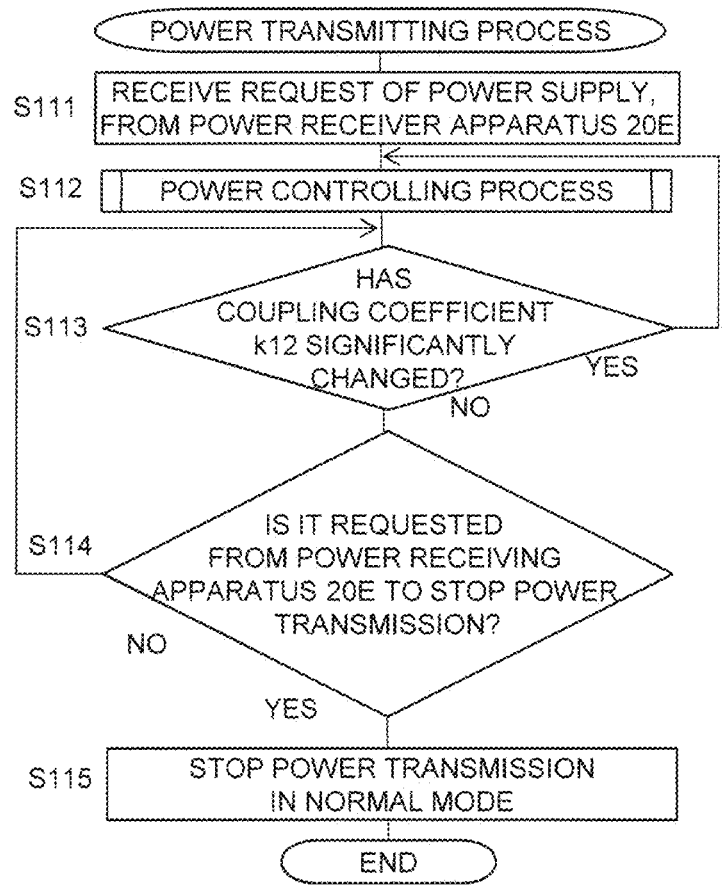
FIG. 39 is a flowchart illustrating power transmitting process performed by a control circuit 11E of the power transmitter apparatus 10E of FIG. 33.
Figure 40:
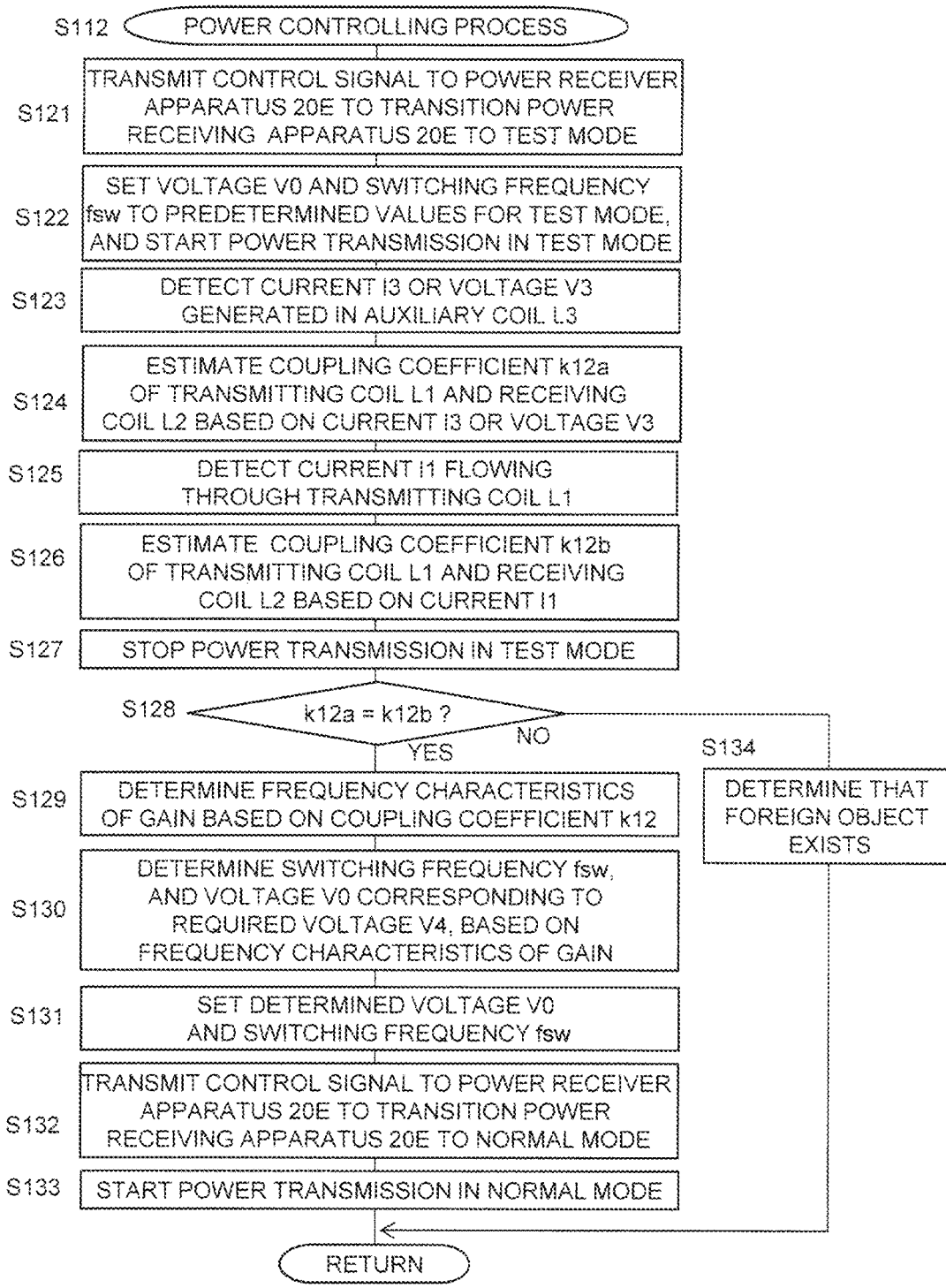
FIG. 40 is a flowchart illustrating subroutine of step S112 of FIG. 39.
Figure 41:
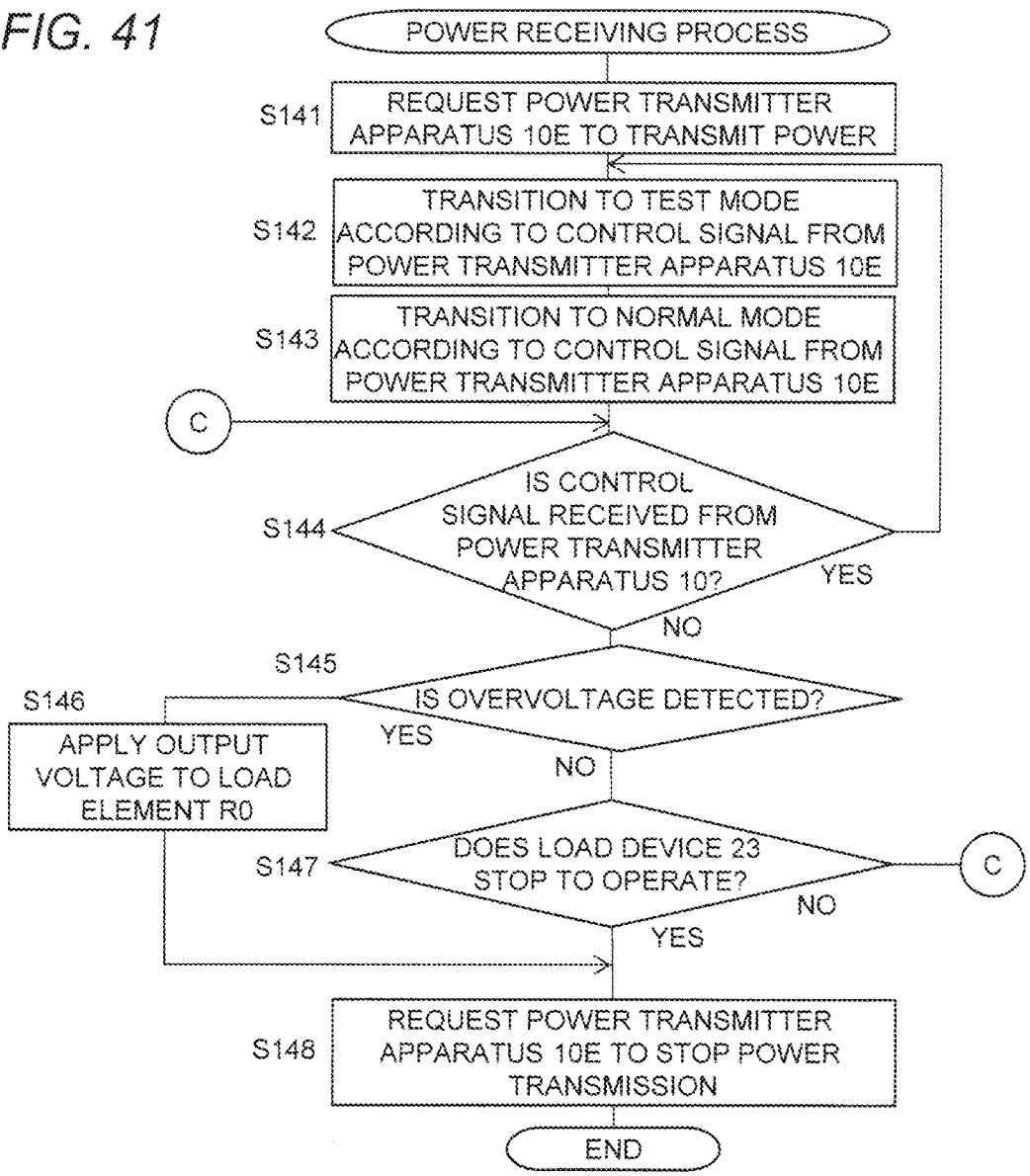
FIG. 41 is a flowchart illustrating power receiving process performed by a control circuit 21E of the power receiver apparatus 20E of FIG. 33.

FIG. 39 is a flowchart illustrating power transmitting process performed by the control circuit 11E of the power transmitter apparatus 10E of FIG. 33. FIG. 40 is a flowchart illustrating subroutine of step S112 of FIG. 39. FIG. 41 is a flowchart illustrating power receiving process performed by the control circuit 21E of the power receiver apparatus 20E of FIG. 33.

For example, when the power receiver apparatus 20E is disposed at a position capable of receiving power from the power transmitter apparatus 10E, the power transmitting process and the power receiving process are started. In step S141 of FIG. 41, the control circuit 21E of the power receiver apparatus 20E transmits a control signal for requesting power supply, to the power transmitter apparatus 10E using the communication device 25. In step S111 of FIG. 39, the control circuit 11E of the power transmitter apparatus 10E receives the control signal for requesting power supply, from the power receiver apparatus 20E using the communication device 14.

In step S112 of FIG. 39, the control circuit 11E of the power transmitter apparatus 10E performs power controlling process.

In step S121 of FIG. 40, the control circuit 11E of the power transmitter apparatus 10E transmits a control signal for requesting transition of the power receiver apparatus 20E to the test mode, to the power receiver apparatus 20E using the communication device 14. In step S142 of FIG. 41, the control circuit 21E of the power receiver apparatus 20E receives the control signal from the power transmitter apparatus 10E using the communication device 25, and according to the control signal, switches the switch circuit SW to supply the output voltage of the power receiver apparatus 20E to the load element R0 (that is, transition to the test mode).

In step S122 of FIG. 40, the control circuit 11E of the power transmitter apparatus 10E sets the voltage V0 and the switching frequency fsw to predetermined values for the test mode, and starts power transmission in the test mode.

In step S123 of FIG. 40, the power transmitter apparatus 10E detects the value of the current I3 or the voltage V3 generated in the auxiliary coil L3, using the detector 15. In step S124, the power transmitter apparatus 10E estimates the coupling coefficient k12a of the transmitting coil L1 and the receiving coil L2 by referring to the table or calculation formula based on the detected value of the current I3 or the voltage V3, using the coupling coefficient estimator 17.

In step S125 of FIG. 40, the power transmitter apparatus 10E detects the value of the current I1 flowing through the transmitting coil L1, using the detector 16. In step S126, the power transmitter apparatus 10E estimates the coupling coefficient k12b of the transmitting coil L1 and the receiving coil L2 by referring to the table or calculation formula based on the detected value of the current I1, using the coupling coefficient estimator 17.

Figure 42:
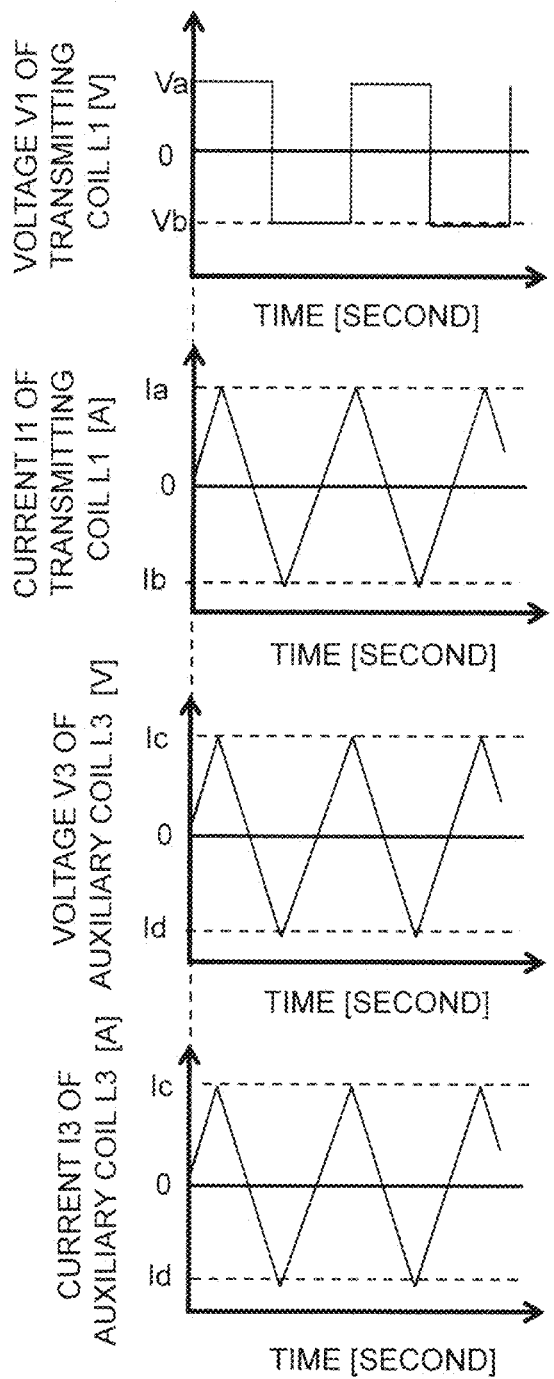
FIG. 42 is a diagram schematically illustrating waveforms of voltages V1, V3 and currents I1, I3 in the contactless power transmission system of FIG. 33.

FIG. 42 is a diagram schematically illustrating waveforms of the voltages V1, V3 and currents I1, I3 in the contactless power transmission system of FIG. 33. As described above, the inverter 13 generates, for example, the rectangular AC voltage V1. The rectangular AC voltage V1 is applied to the transmitting coil L1, and a rectangular, triangular, or sinusoidal AC current I1 flows through the transmitting coil L1. In addition, a rectangular AC voltage V3 is generated to the auxiliary coil L3, and a rectangular, triangular, or sinusoidal AC current I3 flows through the auxiliary coil L3.

In step S127 of FIG. 40, the control circuit 11E of the power transmitter apparatus 10E stops the power transmission in the test mode.

In step S128 of FIG. 40, the control circuit 11E of the power transmitter apparatus 10E determines whether or not the estimated coupling coefficients k12a, k12b match each other: if YES, the process proceeds to step S129; if NO, the process proceeds to step S134.

In step S129 of FIG. 40, the control circuit 11E of the power transmitter apparatus 11E determines the frequency characteristics of the gain of the contactless power transmission system by referring to the table or calculation formula based on the coupling coefficient k12. In step S130, the control circuit 11E of the power transmitter apparatus 10E determines the switching frequency fst at which the dependency of the output voltage of the power receiver apparatus 20E on the load value of the power receiver apparatus 20E is at least locally minimized, as the stably transmitting frequency, based on the frequency characteristics of the gain. In addition, in step S130, the control circuit 11E of the power transmitter apparatus 10E determines the voltage V0 outputted from the AC/DC converter 12 corresponding to the required voltage V4 of the load device 23, as the transmitting voltage, based on the frequency characteristics of the gain. In step S131, the control circuit 11E of the power transmitter apparatus 10E sets the voltage V0 determined in step S130, to the AC/DC converter 12, and sets the switching frequency fst determined in step S130, to the inverter 13.

In step S132 of FIG. 40, the control circuit 11E of the power transmitter apparatus 10E transmits a control signal for requesting transition of the power receiver apparatus 20E to the normal mode, to the power receiver apparatus 20E using the communication device 14. In step S143 of FIG. 41, the control circuit 21E of the power receiver apparatus 20E receives the control signal from the power transmitter apparatus 10E using the communication device 25, and switches according to the control signal, the switch circuit SW to supply the output voltage of the power receiver apparatus 20E to the load device 23 (that is, transition to the normal mode).

In step S133 of FIG. 40, the control circuit 11E of the power transmitter apparatus 10E starts power transmission in the normal mode using the voltage V0 and the switching frequency fst that are set in step S131.

In step S134 of FIG. 40, the control circuit 11E of the power transmitter apparatus 10E determines that a foreign object exists. The control circuit 11E of the power transmitter apparatus 10E controls the AC/DC converter 12 and the inverter 13 to keep the power transmission to the power receiver apparatus 20E stopping.

When the power transmitter apparatus 10E is transmitting power to the power receiver apparatus 20E, if the coupling coefficient k12 of the transmitting coil L1 and the receiving coil L2 changes, the stably transmitting frequency and the gain of the contactless power transmission system also change. In this case, the control circuit 11E of the power transmitter apparatus 10E redetermines the stably transmitting frequency and the transmitting voltage based on a present coupling coefficient k12, as described below.

In step S113 of FIG. 39, the control circuit 11E of the power transmitter apparatus 10E determines whether or not the coupling coefficient k12 of the transmitting coil L1 and the receiving coil L2 has changed by a value larger than a predetermined threshold from the detected value obtained when determining the stably transmitting frequency and the transmitting voltage: if YES, the process returns to step S112; if NO, the process proceeds to step S114.

When the process returns from step S113 to step S112 of FIG. 8, the control circuit 11E of the power transmitter apparatus 10E performs the power controlling process described with reference to FIG. 40, again. As described above, in step S121 of FIG. 40, the control circuit 11E of the power transmitter apparatus 10E transmits a control signal for requesting transition of the power receiver apparatus 20E to the test mode, to the power receiver apparatus 20E using the communication device 14. In step S144 of FIG. 41, the control circuit 21E of the power receiver apparatus 20E determines whether or not the control signal is received from the power transmitter apparatus 10E: if YES, the process returns to step S142; if NO, the process proceeds to step S145.

When detecting an overvoltage in the power receiver apparatus 20E, the power receiver apparatus 20E of FIG. 33 may protect the load device 23 from overvoltage using the load element R0 and the switch circuit SW, as described below.

In step S145 of FIG. 41, the control circuit 21E of the power receiver apparatus 20E determines whether or not the voltage V4 applied to the load device 23 exceeds a predetermined threshold: if YES, the process proceeds to step S146; if NO, the process proceeds to step S147. In step S146 of FIG. 41, the control circuit 21E of the power receiver apparatus 20E switches the switch circuit SW to supply the output voltage of power receiver apparatus 20E to the load element R0.

In step S147 of FIG. 41, the control circuit 21E of the power receiver apparatus 20E determines whether or not the load device 23 stops to operate: if YES, the process proceeds to step S148; if NO, the process returns to step S144.

In step S148 of FIG. 41, the control circuit 21E of the power receiver apparatus 20E transmits a control signal for requesting to stop power transmission, to the power transmitter apparatus 10E using the communication device 25. In step S114 of FIG. 39, the control circuit 11E of the power transmitter apparatus 10E determines whether or not the power receiver apparatus 20E has requested to stop the power supply: if YES, the process proceeds to step S115; if NO, the process returns to step S113. In step S115 of FIG. 39, the control circuit 11E of the power transmitter apparatus 10E stops the power transmission in the normal mode.

Operation Principle of Fourth Embodiment

Now, the operation principle of the contactless power transmission system of FIG. 33 will be described with reference to FIG. 43.

Figure 43:
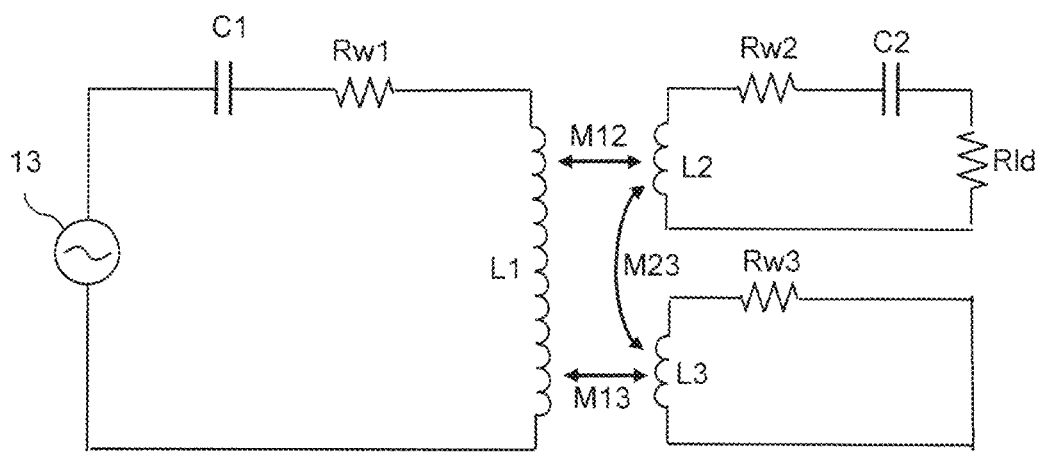
FIG. 43 is an equivalent circuit diagram illustrating a schematic configuration of the contactless power transmission system of FIG. 33.

FIG. 43 is an equivalent circuit diagram illustrating a schematic configuration of the contactless power transmission system of FIG. 33. The dependency of the stably transmitting frequency and the gain of the contactless power transmission system on the coupling coefficient k12 of the transmitting coil L1 and the receiving coil L2 will be described with reference to the equivalent circuit diagram of FIG. 43. The transmitting coil L1 has a self-inductance (indicated by identical reference sign "L1") and a resistance Rw1, the receiving coil L2 has a self-inductance (indicated by identical reference sign "L2") and a resistance Rw2, and the auxiliary coil L3 has a self-inductance (indicated by identical reference sign "L3") and a resistance Rw3. The transmitting coil L1 and the receiving coil L2 are coupled to each other at the coupling coefficient k12, and have a mutual inductance M12. The transmitting coil L1 and the auxiliary coil L3 are coupled to each other at the coupling coefficient k13, and have a mutual inductance M13. The receiving coil L2 and the auxiliary coil L3 are coupled to each other at the coupling coefficient k23, and have a mutual inductance M23. A reference sign Rld indicates a load value of the power receiver apparatus 20E (that is, the load value of the load device 23 or the load element R0).

$$M12 = k12 \cdot \sqrt{L1 \cdot L2} \quad \text{[Mathematical Expression 11]}$$

$$M13 = k13 \cdot \sqrt{L1 \cdot L3} \quad \text{[Mathematical Expression 12]}$$

$$M23 = k23 \cdot \sqrt{L2 \cdot L3} \quad \text{[Mathematical Expression 13]}$$

The system of FIG. 33 is expressed by the following matrix Z (also referred to as "Z parameter").

$$Z = \begin{bmatrix} b11 & b12 & b13 \\ b21 & b22 & b23 \\ b31 & b32 & b33 \end{bmatrix} = \begin{bmatrix} Rw1 + \dfrac{1}{j \cdot \omega \cdot C1} + j \cdot \omega \cdot L1 & j \cdot \omega \cdot M12 & j \cdot \omega \cdot M12 \\ j \cdot \omega \cdot M12 & Rw2 + \dfrac{1}{j \cdot \omega \cdot C2} + j \cdot \omega \cdot L2 & j \cdot \omega \cdot M23 \\ j \cdot \omega \cdot M13 & j \cdot \omega \cdot M23 & j \cdot \omega \cdot L3 - Rw3 \end{bmatrix} \quad \text{[Mathematical Expression 14]}$$

In Mathematical Expression 14, the switching frequency fsw is represented by "ω". "j" denotes an imaginary unit.

Here, an inverse matrix of the matrix Z is introduced.

[Mathematical Expression 15]

$$Z^{-1} = \begin{bmatrix} b11 & b12 & b13 \\ b21 & b22 & b23 \\ b31 & b32 & b33 \end{bmatrix}^{-1} = \begin{bmatrix} c11 & c12 & c13 \\ c21 & c22 & c23 \\ c31 & c32 & c33 \end{bmatrix}$$

The gain G2 of the system of FIG. 43 is expressed as follows.

$$G2 = \frac{c21 \cdot (1 - Rw3 \cdot c33) + Rw3 \cdot c23 \cdot c31}{\frac{(-1 - Rld \cdot c22) \cdot (1 - Rw3 \cdot c33)}{Rld} - Rw3 \cdot c23 \cdot c32}$$

[Mathematical Expression 16]

According to Mathematical Expressions 11 to 16, it can be seen that the gain G2 varies depending on the switching frequency ω, and the frequency characteristics of the gain G2 vary depending on the coupling coefficient k12. Accordingly, the stably transmitting frequency (that is, the frequency at which the dependency of the gain G2 on the load value Rld of the power receiver apparatus 20E is minimized) varies depending on the coupling coefficient k12. In particular, according to Mathematical Expression 16, the dependency of the gain G2 on the load value R1d of the power receiver apparatus 20E can be minimized or removed, by minimizing the absolute value of "1−Rw3×c33", preferably, setting the value to 0. Accordingly, the switching frequency ω is determined so as to satisfy "1−Rw3×c33=0", or at least to minimize the absolute value of "1−Rw3×c33".

As described above, the control circuit 11E stores in advance the table or calculation formula indicating the relationship between the coupling coefficient k12 and the frequency characteristics of the gain. This table or calculation formula may be generated based on Mathematical Expressions 11 to 16, or based on other models.

Advantageous Effects of Fourth Embodiment

According to the contactless power transmission system of the fourth embodiment, the stably transmitting frequency and the transmitting voltage are determined based on the coupling coefficients k12a, k12b of the transmitting coil L1 and the receiving coil L2 detected in the power transmitter apparatus 10E. By setting the switching frequency fsw of the inverter 13 to the stably transmitting frequency, it is not required to control the power transmitter apparatus 10E and/or the power receiver apparatus 20E in accordance with the variations of the load value of the load device 23. Even when the load value of the load device 23 changes, it is possible to stably supply the load device 23 with its required voltage, without changing the voltage V0 outputted from the AC/DC converter 12, nor changing the switching frequency fsw. Since it is not necessary to provide the power receiver apparatus 20E with a DC/DC converter or the like in order to supply the load device 23 with its required voltage, it is possible to provide a small-sized, lightweight, and low-cost power receiver apparatus operable with high efficiency.

According to the contactless power transmission system of the fourth embodiment, it is possible to determine the stably transmitting frequency and the transmitting voltage based on the coupling coefficients k12a, k12b of the transmitting coil L1 and the receiving coil L2 detected in the power transmitter apparatus 10E, without referring to any signal fed back from the power receiver apparatus 20E to the power transmitter apparatus 10E. Accordingly, it would not be affected by a delay due to monitoring of the load value of the load device 23 and feedback from the power receiver apparatus 20E to the power transmitter apparatus 10E.

According to the contactless power transmission system of the fourth embodiment, it is not necessary to change the voltage V0 outputted from the AC/DC converter 12, and the switching frequency fsw of the inverter 13, as long as the coupling coefficients k12a, k12b of the transmitting coil L1 and the receiving coil L2 do not change. As a result, since the voltage V0 and the switching frequency fsw are less frequently changed, it is possible to stably supply the load device 23 with its required voltage.

According to the contactless power transmission system of the fourth embodiment, when the coupling coefficient k12a estimated based on the value of the current I3 or the voltage V3 matches the coupling coefficient k12b estimated based on the value of the current I1, it is possible to correctly estimate the coupling coefficient k12 of the transmitting coil L1 and the receiving coil L2.

According to the contactless power transmission system of the fourth embodiment, by determining whether or not the coupling coefficients k12a, k12b match each other, it is possible to detect a foreign object and stop the power transmission, and improve the safety of the contactless power transmission system. In a case of estimating the coupling coefficient of the transmitting coil and the receiving coil based on one circuit parameter, and comparing the estimated coupling coefficient with some threshold, it is difficult to distinguish whether the coupling coefficient has changed due to an influence of a foreign object, or due to other factors (a change in the distance between the transmitting coil and the receiving coil, and the like). In addition, in this case, it is only possible to determine whether the estimated coupling coefficient is higher or lower than a threshold, and the magnitude of the coupling coefficient cannot be considered. On the other hand, according to the contactless power transmission system of the fourth embodiment, it is possible to surely detect a foreign object, regardless whether the coupling coefficient is high or low.

According to the contactless power transmission system of the fourth embodiment, it is possible to surely detect a foreign object using a simple configuration not including a camera, a temperature sensor, and the like.

According to the contactless power transmission system of the fourth embodiment, it is possible to reduce leakage of the magnetic flux by adding the auxiliary coil L3, as compared with the case where only the transmitting coil L1 and the receiving coil L2 are provided.

According to the contactless power transmission system of the fourth embodiment, it is possible to accurately determine the stably transmitting frequency using the load element R0 having the predetermined load value.

According to the contactless power transmission system of the fourth embodiment, when the coupling coefficient k12 of the transmitting coil L1 and the receiving coil L2 significantly changes, it is possible to follow the change in the coupling coefficient k12, by redetermining the stably transmitting frequency and the transmitting voltage based on the present coupling coefficient k12.

According to the contactless power transmission system of the fourth embodiment, it is possible to protect the load device 23 from overvoltage using the load element R0 and the switch circuit SW.

According to the contactless power transmission system of the fourth embodiment, it is possible to improve the transmission efficiency and the transmission distance using the resonance of the receiving coil L2 and the capacitor C2.

As described above, according to the contactless power transmission system of the fourth embodiment, it is possible to control the power transmitter apparatus 10E to stably supply the load device 23 with its required voltage, without need of an extra circuit in the power receiver apparatus 20E.

Fifth Embodiment

A contactless power transmission system according to the fifth embodiment is provided with an auxiliary coil electromagnetically coupled to a transmitting coil, and determines a stably transmitting frequency and a transmitting voltage based on a value of a current or a voltage generated in the auxiliary coil.

Configuration Example of Fifth Embodiment

Figure 44:
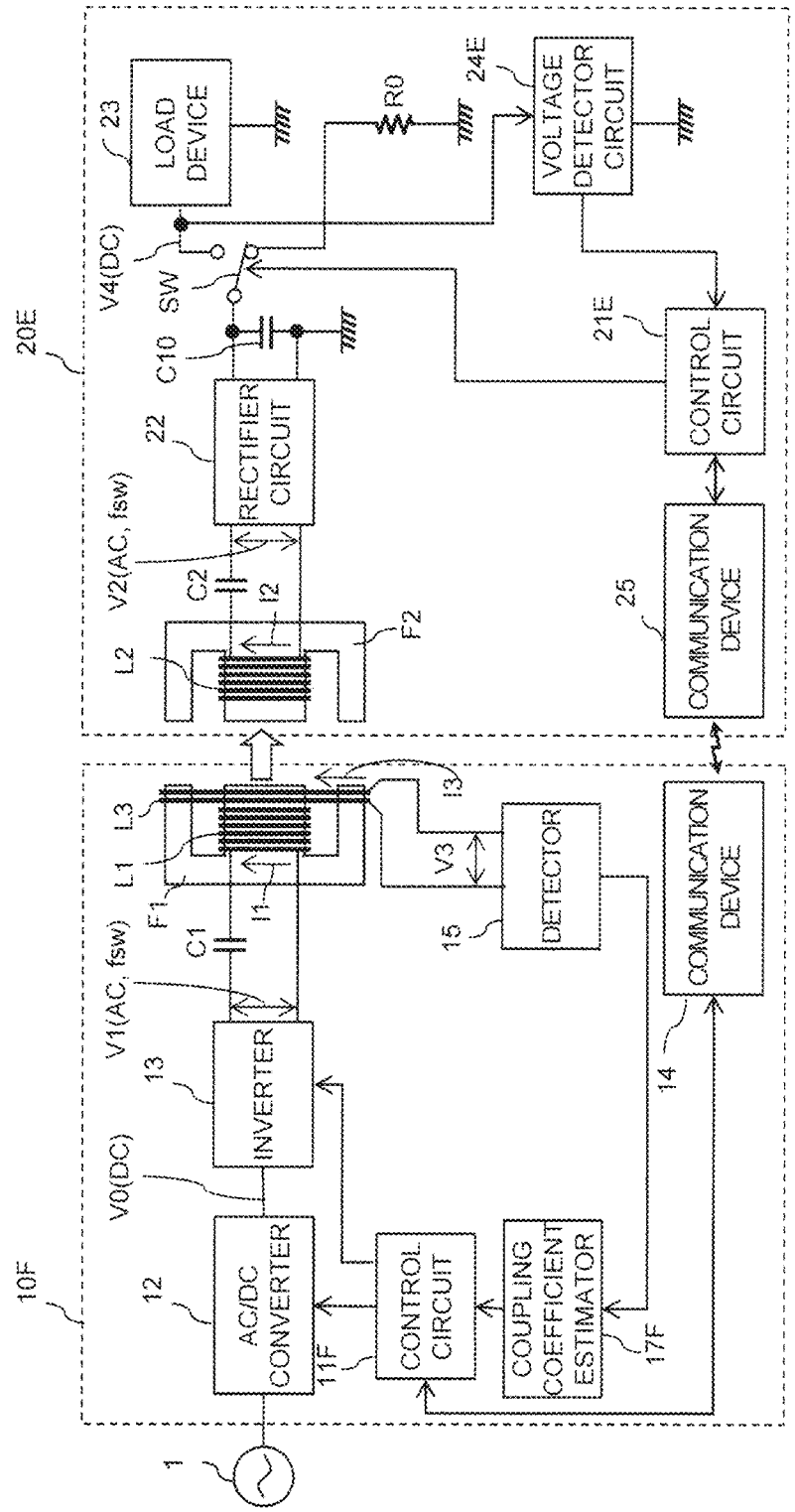
FIG. 44 is a block diagram illustrating a configuration of a contactless power transmission system according to a fifth embodiment.

FIG. 44 is a block diagram illustrating a configuration of a contactless power transmission system according to the fifth embodiment. The contactless power transmission system of FIG. 44 includes a power transmitter apparatus 10F and the power receiver apparatus 20E.

The power transmitter apparatus 10F is provided with a control circuit 11F and a coupling coefficient estimator 17F, instead of the control circuit 11E and the coupling coefficient estimator 17 of FIG. 33, and not provided with the detector 16 and the current detection resistor R1 of FIG. 33.

The control circuit 11F controls overall operations of the power transmitter apparatus 10F. The control circuit 11F includes a CPU, a RAM, a ROM, and the like, and performs power controlling process to be described below with reference to FIG. 45.

The coupling coefficient estimator 17F estimates the coupling coefficient k12 of the transmitting coil L1 and the receiving coil L2, based on only the value of the current I3 or the voltage V3 generated in the auxiliary coil L3.

In the other aspects, the power transmitter apparatus 10F is configured and operates in a manner similar to that of the power transmitter apparatus 10E of FIG. 33.

In the fifth embodiment, the control circuit 11F, the detector 15, and the coupling coefficient estimator 17 are also collectively referred to as a "controller apparatus" of the power transmitter apparatus 10F.

The power receiver apparatus 20E of FIG. 44 is configured and operates in a manner similar to that of the power receiver apparatus 20E of FIG. 33.

Operation Example of Fifth Embodiment

The control circuit 11F of the power transmitter apparatus 10F of FIG. 44 performs power transmitting process similar to that of FIG. 39. In step S112 of FIG. 39, the control circuit 11F of the power transmitter apparatus 10F performs power controlling process of FIG. 45, instead of the power controlling process of FIG. 40.

Figure 45:
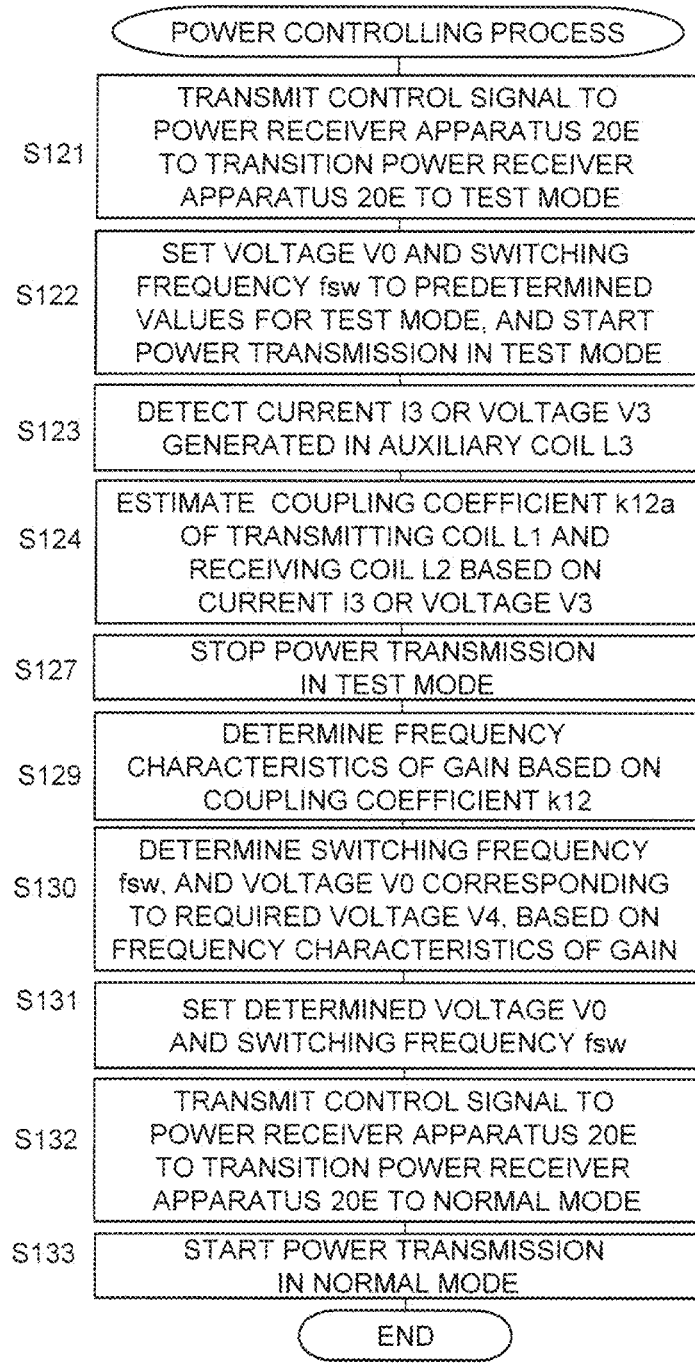
FIG. 45 is a flowchart illustrating subroutine of power controlling process performed by a control circuit 11F of the power transmitter apparatus 10F of FIG. 44.

FIG. 45 is a flowchart illustrating subroutine of power controlling process performed by the control circuit 11F of the power transmitter apparatus 10F of FIG. 44. When it is considered that there is no foreign object between the transmitting coil L1 and the receiving coil L2, steps S125, S126, S128, and S134 of FIG. 40 may be omitted. As a result, the configuration and operation of the power transmitter apparatus 10F can be simplified as compared with those of the power transmitter apparatus 10E of FIG. 33.

Advantageous Effects of Fifth Embodiment

According to the contactless power transmission system of the fifth embodiment, it is possible to determine the stably transmitting frequency and the transmitting voltage based on the coupling coefficient k12a of the transmitting coil L1 and the receiving coil L2 detected in the power transmitter apparatus 10F, without referring to any signal fed back from the power receiver apparatus 20E to the power transmitter apparatus 10F, in a manner similar to that of the fourth embodiment. Accordingly, it would not be affected by a delay due to monitoring of the load value of the load device 23 and feedback from the power receiver apparatus 20E to the power transmitter apparatus 10F.

According to the contactless power transmission system of the fifth embodiment, since the current detection resistor R1 and the detector 16 are removed, the configuration and operation of the power transmitter apparatus 10F can be simplified as compared with those of the power transmitter apparatus 10E of FIG. 33.

Sixth Embodiment

A contactless power transmission system according to the sixth embodiment determines the stably transmitting frequency and the transmitting voltage based on a current flowing through a transmitting coil.

Configuration Example of Sixth Embodiment

Figure 46:
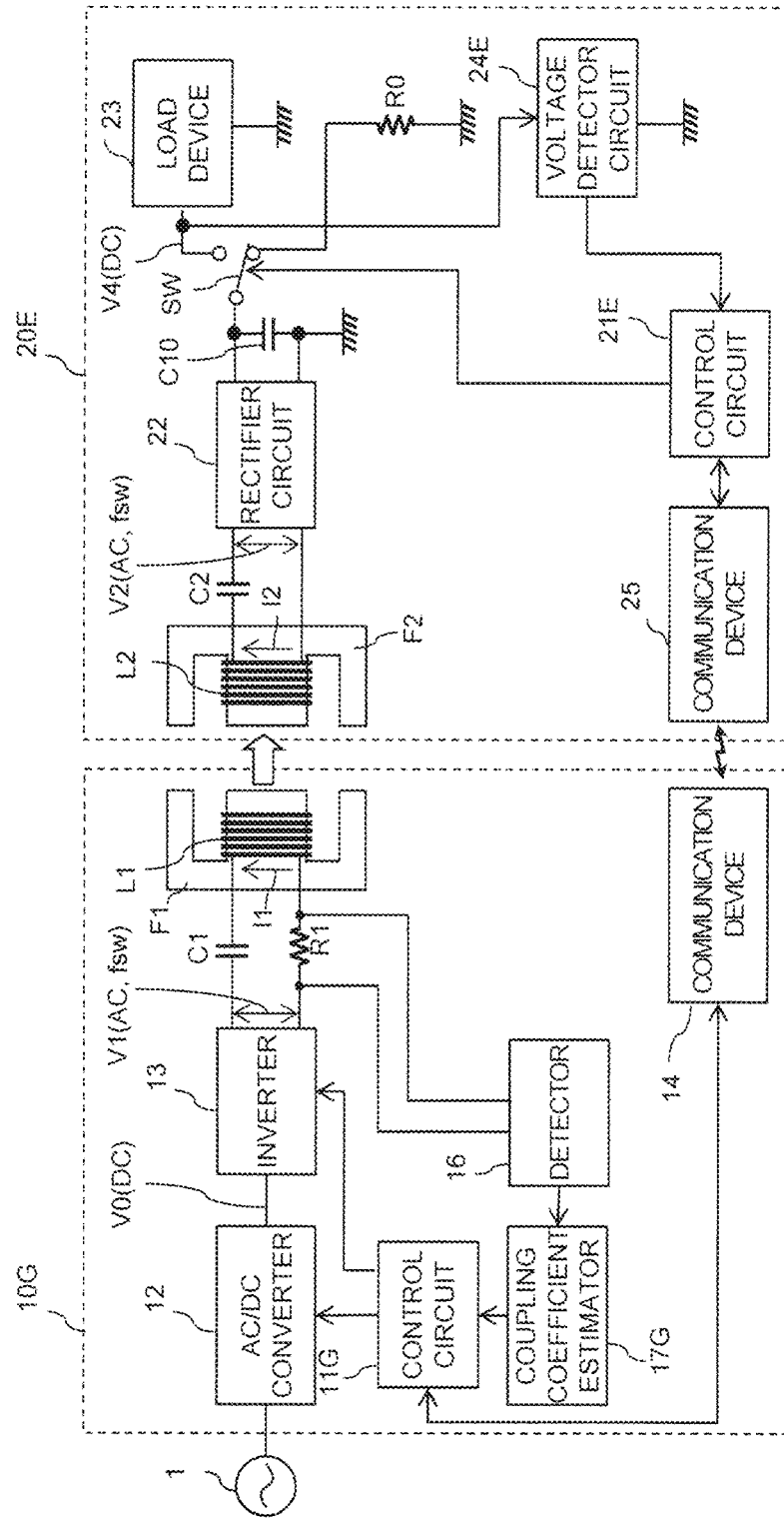
FIG. 46 is a block diagram illustrating a configuration of a contactless power transmission system according to a sixth embodiment.

FIG. 46 is a block diagram illustrating a configuration of a contactless power transmission system according to the sixth embodiment. The contactless power transmission system of FIG. 46 includes a power transmitter apparatus 10G and the power receiver apparatus 20E.

The power transmitter apparatus 10G is provided with a control circuit 11G and a coupling coefficient estimator 17G, instead of the control circuit 11E and the coupling coefficient estimator 17 of FIG. 33, and not provided with the auxiliary coil L3 and the detector 15 of FIG. 33.

The control circuit 11G controls overall operations of the power transmitter apparatus 10G. The control circuit 11G includes a CPU, a RAM, a ROM, and the like, and performs power controlling process to be described below with reference to FIG. 47.

The coupling coefficient estimator 17G estimates the coupling coefficient k12 of the transmitting coil L1 and the receiving coil L2, based on only the value of the current I1 generated in the transmitting coil L1.

In the other aspects, the power transmitter apparatus 10G is configured and operates in a manner similar to that of the power transmitter apparatus 10E of FIG. 33.

In the sixth embodiment, the control circuit 11G, the detector 15, and the coupling coefficient estimator 17 are also collectively referred to as a "controller apparatus" of the power transmitter apparatus 10G.

The power receiver apparatus 20E of FIG. 46 is configured and operates in a manner similar to that of the power receiver apparatus 20E of FIG. 33.

Operation Example of Sixth Embodiment

The control circuit 11G of the power transmitter apparatus 10G of FIG. 46 performs power transmitting process similar to that of FIG. 39. In step S112 of FIG. 39, the control circuit 11G of the power transmitter apparatus 10G performs power controlling process of FIG. 47, instead of the power controlling process of FIG. 40.

Figure 47:
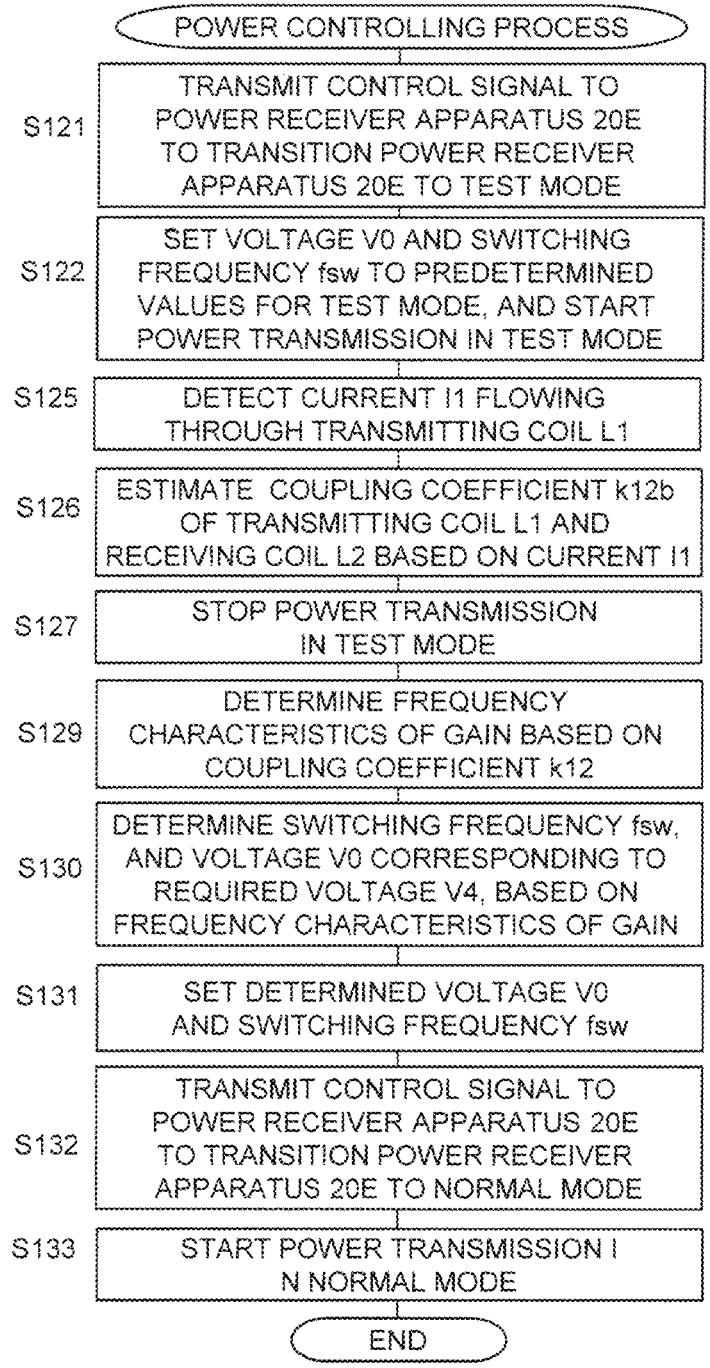
FIG. 47 is a flowchart illustrating subroutine of power controlling process performed by a control circuit 11G of the power transmitter apparatus 10G of FIG. 46.

FIG. 47 is a flowchart illustrating subroutine of power controlling process performed by the control circuit 11G of the power transmitter apparatus 10G of FIG. 46. When it is considered that there is no foreign object between the transmitting coil L1 and the receiving coil L2, steps S123, S124, S128, and S134 of FIG. 40 may be omitted. As a result, the configuration and operation of the power transmitter apparatus 10F can be simplified as compared with that of the power transmitter apparatus 10E of FIG. 33.

Advantageous Effects of Sixth Embodiment

According to the contactless power transmission system of the sixth embodiment, it is possible to determine the stably transmitting frequency and the transmitting voltage based on the coupling coefficient k12b of the transmitting coil L1 and the receiving coil L2 detected in the power transmitter apparatus 10G, without referring to any signal fed back from the power receiver apparatus 20E to the power transmitter apparatus 10G, in a manner similar to that of the fourth embodiment. Accordingly, it would not be affected by a delay due to monitoring of the load value of the load device 23 and feedback from the power receiver apparatus 20E to the power transmitter apparatus 10G.

Seventh Embodiment

The power transmitter apparatus according to the fourth embodiment may combined with the power receiver apparatus according to the first embodiment. According to a contactless power transmission system of the seventh embodiment, a power receiver apparatus is provided with one load element having a predetermined load value, and a stably transmitting frequency and a transmitting voltage are determined based on a voltage applied to the load element. In addition, according to the contactless power transmission system of the seventh embodiment, a power transmitter apparatus is provided with an auxiliary coil electromagnetically coupled to a transmitting coil, and a coupling coefficient of the transmitting coil and a receiving coil are estimated based on a value of a current or a voltage generated in the auxiliary coil, and based on a current flowing through the transmitting coil.

Configuration Example of Seventh Embodiment

Figure 48:
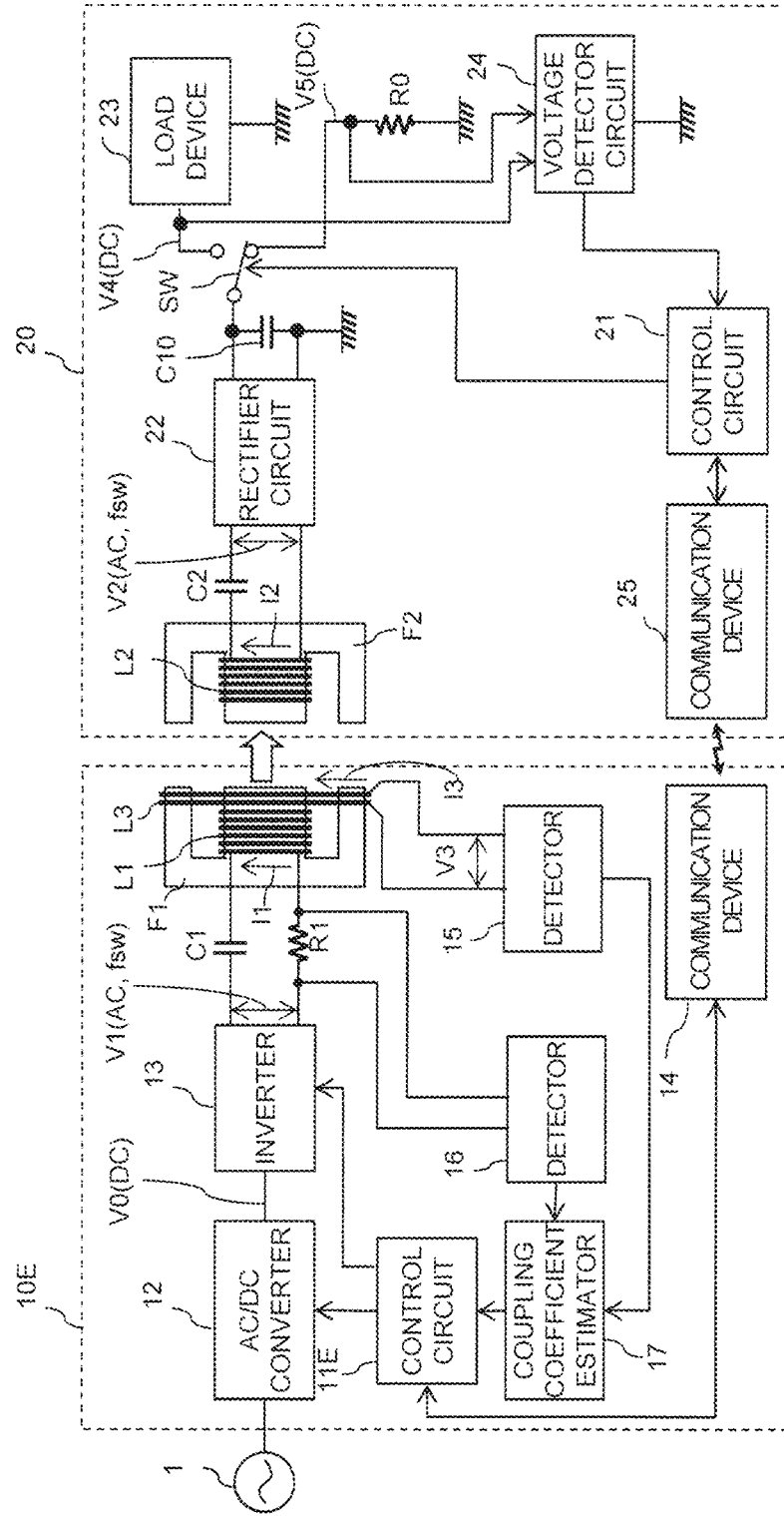
FIG. 48 is a block diagram illustrating a configuration of a contactless power transmission system according to a seventh embodiment.

FIG. 48 is a block diagram illustrating a configuration of a contactless power transmission system according to the seventh embodiment. The contactless power transmission system of FIG. 48 includes the power transmitter apparatus 10E and the power receiver apparatus 20.

The power transmitter apparatus 10E of FIG. 48 is configured and operates in a manner similar to that of the power transmitter apparatus 10E of FIG. 33, except for performing power controlling process to be described below with reference to FIG. 49.

The control circuit 11E controls the AC/DC converter 12 and the inverter 13 to generate transmitting power having a frequency varying within the predetermined frequency range. The control circuit 11E receives a detected value of the output voltage of the power receiver apparatus 20 from the power receiver apparatus 20 using the communication device 14, the detected value being detected in the power receiver apparatus 20 when generating the transmitting power using the AC/DC converter 12 and the inverter 13. When generating the transmitting power using the AC/DC converter 12 and the inverter 13, the coupling coefficient estimator 17 estimates the coupling coefficients k12a, k12b of the transmitting coil L1 and the receiving coil L2, as described above. The control circuit 11E determines the stably transmitting frequency based on the detected value of the output voltage of the power receiver apparatus 20, the stably transmitting frequency indicating the frequency of the transmitting power at which the dependency of the output voltage of the power receiver apparatus 20 on the load value of the power receiver apparatus 20 is at least locally minimized within the predetermined frequency range. The control circuit 11E determines the transmitting voltage based on the detected value of the output voltage of the power receiver apparatus 20, the transmitting voltage indicating the voltage of the transmitting power at which the output voltage of the power receiver apparatus 20 reaches the predetermined target voltage when generating the transmitting power having the stably transmitting frequency. The control circuit 11E controls the AC/DC converter 12 and the inverter 13 to generate the transmitting power having the stably transmitting frequency and the transmitting voltage.

When the difference between the first coupling coefficient k12a and the second coupling coefficient k12b is equal to or less than the predetermined threshold, the control circuit 11E controls the AC/DC converter 12 and the inverter 13 to generate the transmitting power having the stably transmitting frequency and the transmitting voltage. When the difference between the first coupling coefficient k12a and the second coupling coefficient k12b exceeds the predetermined threshold, the control circuit 11E controls the AC/DC converter 12 and the inverter 13 to stop the power transmission to the power receiver apparatus 20. Here, the magnitude of the threshold is set such that the first coupling coefficient k12a and the second coupling coefficient k12b can be regarded to be substantially identical to each other.

The control circuit 11E determines the stably transmitting frequency and the transmitting voltage when starting power transmission from the power transmitter apparatus 10E to the power receiver apparatus 20. When the coupling coefficient k12 of the transmitting coil L1 and the receiving coil L2 significantly changes from the value obtained when determining the stably transmitting frequency and the transmitting voltage, the control circuit 11E redetermines the stably transmitting frequency and the transmitting voltage based on a present detected value of the output voltage of the power receiver apparatus 20. As a result, the control circuit 11E controls the AC/DC converter 12 and the inverter 13 to generate the transmitting power having the stably transmitting frequency and the transmitting voltage.

In the seventh embodiment, the control circuit 11E, the communication device 14, the detectors 15 and 16, and the coupling coefficient estimator 17 are also collectively referred to as a "controller apparatus" of the power transmitter apparatus 10E.

The power receiver apparatus 20 of FIG. 48 is configured and operates in a manner similar to that of the power receiver apparatus 20 of FIG. 1 except for performing power receiving process to be described below with reference to FIG. 50.

Operation Example of Seventh Embodiment

Figure 49:
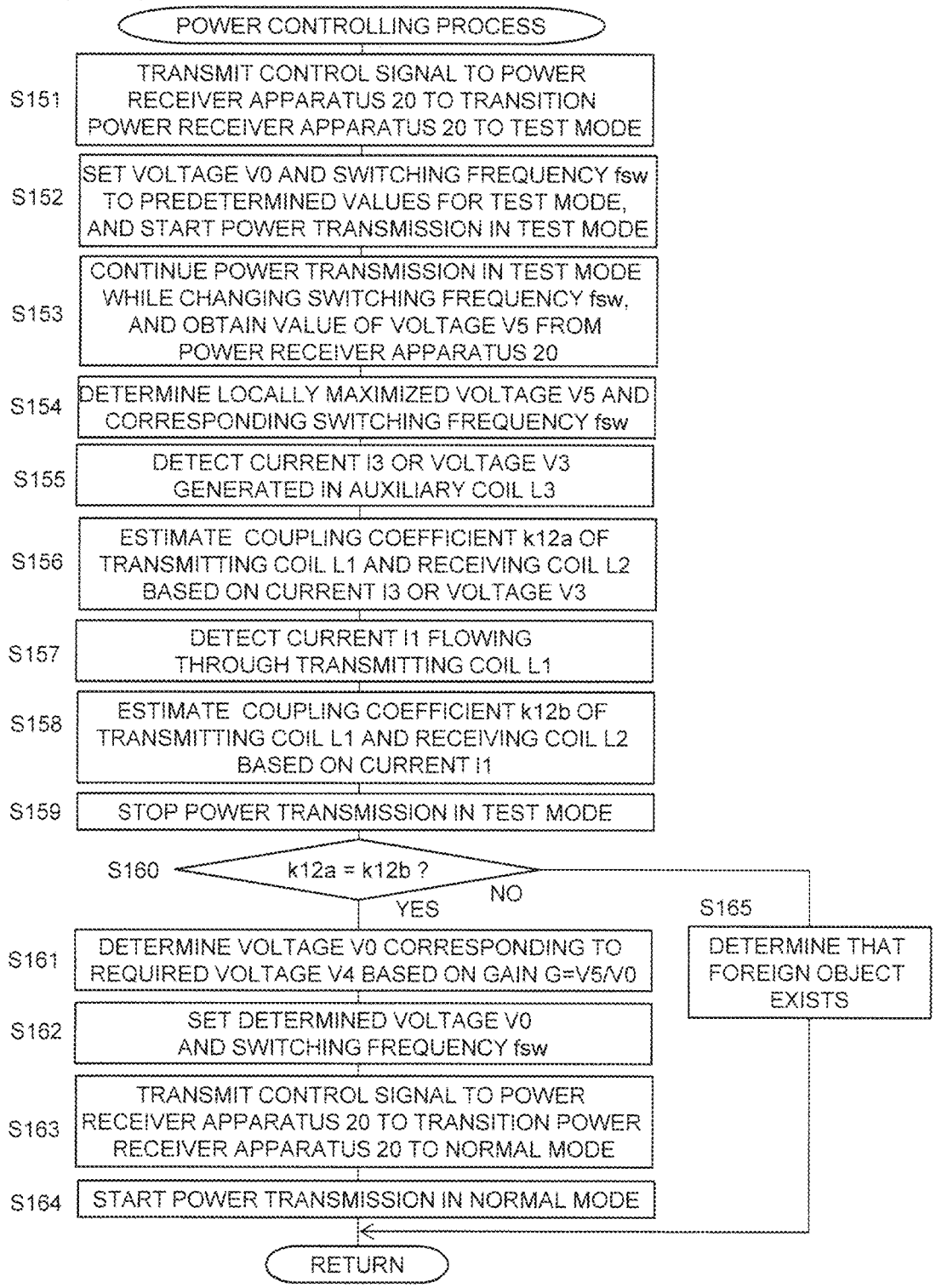
FIG. 49 is a flowchart illustrating subroutine of power controlling process performed by a control circuit 11E of the power transmitter apparatus 10E of FIG. 48.

FIG. 49 is a flowchart illustrating subroutine of power controlling process performed by the control circuit 11E of the power transmitter apparatus 10E of FIG. 48. FIG. 50 is a flowchart illustrating power receiving process performed by the control circuit 21 of the power receiver apparatus 20 of FIG. 48.

The control circuit 11E of the power transmitter apparatus 10E of FIG. 49 performs power transmitting process similar to that of FIG. 39. In step S112 of FIG. 39, the control circuit 11E of the power transmitter apparatus 10E performs power controlling process of FIG. 49, instead of the power controlling process of FIG. 40.

For example, when the power receiver apparatus 20 is disposed at a position capable of receiving power from the power transmitter apparatus 10E, the power transmitting process and the power receiving process are started. In step S161 of FIG. 50, the control circuit 21 of the power receiver apparatus 20 transmits a control signal for requesting power supply, to the power transmitter apparatus 10E using the communication device 25. In step S111 of FIG. 39, the control circuit 11E of the power transmitter apparatus 10E receives the control signal for requesting power supply, from the power receiver apparatus 20 using the communication device 14.

In step S112 of FIG. 39, the control circuit 11E of the power transmitter apparatus 10E performs power controlling process.

In step S151 of FIG. 49, the control circuit 11E of the power transmitter apparatus 10E transmits a control signal for requesting transition of the power receiver apparatus 20 to the test mode, to the power receiver apparatus 20 using the communication device 14. In step S172 of FIG. 50, the control circuit 21 of the power receiver apparatus 20 receives the control signal from the power transmitter apparatus 10E using the communication device 25, and according to the control signal, switches the switch circuit SW to supply the output voltage of the power receiver apparatus 20 to the load element R0 (that is, transition to the test mode).

In step S152 of FIG. 49, the control circuit 11E of the power transmitter apparatus 10E sets the voltage V0 and the switching frequency fsw to predetermined values for the test mode, and starts power transmission in the test mode. In step S173 of FIG. 50, the control circuit 21 of the power receiver apparatus 20 detects the voltage V5 applied to the load element R0, using the voltage detector circuit 24, and notifies the power transmitter apparatus 10E of the voltage V5 using the communication device 25.

In step S153 of FIG. 49, the control circuit 11E of the power transmitter apparatus 10E continues the power transmission in the test mode while changing the switching frequency fsw, and obtains the value of the voltage V5 from the power receiver apparatus 20 using the communication device 14. In step S154 of FIG. 49, when changing the switching frequency fsw within the predetermined frequency range, the control circuit 11E of the power transmitter apparatus 10E determines a locally maximized voltage V5, and a switching frequency fst at which the voltage V5 is locally maximized.

In step S155 of FIG. 49, the power transmitter apparatus 10E detects the value of the current I3 or the voltage V3 generated in the auxiliary coil L3, using the detector 15. In step S156 of FIG. 49, the power transmitter apparatus 10E estimates the coupling coefficient k12a of the transmitting coil L1 and the receiving coil L2 by referring to the table or calculation formula based on the detected value of the current I3 or the voltage V3, using the coupling coefficient estimator 17.

In step S157 of FIG. 49, the power transmitter apparatus 10E detects the value of the current I1 flowing through the transmitting coil L1, using the detector 16. In step S158 of FIG. 49, the power transmitter apparatus 10E estimates the coupling coefficient k12b of the transmitting coil L1 and the receiving coil L2 by referring to the table or calculation formula based on the detected value of the current I1, using the coupling coefficient estimator 17.

In step S159 of FIG. 49, the control circuit 11E of the power transmitter apparatus 10E stops the power transmission in the test mode.

In step S160 of FIG. 49, the control circuit 11E of the power transmitter apparatus 10E determines whether or not the estimated coupling coefficients k12a, k12b substantially match each other: if YES, the process proceeds to step S161; if NO, the process proceeds to step S165.

In step S161 of FIG. 49, the control circuit 11E of the power transmitter apparatus 10E determines the voltage V0 outputted from the AC/DC converter 12 corresponding to the required voltage V4 of the load device 23, based on the gain G=V5/V0 of the contactless power transmission system.

In step S162 of FIG. 49, the control circuit 11E of the power transmitter apparatus 10E sets the voltage V0 determined in step S161, to the AC/DC converter 12, and sets the switching frequency fst determined in step S154, to the inverter 13.

In step S163 of FIG. 49, the control circuit 11E of the power transmitter apparatus 10E transmits a control signal for requesting transition of the power receiver apparatus 20 to the normal mode, to the power receiver apparatus 20 using the communication device 14. In step S174 of FIG. 50, the control circuit 21 of the power receiver apparatus 20 receives the control signal from the power transmitter apparatus 10E using the communication device 25, and according to the control signal, switches the switch circuit SW to supply the output voltage of the power receiver apparatus 20 to the load device 23 (that is, transition to the normal mode).

In step S164 of FIG. 49, the control circuit 11E of the power transmitter apparatus 10E starts power transmission in the normal mode using the voltage V0 and the switching frequency fst that are set in step S162.

In step S165 of FIG. 49, the control circuit 11E of the power transmitter apparatus 10E determines that a foreign object exists. The control circuit 11E of the power transmitter apparatus 10E controls the AC/DC converter 12 and the inverter 13 to keep the power transmission to the power receiver apparatus 20 stopping.

Thereafter, the control circuit 11E of the power transmitter apparatus 10E performs steps S113 to S115 of FIG. 39 in a manner similar to that of the fourth embodiment. The control circuit 21 of the power receiver apparatus 20 performs steps S175 to S179 of FIG. 50. Steps S175 to S179 of FIG. 50 are substantially similar to steps S144 to S148 of FIG. 41.

Advantageous Effects of Seventh Embodiment

According to the contactless power transmission system of the seventh embodiment, the stably transmitting frequency and the transmitting voltage are determined based on the voltage V5 applied to the load element R0. By setting the switching frequency fsw of the inverter 13 to the stably transmitting frequency, it is not required to control the power transmitter apparatus 10 and/or the power receiver apparatus 20 in accordance with the variations of the load value of the load device 23.

According to the contactless power transmission system of the seventh embodiment, when the coupling coefficients k12a, k12b of the transmitting coil L1 and the receiving coil L2 significantly change, it is possible to follow the changes in the coupling coefficients k12a, k12bby redetermining the stably transmitting frequency and the transmitting voltage based on the present detected value of the output voltage of the power receiver apparatus 20, As described above, according to the contactless power transmission system of the seventh embodiment, it is possible to control the power transmitter apparatus 10E to stably supply the load device 23 with its required voltage, without need of an extra circuit in the power receiver apparatus 20.

The seventh embodiment has been described for the case where the power transmitter apparatus according to the fourth embodiment is combined with the power receiver apparatus according to the first embodiment. Alternatively, the power transmitter apparatus according to the fourth embodiment may be combined with the power receiver apparatus according to the second or third embodiment.

The power transmitter apparatus according to the seventh embodiment may perform steps S3 to S4 of FIG. 8, instead of or in addition to step S113 of FIG. 39. In this case, after step S174 of FIG. 50, the power receiver apparatus further performs step S25 of FIG. 10. As a result, when coupling coefficients k12a, k12b of the transmitting coil L1 and the receiving coil L2 significantly change, or when the output voltage of power receiver apparatus 20 significantly changes due to the changes in the coupling coefficients k12a, k12b, it is possible to surely follow the changes in the coupling coefficients k12a, k12b.

Eighth Embodiment

The power transmitter apparatus according to the fifth embodiment may combined with the power receiver apparatus according to the first embodiment. According to a contactless power transmission system of the eighth embodiment, a power receiver apparatus is provided with one load element having a predetermined load value, and a stably transmitting frequency and a transmitting voltage are determined based on a voltage applied to the load element. In addition, according to the contactless power transmission system of the eighth embodiment, a power transmitter apparatus is provided with an auxiliary coil electromagnetically coupled to a transmitting coil, and a coupling coefficient of the transmitting coil and a receiving coil are estimated based on a value of a current or a voltage generated in the auxiliary coil.

Configuration Example of Eighth Embodiment

Figure 51:
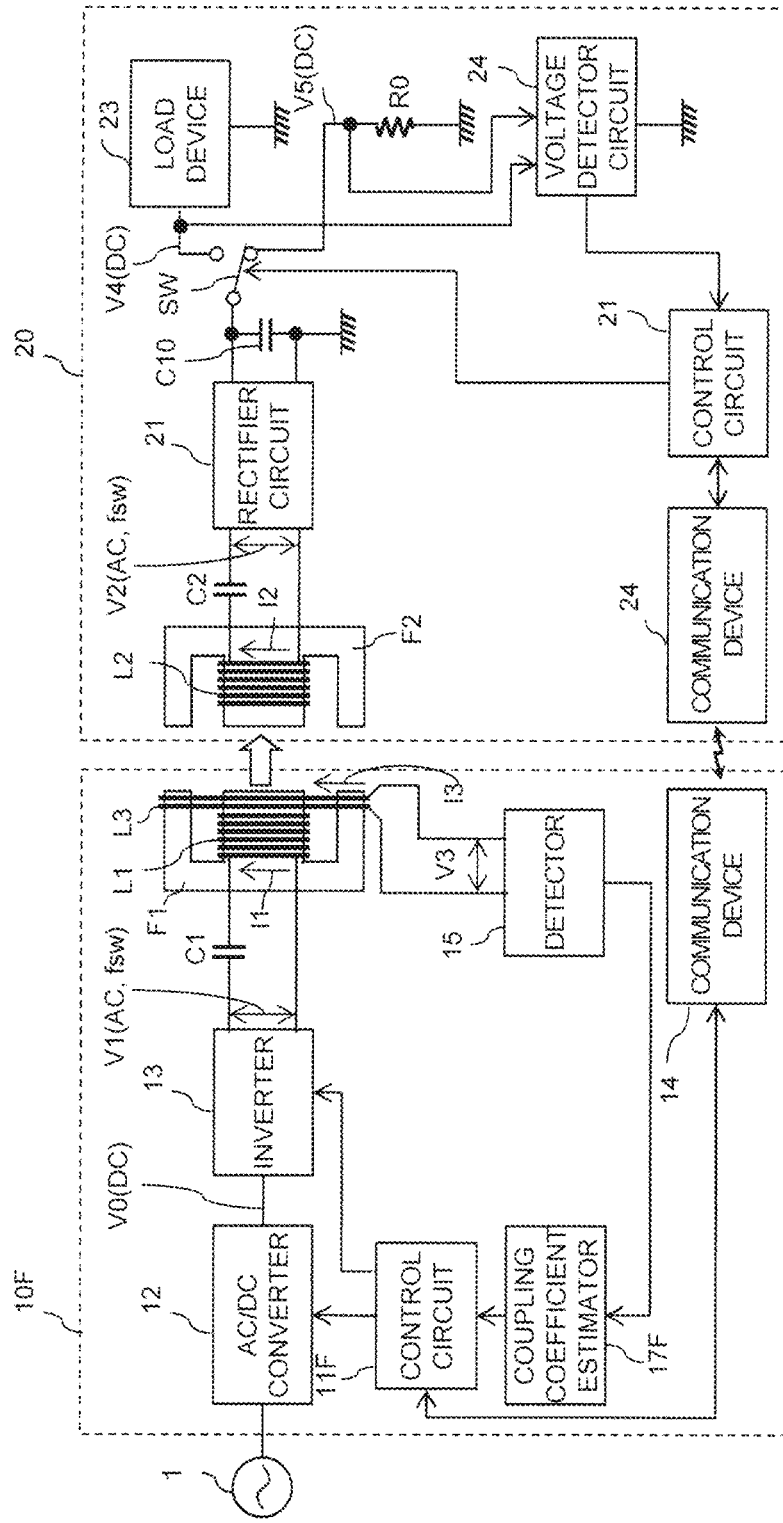
FIG. 51 is a block diagram illustrating a configuration of a contactless power transmission system according to an eighth embodiment.

FIG. 51 is a block diagram illustrating a configuration of a contactless power transmission system according to the eighth embodiment. The contactless power transmission system of FIG. 51 includes the power transmitter apparatus 10F and the power receiver apparatus 20.

The power transmitter apparatus 10F of FIG. 51 is configured and operates in a manner similar to that of the power transmitter apparatus 10F of FIG. 44, except for performing power controlling process to be described below with reference to FIG. 52.

In the eighth embodiment, the control circuit 11F, the communication device 14, the detector 15, and the coupling coefficient estimator 17 are also collectively referred to as a "controller apparatus" of the power transmitter apparatus 10F.

Figure 50:
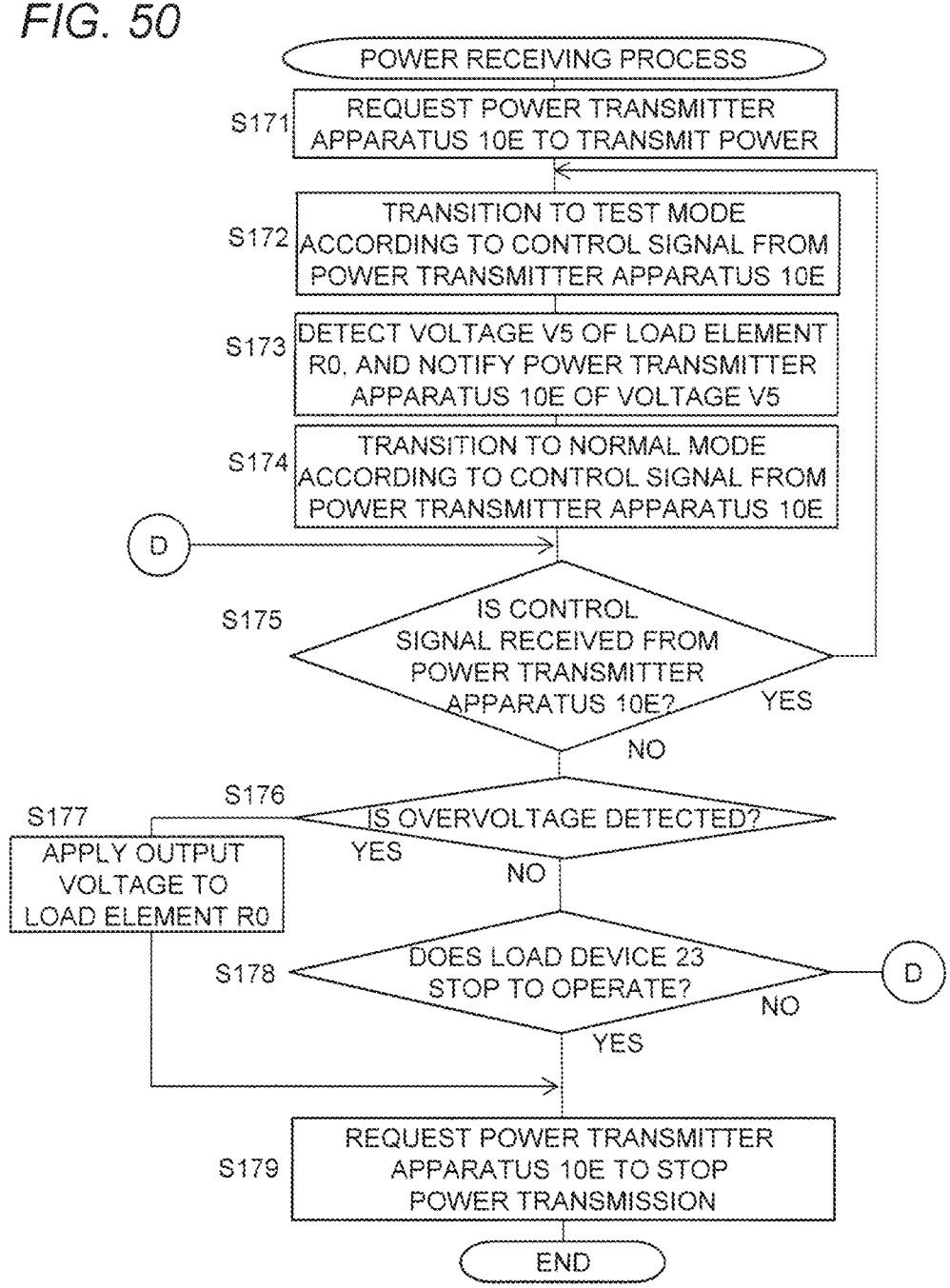
FIG. 50 is a flowchart illustrating power receiving process performed by a control circuit 21 of the power receiver apparatus 20 of FIG. 48.

The power receiver apparatus 20 of FIG. 51 is configured and operates in a manner similar to that of the power receiver apparatus 20 of FIG. 1, except for performing the power receiving process of FIG. 50.

Operation Example of Eighth Embodiment

The control circuit 11F of the power transmitter apparatus 10F of FIG. 51 performs power transmitting process similar to that of FIG. 39. In step S112 of FIG. 39, the control circuit 11F of the power transmitter apparatus 10F performs power controlling process of FIG. 52, instead of the power controlling process of FIG. 40.

Figure 52:
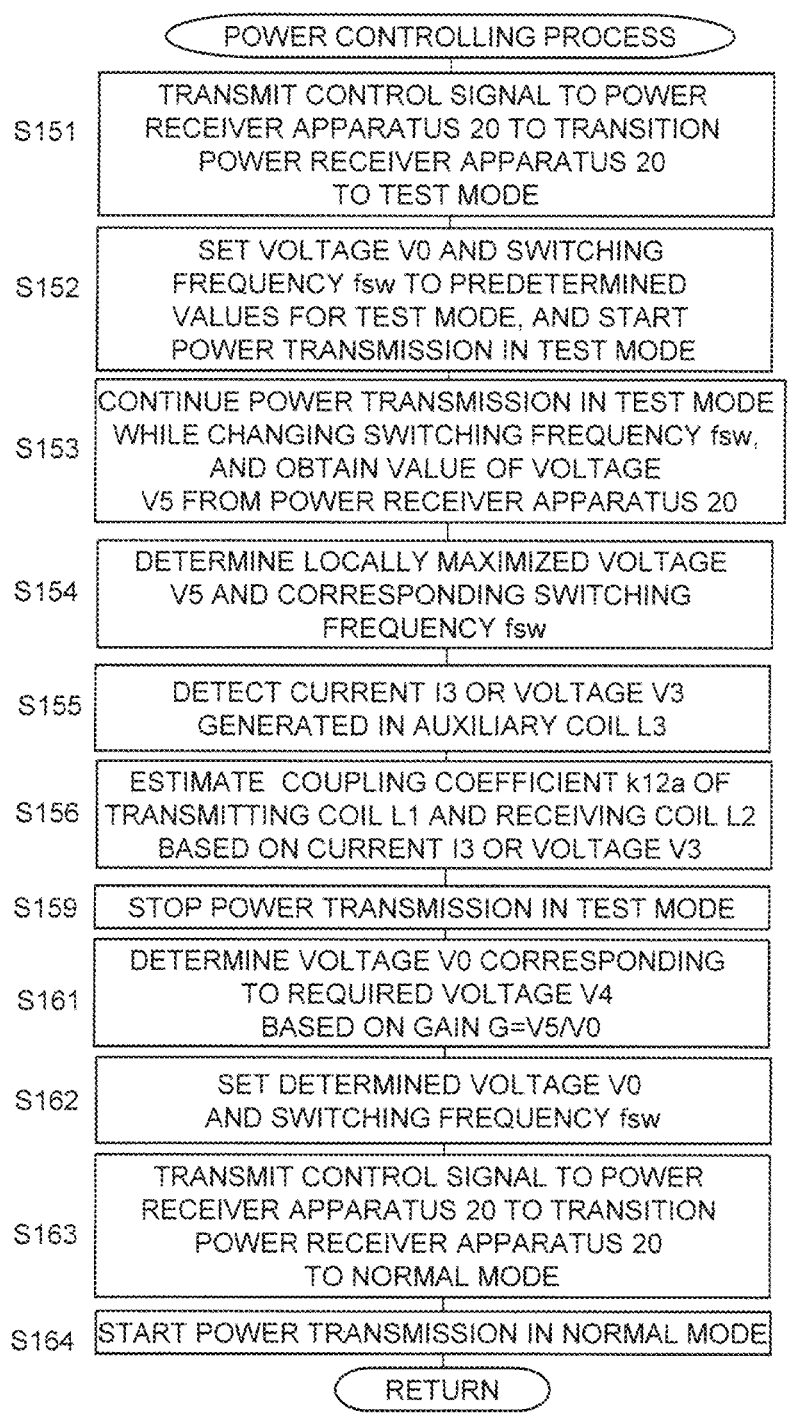
FIG. 52 is a flowchart illustrating subroutine of power controlling process performed by a control circuit 11F of the power transmitter apparatus 10F of FIG. 51.

FIG. 52 is a flowchart illustrating subroutine of power controlling process performed by the control circuit 11F of the power transmitter apparatus 10F of FIG. 51. When it is considered that there is no foreign object between the transmitting coil L1 and the receiving coil L2, steps S157, S158, S160, and S165 of FIG. 49 may be omitted. As a result, the configuration and operation of the power transmitter apparatus 10F can be simplified as compared with that of the power transmitter apparatus 10E of FIG. 48.

Advantageous Effects of Eighth Embodiment

According to the contactless power transmission system of the eighth embodiment, when the coupling coefficient k12a of the transmitting coil L1 and the receiving coil L2 significantly changes, it is possible to follow the change in the coupling coefficient k12a by redetermining the stably transmitting frequency and the transmitting voltage based on the present detected value of the output voltage of the power receiver apparatus 20.

According to the contactless power transmission system of the eighth embodiment, since the current detection resistor R1 and the detector 16 are omitted, the configuration and operation of the power transmitter apparatus 10F can be simplified as compared with that of the power transmitter apparatus 10E of FIG. 48.

The eighth embodiment has been described for the case where the power transmitter apparatus according to the fifth embodiment is combined with the power receiver apparatus according to the first embodiment, Alternatively, the power transmitter apparatus according to the fifth embodiment may be combined with the power receiver apparatus according to the second or third embodiment.

Ninth Embodiment

The power transmitter apparatus according to the sixth embodiment and the power receiver apparatus according to the first embodiment may be combined. According to a contactless power transmission system of the ninth embodiment, a power receiver apparatus is provided with one load element having a predetermined load value, and a stably transmitting frequency and a transmitting voltage are determined based on a voltage applied to the load element. In addition, according to the contactless power transmission system of the ninth embodiment, a coupling coefficient of a transmitting coil and a receiving coil is estimated based on a current flowing through a transmitting coil.

Configuration Example of Ninth Embodiment

Figure 53:
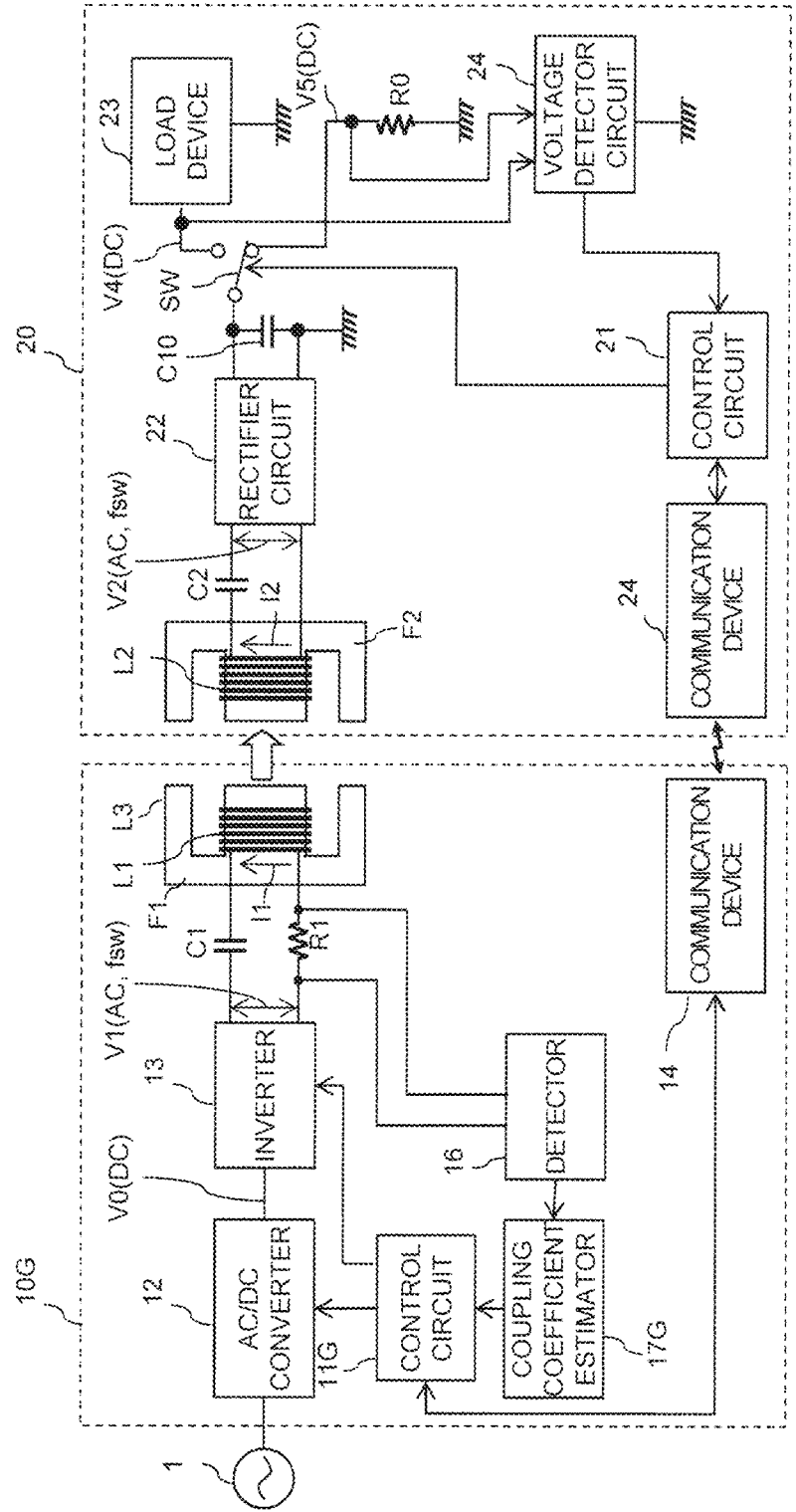
FIG. 53 is a block diagram illustrating a configuration of a contactless power transmission system according to a ninth embodiment.

FIG. 53 is a block diagram illustrating a configuration of a contactless power transmission system according to the ninth embodiment. The contactless power transmission system of FIG. 53 includes the power transmitter apparatus 10G and the power receiver apparatus 20.

The power transmitter apparatus 10G of FIG. 53 is configured and operates in a manner similar to that of the power transmitter apparatus 10G of FIG. 46, except for performing power controlling process to be described below with reference to FIG. 54.

In the ninth embodiment, the control circuit 11G, the communication device 14, the detector 16, and the coupling coefficient estimator 17 are also collectively referred to as a "controller apparatus" of the power transmitter apparatus 10G.

The power receiver apparatus 20 of FIG. 53 is configured and operates in a manner similar to that of the power receiver apparatus 20 of FIG. 1, except for performing the power receiving process of FIG. 50.

Operation Example of Ninth Embodiment

The control circuit 11G of the power transmitter apparatus 10G of FIG. 53 performs power transmitting process similar to that of FIG. 39. In step S112 of FIG. 39, the control circuit 11G of the power transmitter apparatus 10G performs power controlling process of FIG. 54, instead of the power controlling process of FIG. 40.

Figure 54:
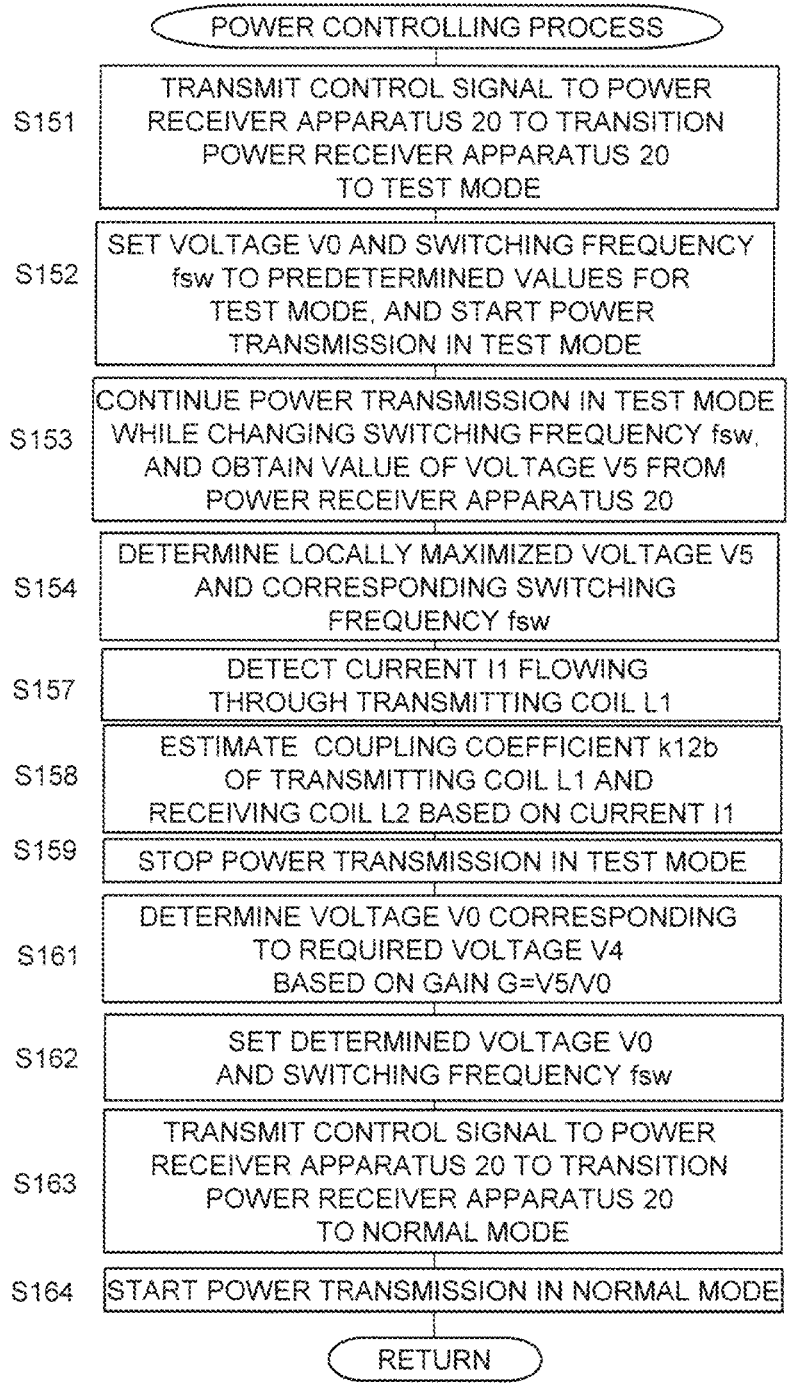
FIG. 54 is a flowchart illustrating subroutine of power controlling process performed by a control circuit 11G of the power transmitter apparatus 10G of FIG. 53.

FIG. 54 is a flowchart illustrating subroutine of power controlling process performed by the control circuit 11G of the power transmitter apparatus 10G of FIG. 53. When it is considered that there is no foreign object between the transmitting coil L1 and the receiving coil L2, steps S155, S156, S160, and S165 of FIG. 49 may be omitted. As a result, the configuration and operation of the power transmitter apparatus 10F can be simplified as compared with that of the power transmitter apparatus 10E of FIG. 48.

Advantageous Effects of Ninth Embodiment

According to the contactless power transmission system of the eighth embodiment, when the coupling coefficient k12b of the transmitting coil L1 and the receiving coil L2 significantly changes, it is possible to follow the change in the coupling coefficient k12b by redetermining the stably transmitting frequency and the transmitting voltage based on the present detected value of the output voltage of the power receiver apparatus 20.

According to the contactless power transmission system of the ninth embodiment, since the auxiliary coil L3 and the detector 15 are omitted, the configuration and operation of the power transmitter apparatus 10F can be simplified as compared with that of the power transmitter apparatus 10E of FIG. 48.

Tenth Embodiment

According to the first to ninth embodiments, the load device is protected from overvoltage using the load element to which the output voltage of the power receiver apparatus is applied. Alternatively, the load device may be protected from overvoltage using other means. According to a contactless power transmission system of the tenth embodiment, a power receiver apparatus is provided with an auxiliary coil electromagnetically coupled to a transmitting coil, and a load element connected to the auxiliary coil, and the load device is protected from overvoltage using these components.

Configuration Example of Tenth Embodiment

Figure 55:
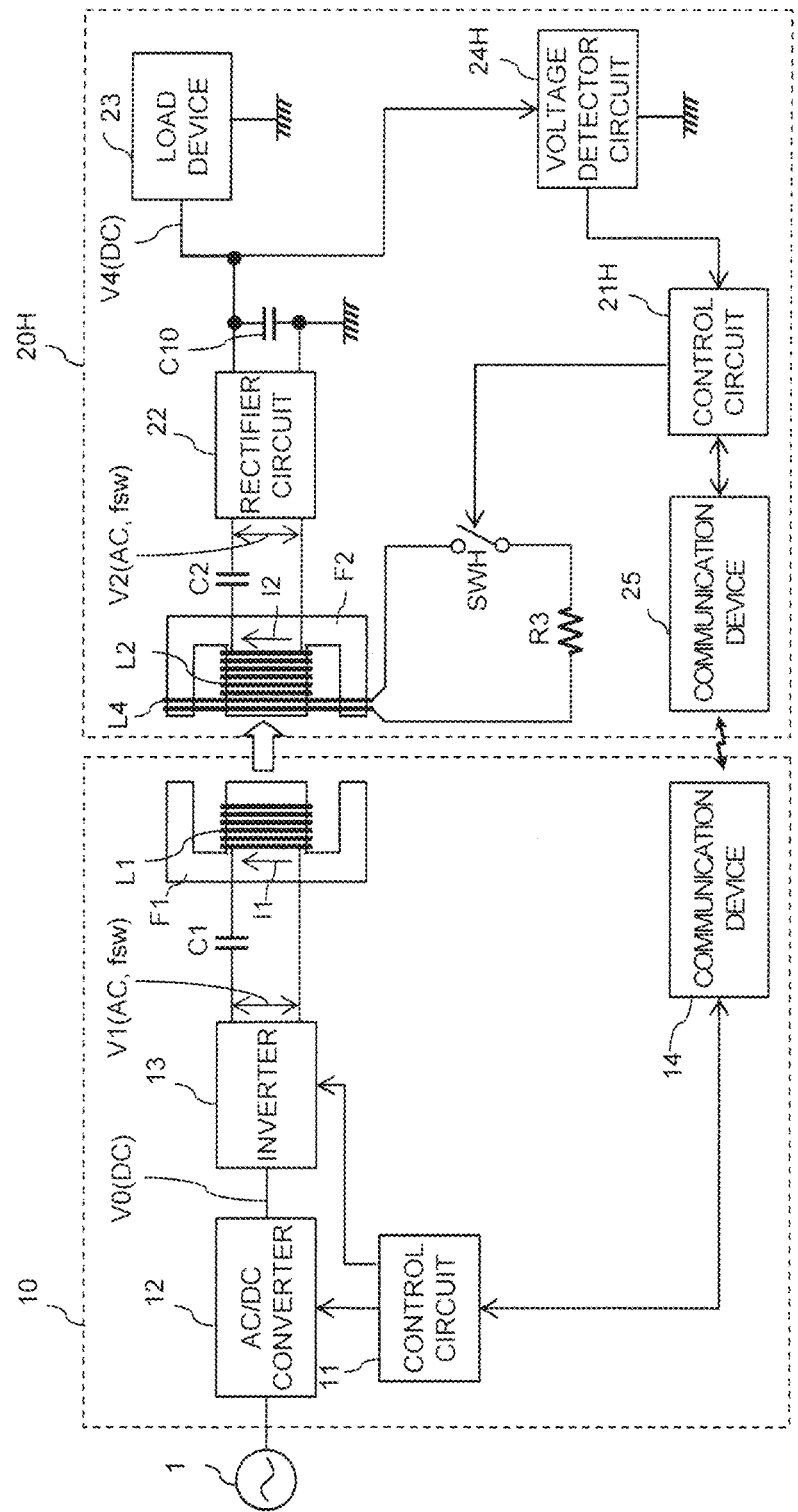
FIG. 55 is a block diagram illustrating a configuration of a contactless power transmission system according to a tenth embodiment.

FIG. 55 is a block diagram illustrating a configuration of a contactless power transmission system according to the tenth embodiment. The contactless power transmission system of FIG. 55 includes the power transmitter apparatus 10 and a power receiver apparatus 20H.

The power transmitter apparatus 10 of FIG. 55 is configured and operates in a manner similar to that of the power transmitter apparatus 10 of FIG. 1, except for performing power controlling process of FIG. 29.

The power receiver apparatus 20H of FIG. 55 is provided with a control circuit 21H and a voltage detector circuit 24H, instead of the control circuit 21C and the voltage detector circuit 24C of FIG. 28, and further provided with an auxiliary coil L4, a switch circuit SWH, and a load element R3.

The control circuit 21H controls overall operations of the power receiver apparatus 20H. The control circuit 21H includes a HPU, a RAM, a ROM, and the like, and performs power receiving process to be described below with reference to FIG. 57.

The voltage detector circuit 24H detects only the voltage V4 applied to the load device 23, as an output voltage of the power receiver apparatus 20H.

The auxiliary coil L4 is electromagnetically coupled to the transmitting coil L1. The auxiliary coil L3 may be wound around the magnetic core F2.

The switch circuit SWH is turned on/off under the control of the control circuit 21H. In the initial state, the switch circuit SWH is turned off.

The load element R3 is connected to the second auxiliary coil L4 through the switch circuit SWH.

In this specification, the auxiliary coil L4 is also referred to as a "second auxiliary coil", the switch circuit SWH is also referred to as a "second switch circuit", and the load element R3 is also referred to as a "third load element".

In the other aspects, the power receiver apparatus 20H is configured and operates in a manner similar to that of the power receiver apparatus 20C of FIG. 28.

Figure 56:
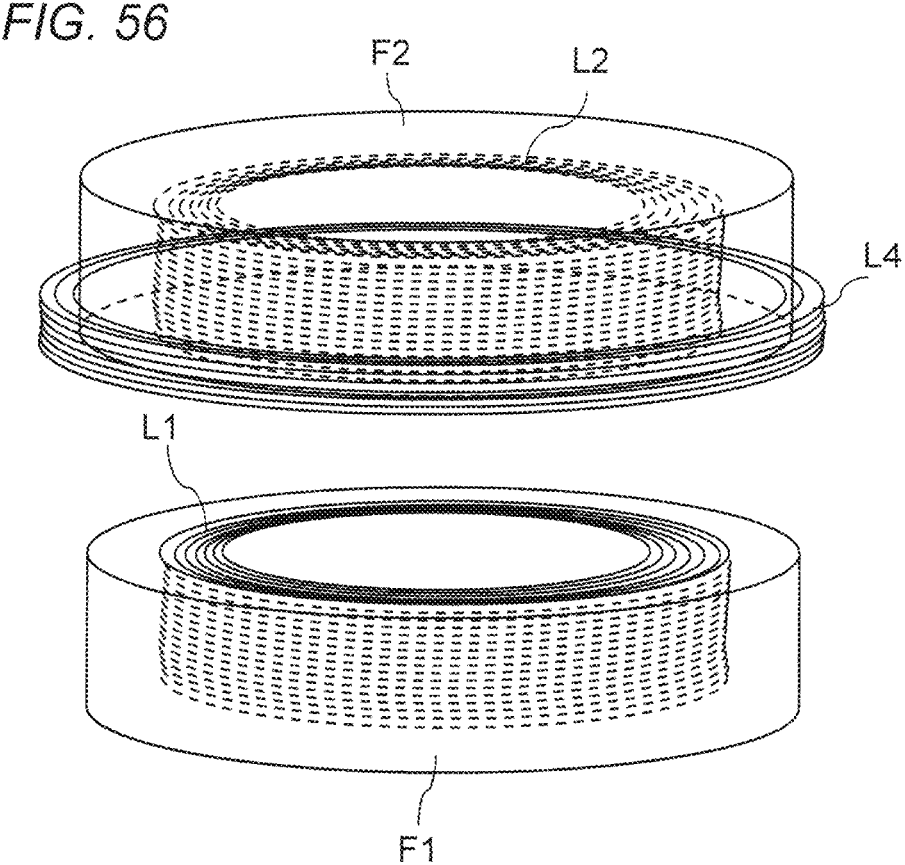
FIG. 56 is a perspective view illustrating arrangement of a transmitting coil L1, a receiving coil L2, and an auxiliary coil L4 of FIG. 33.

FIG. 56 is a perspective view illustrating arrangement of the transmitting coil L1, the receiving coil L2, and the auxiliary coil L4 of FIG. 33. As described above, the auxiliary coil L4 may be wound around the magnetic core F2. A part of the magnetic flux generated from the transmitting coil L1 intersects the auxiliary coil L4, and therefore, a current and a voltage are generated in the auxiliary coil L4. The auxiliary coil L4 may be disposed so as to surround the receiving coil L2, as illustrated in FIG. 56. By disposing the auxiliary coil L4 in such a manner, it is possible to reduce leakage of the magnetic flux of the receiving coil L2.

Operation Example of Tenth Embodiment

The control circuit 11 of the power transmitter apparatus 10 of FIG. 55 performs power transmitting process similar to that of FIG. 8. In step S2 of FIG. 8, the control circuit 11 of the power transmitter apparatus 10 performs power controlling process of FIG. 29, instead of the power controlling process of FIG. 9.

Figure 57:
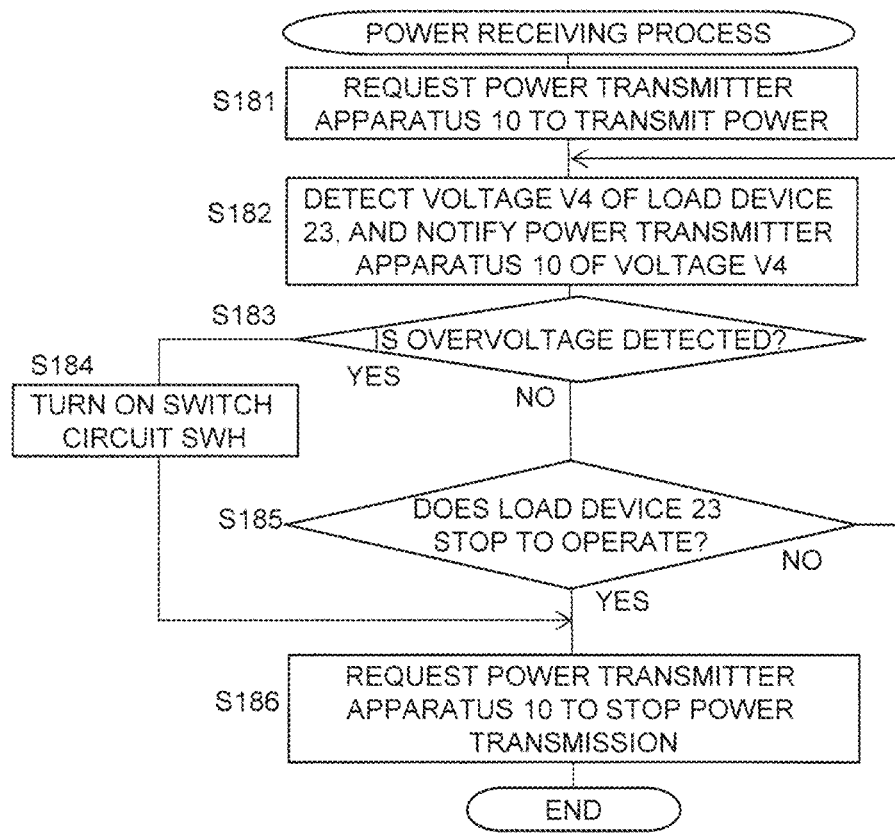
FIG. 57 is a flowchart illustrating power receiving process performed by a control circuit 21H of the power receiver apparatus 20H of FIG. 55.

FIG. 57 is a flowchart illustrating power receiving process performed by the control circuit 21H of the power receiver apparatus 20H of FIG. 55.

Steps S181 to S182 of FIG. 57 are similar to steps S101 to S102 of FIG. 30.

In step S183 of FIG. 57, the control circuit 21H of the power receiver apparatus 20H determines whether or not the voltage V4 applied to the load device 23 exceeds a predetermined threshold: if YES, the process proceeds to step S184; if NO, the process proceeds to step S185. In step S184 of FIG. 57, the control circuit 20H of the power receiver apparatus 21H turns on the switch circuit SWH.

By turning on the switch circuit SWH, part of the power transmitted from the power transmitter apparatus 10 to the power receiver apparatus 20H is consumed by the load element R3. Accordingly, when the overvoltage is detected in the power receiver apparatus 20H, it is possible to reduce the voltage applied to load device 23, and protect the load device 23 from the overvoltage, by turning on the switch circuit SWH.

Steps S185 to S186 of FIG. 57 are similar to steps S104 to S105 of FIG. 30.

Advantageous Effects of Tenth Embodiment

According to the contactless power transmission system of the tenth embodiment, it is possible to protect the load device 23 from overvoltage, using the auxiliary coil L4, the switch circuit SWH, and the load element R3.

The overvoltage protection according to the tenth embodiment may combined with the overvoltage protection using the load element R0 and the switch circuit SW described in the first embodiment, and the like. As a result, it is possible to surely protect the load device 23 from overvoltage.

Other Modified Embodiments

Although the embodiments of the present disclosure have been described in detail above, the above descriptions are merely examples of the present disclosure in all respects. Needless to say, various improvements and modifications can be made without departing from the scope of the present disclosure. For example, the following changes can be made. Hereinafter, components similar to those of the above embodiments are indicated by similar reference signs, and points similar to those of the above embodiments will be omitted as appropriate.

The above-described embodiments and modified embodiments may be combined in any manner.

The power transmitter apparatus may use a DC power supply, instead of the AC power supply. In this case, the power transmitter apparatus may be provided with a DC/DC converter, instead of the AC/DC converter.

The power transmitter apparatus may detect the power receiver apparatus using any sensor or switch other than the communication device.

FIG. 1 illustrates the case where the transmitting coil L1 and the capacitor C1 are connected in series, and the receiving coil L2 and the capacitor C2 are connected in series. However, at least one of them may be connected in parallel.

The transmitting coil, the receiving coil, and the auxiliary coil may have a shape other than the ring illustrated in FIG. 2.

In order to detect the current I1 flowing through the transmitting coil L1, for example, a shunt resistor, a current transformer, or the like may be used instead of the current detection resistor R1.

The load device may be integrated inside the power receiver apparatus as illustrated in FIG. 1, or may be connected externally to the power receiver apparatus.

The load device 23 may have a predetermined load value, instead of the variable load value.

Summary of Embodiments

The controller apparatus of the power transmitter apparatus, the power transmitter apparatus, and the contactless power transmission system according to the aspects of the present disclosure may be expressed as follows.

According to a first aspect of the present disclosure, a controller apparatus of a power transmitter apparatus 10 is provided for transmitting power in a contactless manner to a power receiver apparatus 20 with a receiving coil L2. The power transmitter apparatus 10 is provided with: a transmitting coil L1; and a power supply circuit configured to generate transmitting power having a variable voltage and a variable frequency, and supply the transmitting power to the transmitting coil L1. The controller apparatus is provided with: a first communication device 14 communicatively connected to the power receiver apparatus 20, and configured to receive a detected value of an output voltage of the power receiver apparatus 20 from the power receiver apparatus 20; and a first control circuit 11 configured to control the power supply circuit based on the detected value of the output voltage of the power receiver apparatus 20. The first control circuit 11 is configured to control the power supply circuit to generate transmitting power having a frequency varying within a predetermined frequency range. The first control circuit 11 is configured to receive the detected value of the output voltage of the power receiver apparatus 20 from the power receiver apparatus 20 using the first communication device 14, the detected value being detected in the power receiver apparatus 20 when generating the transmitting power using the power supply circuit. The first control circuit 11 is configured to determine a stably transmitting frequency based on the detected value of the output voltage of the power receiver apparatus 20, the stably transmitting frequency indicating a frequency of the transmitting power at which dependency of the output voltage of the power receiver apparatus 20 on a load value of the power receiver apparatus 20 is at least locally minimized within the frequency range. The first control circuit 11 is configured to determine a transmitting voltage based on the detected value of an output voltage of the power receiver apparatus 20, the transmitting voltage indicating a voltage of the transmitting power at which the output voltage of the power receiver apparatus 20 reaches a predetermined target voltage when generating transmitting power having the stably transmitting frequency. The first control circuit 11 is configured to control the power supply circuit to generate transmitting power having the stably transmitting frequency and the transmitting voltage.

According to a second aspect of the present disclosure, in the first aspect of the controller apparatus of the power transmitter apparatus 10, the power receiver apparatus 20 is provided with: a load device 23 having a variable load value; at least one load element R0 having a predetermined load value; and a first switch circuit SW configured to selectively supply the output voltage of the power receiver apparatus 20 to one of the load device 23 and the load element R0. The first control circuit 11 is configured to, when performing normal power transmission, transmit a control signal to the power receiver apparatus 20 using the first communication device 14, the control signal being provided for switching the first switch circuit SW to supply the output voltage of the power receiver apparatus 20 to the load device 23. The first control circuit 11 is configured to, when determining the frequency of the transmitting power, transmit a control signal to the power receiver apparatus 20 using the first communication device 14, the control signal being provided for switching the first switch circuit SW to supply the output voltage of the power receiver apparatus 20 to the load element R0.

According to a third aspect of the present disclosure, in the second aspect of the controller apparatus of the power transmitter apparatus 10, the power receiver apparatus 20B is provided with: a first load element R0a R0 having a first load value; and a second load element R0b R0 having a second load value larger than the first load value. The first control circuit 11 is configured to obtain a first voltage indicating a frequency characteristic of the output voltage of the power receiver apparatus 20B, based on the detected value of the output voltage of the power receiver apparatus 20B, when the output voltage of the power receiver apparatus 20B is supplied to the first load element R0a R0. The first control circuit 11 is configured to obtain a second voltage indicating a frequency characteristic of the output voltage of the power receiver apparatus 20B, based on the detected value of the output voltage of the power receiver apparatus 20B, when the output voltage of the power receiver apparatus 20B is supplied to the second load element R0b R0. The first control circuit 11 is configured to determine a frequency of the transmitting power at which a difference between the first voltage and the second voltage is minimized, as the stably transmitting frequency.

According to a fourth aspect of the present disclosure, in the first aspect of the controller apparatus of the power transmitter apparatus 10, the power receiver apparatus 20C is provided with a load device 23 having a variable load value. The first control circuit 11 determines a frequency of the transmitting power at which the dependency of the output voltage of the power receiver apparatus 20C on the load value of the power receiver apparatus 20C is at least locally minimized within the frequency range, when the output voltage of the power receiver apparatus 20C is supplied to the load device 23.

According to a fifth aspect of the present disclosure, in the first aspect of the controller apparatus of the power transmitter apparatus 10, the first control circuit 11 receives a voltage generated in the receiving coil L2 when generating the transmitting power using the power supply circuit, as the detected value of the output voltage of the power receiver apparatus 20D, from the power receiver apparatus 20D using the first communication device 14.

According to a sixth aspect of the present disclosure, in the first, second, fourth, or fifth aspect of the controller apparatus of the power transmitter apparatus 10, the first control circuit 11 determines a frequency of the transmitting power at which the detected value of the output voltage of the power receiver apparatus 20 is at least locally maximized within the frequency range, as the stably transmitting frequency.

According to a seventh aspect of the present disclosure, in one of the first to sixth aspects of the controller apparatus of the power transmitter apparatus 10, when the detected value of the output voltage of the power receiver apparatus 20 changes by a value larger than a first threshold from the detected value obtained when determining the stably transmitting frequency and the transmitting voltage, the first control circuit 11 redetermines the stably transmitting frequency and the transmitting voltage based on the detected value of the output voltage of the power receiver apparatus 20.

According to an eighth aspect of the present disclosure, in the first aspect of the controller apparatus of the power transmitter apparatus 10E, the controller apparatus is further provided with a coupling coefficient estimator 17 configured to estimate a coupling coefficient of the transmitting coil L1 and the receiving coil L2. When the coupling coefficient changes by a value larger than a second threshold from the detected value obtained when determining the stably transmitting frequency and the transmitting voltage, the first control circuit 11E redetermines the stably transmitting frequency and the transmitting voltage based on the detected value of the output voltage of the power receiver apparatus 20.

According to a ninth aspect of the present disclosure, in the eighth aspect of the controller apparatus of the power transmitter apparatus 10E, the controller apparatus is further provided with: a first auxiliary coil L3 electromagnetically coupled to the transmitting coil L1; a first detector 15 configured to detect a value of a current or a voltage generated in the first auxiliary coil L3; and a second detector 16 configured to detect a current flowing through the transmitting coil L1. The coupling coefficient estimator 17 estimates the coupling coefficient based on values detected by the first detector 15 and the second detector 16.

According to a tenth aspect of the present disclosure, in the ninth aspect of the controller apparatus of the power transmitter apparatus 10E, the coupling coefficient estimator 17 estimates a first coupling coefficient between the transmitting coil L1 and the receiving coil L2 based on the value of the current or voltage generated in the first auxiliary coil L3, and estimates a second coupling coefficient between the transmitting coil L1 and the receiving coil L2 based on a value of the current flowing through the transmitting coil L1. The first control circuit 11E is configured to, when a difference between the first coupling coefficient and the second coupling coefficient is equal to or less than a third threshold, control the power supply circuit to generate the transmitting power having the stably transmitting frequency and the transmitting voltage. The first control circuit 11E is configured to, when the difference between the first coupling coefficient and the second coupling coefficient exceeds the third threshold, control the power supply circuit to stop transmission of the power to the power receiver apparatus 20.

According to an eleventh aspect of the present disclosure, in the eighth aspect of the controller apparatus of the power transmitter apparatus 10F, the controller apparatus is further provided with: a first auxiliary coil L3 electromagnetically coupled to the transmitting coil L1; and a detector 15 configured to detect a value of a current or a voltage generated in the first auxiliary coil L3. The coupling coefficient estimator 17 estimates the coupling coefficient based on the value of the current or voltage generated in the first auxiliary coil L3.

According to a twelfth aspect of the present disclosure, in the eighth aspect of the controller apparatus of the power transmitter apparatus 10G, the controller apparatus is further provided with a detector 16 configured to detect a value of a current flowing through the transmitting coil L1. The coupling coefficient estimator 17 estimates the coupling coefficient based on the value of the current flowing through the transmitting coil L1.

According to a thirteenth aspect of the present disclosure, a power transmitter apparatus 10 is provided with: a transmitting coil L1; a power supply circuit configured to generate transmitting power having a variable voltage and a variable frequency, and supply the transmitting power to the transmitting coil L1; and the controller apparatus of the power transmitter apparatus 10 according to one of the first to twelfth aspects of the present disclosure.

According to a fourteenth aspect of the present disclosure, in the thirteenth aspect of the power transmitter apparatus 10, the power supply circuit includes a full-bridge inverter 13 or a half-bridge inverter 13.

According to a fifteenth aspect of the present disclosure, a contactless power transmission system includes: the power transmitter apparatus 10 according to the thirteenth or fourteenth aspect of the present disclosure; and a power receiver apparatus 20. The power receiver apparatus 20 is provided with: a receiving coil L2, a voltage detector circuit 24 configured to detect an output voltage of the power receiver apparatus 20, and a second communication device 25 communicatively connected to the power transmitter apparatus 10, and configured to transmit a detected value of the output voltage of the power receiver apparatus 20 to the power transmitter apparatus 10.

According to a sixteenth aspect of the present disclosure, in the fifteenth aspect of the present disclosure, the contactless power transmission system, at least one of the power transmitter apparatus 10 and the power receiver apparatus 20 is further provided with a capacitor C1, C2 connected to and resonating with the transmitting coil L1 or the receiving coil L2. Capacitance of the capacitor C1, C2 is set such that a frequency at which the dependency of the output voltage of the power receiver apparatus 20 on the load value of the power receiver apparatus 20 is at least locally minimized is included within a predetermined frequency range.

According to a seventeenth aspect of the present disclosure, in the sixteenth aspect of the contactless power transmission system, the power transmitter apparatus 10 is provided with a first capacitor C1 or connected to and resonating with the transmitting coil L1, the first capacitor C1 having first capacitance. The power receiver apparatus 20 is provided with a second capacitor C2 connected to and resonating with the receiving coil L2, the second capacitor C2 having second capacitance different from the first capacitance.

According to an eighteenth aspect of the present disclosure, in one of the fifteenth to seventeenth aspects of the contactless power transmission system, the power receiver apparatus 20 further includes a rectifier circuit 22 configured to rectify a voltage generated in the receiving coil L2. The rectifier circuit 22 is a full-wave rectifier circuit of diodes, a voltage-doubler rectifier circuit of diodes, a full-wave rectifier circuit of switching elements, or a voltage-doubler rectifier circuit of switching elements.

According to a nineteenth aspect of the present disclosure, in one of the fifteenth to eighteenth aspects of the contactless power transmission system, the power receiver apparatus 20 is further provided with: a load device 23 having a variable load value; at least one load element R0 having a predetermined load value; a first switch circuit SW configured to selectively supply the output voltage of the power receiver apparatus 20 to one of the load device 23 and the load element R0; and a second control circuit 21 configured to switch the first switch circuit SW to supply the output voltage of the power receiver apparatus 20 to the load element R0, when the output voltage of the power receiver apparatus 20 detected by the voltage detector circuit 24 exceeds a fourth threshold.

According to a twentieth aspect of the present disclosure, in one of the fifteenth to eighteenth aspects of the contactless power transmission system, the power receiver apparatus 20 is further provided with: a second auxiliary coil L4 electromagnetically coupled to the transmitting coil L1; a second switch circuit SWH; a third load element R3 connected to the second auxiliary coil L4 via the second switch circuit SWH; and a second control circuit configured to turn on the second switch circuit SWH, when the output voltage of the power receiver apparatus 20 detected by the voltage detector circuit 24 exceeds a fourth threshold.

INDUSTRIAL APPLICABILITY

The present disclosure is applicable to a contactless power transmission system configured to transmit power through magnetic field, in which a coupling coefficient of a transmitting coil L1 and a receiving coil L2 may change. The present disclosure is also applicable to a contactless power transmission system configured to transmit power through magnetic field, in which a coupling coefficient of a transmitting coil L1 and a receiving coil L2 does not change.

REFERENCE SIGNS LIST

1: AC Power Supply
10, 10E, 10F, 10G: Power Transmitter Apparatus 10
11, 11E, 11F, 11G: Control Circuit
12: AC/DC Converter
13, 13A: Inverter
14: Communication Device
15, 16: Detector
17, 17F, 17G: Coupling Coefficient Estimator
20, 20B, 20C, 20D, 20H: Power Receiver Apparatus 20
21, 21B, 21C, 21D, 21H: Control Circuit
22, 22A1, 22A2, 22A3, 22D: Rectifier Circuit
23: Load Device 23
24, 24B, 24C, 24D, 24E, 24H: Voltage Detector Circuit
25: Communication Device
31: Road Surface
32: Vehicle
33: Foreign Object
C1, C2, C10: Capacitor
F1, F2: Magnetic Core
F1A, F2A: Magnetic Body
L1: Transmitting Coil L1
L2: Receiving Coil L2
L3, L4: Auxiliary Coil
R0: Load Element R0
R1: Current Detection Resistor
R2: Voltage Detection Resistor
R3: Load Element R0
SW, SWB, SWH: Switch Circuit

The invention claimed is:

1. A contactless power transmission system including a power transmitter apparatus and a power receiver apparatus, the contactless power transmission system transmitting power in a contactless manner from the power transmitter apparatus to the power receiver apparatus, wherein the power transmitter apparatus comprises: a transmitting coil; a power supply circuit configured to generate transmitting power having a variable voltage and a variable frequency, and supply the transmitting power to the transmitting coil; and a controller apparatus, wherein the power receiver apparatus comprises: a receiving coil; a voltage detector circuit configured to detect an output voltage of the power receiver apparatus; and
a power-receiver communication device communicatively connected to the power transmitter apparatus, and configured to transmit a detected value of the output voltage of the power receiver apparatus to the power transmitter apparatus,
wherein the controller apparatus comprises:
a power-transmitter communication device communicatively connected to the power receiver apparatus, and configured to receive the detected value of the output voltage of the power receiver apparatus from the power receiver apparatus; and
a first control circuit configured to control the power supply circuit based on the detected value of the output voltage of the power receiver apparatus,
wherein the first control circuit is further configured to:
control the power supply circuit to generate transmitting power having a frequency varying within a predetermined frequency range,
receive the detected value of the output voltage of the power receiver apparatus from the power receiver apparatus using the power-transmitter communication device, the detected value being detected in the power receiver apparatus when generating the transmitting power using the power supply circuit,
determine a stably transmitting frequency based on the detected value of the output voltage of the power receiver apparatus, the stably transmitting frequency indicating a frequency of the transmitting power at which dependency of the output voltage of the power receiver apparatus on a load value of the power receiver apparatus is at least locally minimized within the frequency range,
determine a transmitting voltage based on the detected value of an output voltage of the power receiver apparatus, the transmitting voltage indicating a voltage of the transmitting power at which the output voltage of the power receiver apparatus reaches a predetermined target voltage when generating transmitting power having the stably transmitting frequency, and control the power supply circuit to generate transmitting power having the stably transmitting frequency and the transmitting voltage,
wherein the power receiver apparatus further comprises:
a load device having a variable load value: a first load element having a first load value; a second load element having a second load value larger than the first load value; and a first switch circuit configured to selectively supply the output voltage of the power receiver apparatus to one of the load device, the first load element, and the second load element,
wherein the first control circuit is further configured to:
when performing normal power transmission, transmit a control signal to the power receiver apparatus using the power-transmitter communication device, the control signal being provided for switching the first switch circuit to supply the output voltage of the power receiver apparatus to the load device, and
when determining a frequency of the transmitting power, transmit a control signal to the power receiver apparatus using the power-transmitter communication device, the control signal being provided for switching the first switch circuit to supply the output voltage of the power receiver apparatus to the first or second load element, and
wherein the first control circuit is further configured to:

obtain a first voltage indicating a frequency characteristic of the output voltage of the power receiver apparatus, based on the detected value of the output voltage of the power receiver apparatus, when the output voltage of the power receiver apparatus is supplied to the first load element,
obtain a second voltage indicating a frequency characteristic of the output voltage of the power receiver apparatus, based on the detected value of the output voltage of the power receiver apparatus, when the output voltage of the power receiver apparatus is supplied to the second load element, and
determine a frequency of the transmitting power at which a difference between the first voltage and the second voltage is minimized, as the stably transmitting frequency.

2. The contactless power transmission system as claimed in claim 1,
wherein, when the detected value of the output voltage of the power receiver apparatus changes by a value larger than a first threshold from the detected value obtained when determining the stably transmitting frequency and the transmitting voltage, the first control circuit redetermines the stably transmitting frequency and the transmitting voltage based on the detected value of the output voltage of the power receiver apparatus.

3. The contactless power transmission system as claimed in claim 1, the controller apparatus further comprising a coupling coefficient estimator configured to estimate a coupling coefficient of the transmitting coil and the receiving coil,
wherein, when the coupling coefficient changes by a value larger than a second threshold from the detected value obtained when determining the stably transmitting frequency and the transmitting voltage, the first control circuit redetermines the stably transmitting frequency and the transmitting voltage based on the detected value of the output voltage of the power receiver apparatus.

4. The contactless power transmission system as claimed in claim 3, the controller apparatus further comprising:
a first auxiliary coil electromagnetically coupled to the transmitting coil;
a first detector configured to detect a value of a current or a voltage generated in the first auxiliary coil; and
a second detector configured to detect a current flowing through the transmitting coil,
wherein the coupling coefficient estimator estimates the coupling coefficient based on values detected by the first detector and the second detector.

5. The contactless power transmission system as claimed in claim 4,
wherein the coupling coefficient estimator estimates a first coupling coefficient between the transmitting coil and the receiving coil based on the value of the current or voltage generated in the first auxiliary coil, and estimates a second coupling coefficient between the transmitting coil and the receiving coil based on a value of the current flowing through the transmitting coil, and
wherein the first control circuit is further configured to:
when a difference between the first coupling coefficient and the second coupling coefficient is equal to or less than a second threshold, control the power supply circuit to generate the transmitting power having the stably transmitting frequency and the transmitting voltage, and when the difference between the first coupling coefficient and the second coupling coefficient exceeds the second threshold, control the power supply circuit to stop transmission of the power to the power receiver apparatus.

6. The contactless power transmission system as claimed in claim 3, the controller apparatus further comprising:
a first auxiliary coil electromagnetically coupled to the transmitting coil; and
a detector configured to detect a value of a current or a voltage generated in the first auxiliary coil,
wherein the coupling coefficient estimator estimates the coupling coefficient based on the value of the current or voltage generated in the first auxiliary coil.

7. The contactless power transmission system as claimed in claim 3, the controller apparatus further comprising a detector configured to detect a value of a current flowing through the transmitting coil,
wherein the coupling coefficient estimator estimates the coupling coefficient based on the value of the current flowing through the transmitting coil.

8. The contactless power transmission system as claimed in claim 1,
wherein the power supply circuit includes a full-bridge inverter or a half-bridge inverter.

9. The contactless power transmission system as claimed in claim 1,
wherein at least one of the power transmitter apparatus and the power receiver apparatus further comprises a capacitor connected to and resonating with the transmitting coil or the receiving coil, and
wherein capacitance of the capacitor is set such that a frequency at which the dependency of the output voltage of the power receiver apparatus on the load value of the power receiver apparatus is at least locally minimized is included within a predetermined frequency range.

10. The contactless power transmission system as claimed in claim 9,
wherein the power transmitter apparatus comprises a first capacitor connected to and resonating with the transmitting coil, the first capacitor having first capacitance, and
wherein the power receiver apparatus comprises a second capacitor connected to and resonating with the receiving coil, the second capacitor having second capacitance different from the first capacitance.

11. The contactless power transmission system according to claim 1,
wherein the power receiver apparatus further includes a rectifier circuit configured to rectify a voltage generated in the receiving coil, and
wherein the rectifier circuit is a full-wave rectifier circuit of diodes, a voltage-doubler rectifier circuit of diodes, a full-wave rectifier circuit of switching elements, or a voltage-doubler rectifier circuit of switching elements.

12. The contactless power transmission system as claimed in claim 1,
wherein the power receiver apparatus further comprises:
a second control circuit configured to switch the first switch circuit to supply the output voltage of the power receiver apparatus to the load element, when the output voltage of the power receiver apparatus detected by the voltage detector circuit exceeds a fourth threshold.

13. The contactless power transmission system as claimed in claim 1,
wherein the power receiver apparatus further comprises:
a second auxiliary coil electromagnetically coupled to the transmitting coil;
a second switch circuit;
a third load element connected to the second auxiliary coil via the second switch circuit; and
a second control circuit configured to turn on the second switch circuit, when the output voltage of the power receiver apparatus detected by the voltage detector circuit exceeds a fourth threshold.

* * * * *